(12) United States Patent
Groenewald et al.

(10) Patent No.: US 12,544,726 B2
(45) Date of Patent: Feb. 10, 2026

(54) COMBINED COMBUSTION AND PYROLYSIS REACTORS FOR HYDROGEN PRODUCTION, AND ASSOCIATED SYSTEMS AND METHODS

(71) Applicant: Modern Hydrogen, Inc., Bothell, WA (US)

(72) Inventors: Roelof E. Groenewald, Bothell, WA (US); Kevin J. Hughes, Knoxville, TN (US); William Kokonaski, Edmonds, WA (US); Max N. Mankin, Seattle, WA (US); Tony S. Pan, Bothell, WA (US); Lowell L. Wood, Bellevue, WA (US); John J. Lorr, Monroe, WA (US); Amit Goyal, Mill Creek, WA (US); Guido Radaelli, Pleasant Hill, CA (US); Vikram Seshadri, Bothell, WA (US); MJ Mahdi, Bothell, WA (US); Matthew Ballard, Montgomery, TX (US); Stephen Harris, Seattle, WA (US); Alex Pearse, Bothell, WA (US); Jeff Henry, Bothell, WA (US)

(73) Assignee: Modern Hydrogen, Inc., Bothell, WA (US)

( * ) Notice: Subject to any disclaimer, the term of this patent is extended or adjusted under 35 U.S.C. 154(b) by 762 days.

(21) Appl. No.: 17/832,516

(22) Filed: Jun. 3, 2022

(65) Prior Publication Data

US 2022/0387952 A1 Dec. 8, 2022

Related U.S. Application Data

(60) Provisional application No. 63/283,156, filed on Nov. 24, 2021, provisional application No. 63/197,255, filed on Jun. 4, 2021.

(51) Int. Cl.
*B01J 6/00* (2006.01)
*B01J 19/00* (2006.01)
*C01B 3/24* (2006.01)

(52) U.S. Cl.
CPC .......... *B01J 6/008* (2013.01); *B01J 19/0013* (2013.01); *C01B 3/24* (2013.01);
(Continued)

(58) Field of Classification Search
CPC ..... B01J 6/00; B01J 6/008; B01J 19/00; B01J 19/0006; B01J 19/0013; B01J 2219/00;
(Continued)

(56) References Cited

U.S. PATENT DOCUMENTS

| 3,460,524 A | 8/1969 | Lazaridis |
| 4,797,091 A | 1/1989 | Neumann |

(Continued)

FOREIGN PATENT DOCUMENTS

| CN | 1617830 A | 5/2005 |
| CN | 106854127 A | 6/2017 |

(Continued)

OTHER PUBLICATIONS

International Search Report and Written Opinion for International Patent Application No. PCT/US2022/032257, Applicant: Modern Electron, Inc., mailed Oct. 7, 2022, 14 pages.

(Continued)

*Primary Examiner* — Natasha E Young
(74) *Attorney, Agent, or Firm* — Fredrikson & Byron, P.A.

(57) ABSTRACT

Combined combustion and pyrolysis (CCP) systems, and associated systems and methods, are disclosed herein. In some embodiments, the CCP system includes an input valve fluidly coupleable to a fuel supply to receive a hydrocarbon reactant, a CCP reactor fluidly coupled to the input valve, (Continued)

and a carbon separation component fluidly coupled to the CCP reactor. The CCP reactor can include a combustion chamber, a reaction chamber in thermal communication with the combustion chamber and/or fluidly coupled to the input valve, and an insulating material positioned to reduce heat loss from the combustion chamber and/or the reaction chamber. The CCP reactor can also include a combustion component positioned to combust a fuel within the combustion chamber. The combustion can heat the reaction chamber and the hydrocarbon reactant flowing therethrough. The heat causes a pyrolysis of the hydrocarbon reactant that generates hydrogen gas and carbon.

50 Claims, 35 Drawing Sheets

(52) U.S. Cl.
CPC ............... *B01J 2219/00157* (2013.01); *C01B 2203/0272* (2013.01); *C01B 2203/049* (2013.01); *C01B 2203/0811* (2013.01); *C01B 2203/1241* (2013.01)

(58) Field of Classification Search
CPC .... B01J 2219/00049; B01J 2219/00051; B01J 2219/00157; C01B 3/00; C01B 3/02; C01B 3/22; C01B 3/24; C01B 2203/00; C01B 2203/02; C01B 2203/0266; C01B 2203/0272; C01B 2203/04; C01B 2203/0465; C01B 2203/049; C01B 2203/08; C01B 2203/0805; C01B 2203/0811; C01B 2203/0827; C01B 2203/12; C01B 2203/1205; C01B 2203/1211; C01B 2203/1235; C01B 2203/1241; C01B 2203/1288; C01B 2203/1294; C01B 2203/16; Y02E 60/00; Y02E 60/30
See application file for complete search history.

(56) References Cited

U.S. PATENT DOCUMENTS

| | | |
|---|---|---|
| 4,884,555 A | 12/1989 | Huang |
| 5,101,633 A | 4/1992 | Keller et al. |
| 5,407,347 A | 4/1995 | Bortz |
| 5,470,224 A | 11/1995 | Bortz |
| 5,589,599 A | 12/1996 | Mcmullen et al. |
| 5,797,356 A | 8/1998 | Khizh |
| 6,036,480 A | 3/2000 | Hughes et al. |
| 6,929,668 B2 | 8/2005 | Millet et al. |
| 7,007,477 B2 | 3/2006 | Widener |
| 7,537,623 B2 | 5/2009 | Etievant et al. |
| 8,312,722 B2 | 11/2012 | York et al. |
| 9,212,058 B2 | 12/2015 | De Graffenried, Sr. |
| 9,406,957 B2 | 8/2016 | Jackson |
| 10,787,362 B2 | 9/2020 | De Graffenried, Sr. |
| 11,826,749 B2 | 11/2023 | Pannala et al. |
| 11,897,768 B2 | 2/2024 | Radaelli et al. |
| 2002/0007594 A1 | 1/2002 | Muradov |
| 2003/0110693 A1* | 6/2003 | Drnevich .............. C01B 3/384 48/89 |
| 2008/0147241 A1 | 6/2008 | Tsangaris et al. |
| 2009/0060805 A1 | 3/2009 | Muradov et al. |
| 2009/0214987 A1 | 8/2009 | Yamasaki |
| 2009/0260286 A1 | 10/2009 | Sasauchi et al. |
| 2010/0035103 A1 | 2/2010 | Jackson |
| 2010/0040510 A1 | 2/2010 | Randhava et al. |
| 2010/0043291 A1 | 2/2010 | Ljunggren |
| 2010/0175639 A1 | 7/2010 | Al-Dawood et al. |
| 2013/0213256 A1 | 8/2013 | McAlister |
| 2014/0148519 A1 | 5/2014 | Drnevich et al. |
| 2014/0264175 A1 | 9/2014 | Perry et al. |
| 2016/0208290 A1 | 7/2016 | Foody |
| 2017/0159930 A1 | 6/2017 | Lin et al. |
| 2020/0294779 A1 | 9/2020 | Ashton et al. |
| 2021/0380407 A1 | 12/2021 | Ashton et al. |
| 2022/0315424 A1 | 10/2022 | Ashton et al. |
| 2023/0003381 A1 | 1/2023 | Mueller-Hagedorn et al. |
| 2024/0217815 A1 | 7/2024 | Radaelli et al. |
| 2025/0189120 A1 | 6/2025 | Kraemer et al. |

FOREIGN PATENT DOCUMENTS

| | | |
|---|---|---|
| CN | 209508163 U | 10/2019 |
| CN | 112390227 A | 2/2021 |
| JP | 2002543033 A | 12/2002 |
| JP | 2019200996 A | 11/2019 |
| WO | WO-9958614 | 11/1999 |
| WO | 02057395 A1 | 7/2002 |
| WO | WO-2010127961 | 11/2010 |
| WO | WO-2019226416 | 11/2019 |
| WO | WO-2021102521 | 6/2021 |
| WO | WO-2021247768 | 12/2021 |

OTHER PUBLICATIONS

Lohse-Busch et al., "Technology Assessment of a Fuel Cell Vehicle: 2017 Toyota Mirai", Argonne National Laboratory, Report# ANL/ESD-18/12, Jun. 2018, pp. 80.

* cited by examiner

| | | RESIDENTIAL | | COMMERCIAL | | DISTRICT | | DATA-CENTERS |
|---|---|---|---|---|---|---|---|---|
| | User Case | Single Unit | Apt'm't Complex | Industrial/Office/Campus/Airport/Hospital/Mall | | Co-Gen | Tri-Gen | Datacenter |
| Power | Design Capacity | 10,000 kWh/y | 250,000 kWh/y | 12 kWh/sqft/year | | 40,000,000 kWh/y | 10 MW | 25 MW |
| | Demand Curve | Discontinuous | Discontinuous | Daily Cycle | Continuous | Continuous | | Continuous |
| Heating | Design Capacity | 100,000 Btu/h | 2.5 MMBtu/h | 25 Btu/h/sqft | | 10,000kW | 10 MW | --- |
| | Demand Curve | Seasonal | Seasonal | Seasonal | | Seasonal | Seasonal | --- |
| Cooling | Design Capacity | 2000 kWh/Y | 50,000 kWH/y | N/A | 3kWh/sqft/y | --- | 10 MW | 25 MW |
| | Demand Curve | Seasonal | Seasonal | N/A | Seasonal | --- | Seasonal | Continuous |
| Natural gas requirements | Autothermal, TMD only | 140 MMBtu/y | 5,250 MMBtu/y | 70,000 MMBtu/y | | N/A | N/A | N/A |
| | RTP, CCP, TMD only | 145 MMBtu/y | 4,875 MMBtu/y | 9,500 MMBtu/y | | N/A | N/A | N/A |
| | Autothermal, TMD and Cogen | 168 MMBtu/y | 6,300 MMBtu/y | 136,189 MMBtu/y | | 453,963 MMBtu/y | 907,925 MMBtu/y | 2,468,421 MMBtu/y |
| | RTP, CCP, TMD and Cogen | 164 MMBtu/y | 5,350 MMBtu/y | 18,483 MMBtu/y | | 616,092 MMBtu/y | 1,232,184 MMBtu/y | 3,350,000 MMBtu/y |

TMD: Thermal Methane Decomposition
Btu/h: British thermal units per hour
MMBtu/y: Million British thermal units per year
kWh/sqft/year: Kilowatt hour per square foot per year
RTP: Regenerative Thermal Pyrolysis
CCP: Combined Combustion and Pyrolysis kWh/year: Kilowatt hour per year
MW: Megawatt
Cogen: Heating, Cooling, and/or Power Generation
N/A: Not Available

*FIG. 2*

| Flow/ Mechanical carbon removal | Methane flow (SLPM) | Temperature (°C) | Experiment run time (min) | %Carbon Collected |
|---|---|---|---|---|
| Flow | 1 | 1500 | 60.0 | 47.5 |
| Flow | 3 | 1250 | 60.0 | 51.6 |
| Flow | 5 | 1500 | 46.0 | 23.0 |
| Flow | 5 | 1000 | 60.0 | 0.0 |
| Flow | 1 | 1000 | 60.0 | 0.0 |
| Flow | 1 | 1250 | 60.0 | 49.8 |
| Flow | 3 | 1500 | 60.0 | 36.1 |
| Flow | 5 | 1250 | 60.0 | 47.8 |
| Flow | 3 | 1000 | 60.0 | 0.0 |
| Flow | 1 | 1150 | 60.0 | 65.6 |
| Flow | 5 | 1500 | 12.0 | 40.2 |
| Flow | 3 | 1500 | 20.0 | 41.3 |
| Flow | 5 | 1500 | 30.0 | 42.7 |
| Flow | 1 | 1250 | 60.0 | 53.6 |
| Flow | 1 | 1250 | 60.0 | 53.3 |
| Flow | 5 | 1500 | 42.0 | 47.2 |
| Mechanical | 5 | 1500 | 30.0 | 77.3 |
| Mechanical | 5 | 1500 | 63.0 | 85.9 |

*FIG. 17A*

| Air Preheat temperature (°C) | Methane pyrolysis (SLPM) | Pyrolysis Preheat Temperature (°C) | Monolith | Cells per Square inch | Tube in Tube | Conversion |
|---|---|---|---|---|---|---|
| 240 | 3 | 25 | No | None | No | 0.0% |
| 240 | 6 | 25 | No | None | No | 4.2% |
| 270 | 3 | 25 | No | None | No | 21.0% |
| 240 | 10 | 25 | No | None | No | 8.1% |
| 235 | 3 | 25 | No | None | No | 20.0% |
| 235 | 6 | 25 | No | None | No | 15.2% |
| 235 | 6 | 400 | No | None | No | 13.1% |
| 235 | 10 | 400 | No | None | No | 7.7% |
| 235 | 10 | 25 | No | None | No | 7.7% |
| 235 | 6 | 25 | No | None | No | 12.2% |
| 235 | 6 | 25 | No | None | No | 13.1% |
| 235 | 6 | 400 | No | None | No | 13.5% |
| 175 | 2 | 25 | Close | Low | No | 65.5% |
| 175 | 3 | 25 | Close | Low | No | 53.9% |
| 175 | 5 | 25 | Close | Low | No | 36.7% |
| 200 | 6 | 25 | Close | Low | No | 28.1% |
| 200 | 3 | 25 | Close | Low | No | 45.1% |
| 200 | 10 | 25 | Close | Low | No | 18.1% |
| 200 | 6 | 400 | Close | Low | No | 35.5% |
| 200 | 10 | 400 | Close | Low | No | 24.3% |
| 200 | 3 | 400 | Close | Low | No | 52.8% |
| 200 | 6 | 25 | Far | High | No | 11.7% |
| 200 | 3 | 25 | Far | High | No | 20.1% |
| 200 | 6 | 25 | Far | High | No | 14.0% |
| 200 | 3 | 25 | Close | High | No | 35.1% |
| 200 | 6 | 25 | Close | High | No | 18.1% |
| 200 | 10 | 25 | Close | High | No | 11.3% |
| 200 | 6 | 25 | Close | Low | Yes | 18.3% |
| 200 | 6 | 400 | Close | Low | Yes | 16.4% |
| 200 | 10 | 400 | Close | Low | Yes | 12.2% |
| 200 | 10 | 25 | Close | Low | Yes | 10.0% |
| 500 | 6 | 25 | Close | Low | No | 48.2% |
| 500 | 10 | 25 | Close | Low | No | 28.2% |
| 500 | 6 | 400 | Close | Low | Yes | 49.3% |
| 500 | 10 | 400 | Close | Low | Yes | 29.2% |
| 500 | 15 | 400 | Close | Low | Yes | 17.3% |

*FIG. 20A*

COMBINED COMBUSTION AND PYROLYSIS REACTORS FOR HYDROGEN PRODUCTION, AND ASSOCIATED SYSTEMS AND METHODS

CROSS-REFERENCE TO RELATED APPLICATIONS

This application claims priority to U.S. Provisional Patent Application No. 63/283,156, filed on Nov. 24, 2021, and U.S. Provisional Patent Application No. 63/197,255, filed on Jun. 4, 2021, the entireties of which are incorporated herein by reference.

TECHNICAL FIELD

The present technology is directed generally to combined combustion and pyrolysis reactors for hydrogen production, and associated systems and methods. Representative systems can be used for distributed residential and/or commercial applications, and can produce heat, power, and/or other outputs, in addition to hydrogen.

BACKGROUND

Hydrogen is typically generated by large scale reactors operating at high temperatures in an industrial setting. Some industrial methods for producing hydrogen include steam methane reforming (SMR) and coal gasification. These processes result in high direct greenhouse gas (GHG) emissions. For example, SMR can produce about 10 kg. of carbon dioxide per kg. of hydrogen, and coal gasification can produce 20 kg of carbon dioxide per kg. of hydrogen. The hydrogen produced is then transported for eventual use in fuel cells and/or other industrial processes, such as producing certain ammonia-based fertilizers. Recently, hydrogen gas has been produced using low GHG methods, for use as a chemical reactant and as a thermal energy source for heating and electricity. This approach has garnered interest as an attractive method of generating power and/or heat, or supplying hydrogen to various processes, because combusting hydrogen gas does not release any greenhouse gases or other harmful chemicals. However, combusting hydrogen gas releases less heat than natural gas on a per mol basis, therefore requiring efficient systems for production.

Methane pyrolysis is an alternative process for producing hydrogen with lower direct greenhouse gas emissions. Studies and pilots on methane pyrolysis variants that have been pursued include: plasma-driven dissociation, thermal dissociation, with the use of catalytic molten metals or salts, and utilizing a catalyst in different reactor configurations (for example, fluidized bed reactors). These systems represent promising developments toward enabling hydrogen production without the concurrent release of greenhouse gases, because carbon is naturally sequestered in solid form during the pyrolysis reaction. However, to feed the pyrolysis reaction endotherm, these processes use an energy source that is typically fueled by carbon-based materials to generate electricity and/or heat to power the methane reforming or dissociation process. As an alternative, renewable power has been proposed; however renewable power is generally not dispatchable to meet the perennial energy requirements for industrial large-scale applications, which typically involve continuous operation, and today only comprises a small fraction of the necessary total energy generation capacity. Accordingly, the mismatch between the availability of renewable power for large scale hydrogen production, and the inability to scale down the process for distributed small-scale production represents a need in this technology sector.

BRIEF DESCRIPTION OF THE DRAWINGS

FIG. 2 is a table illustrating the power, heating, cooling, and natural gas demand and usage for various representative applications in accordance with some embodiments of the present technology.

FIGS. 17A-17C illustrate test data demonstrating the efficacy of carbon removal techniques in accordance with embodiments of the present technology.

FIGS. 20A-20H illustrate the test data for various representative pyrolysis reactor systems in accordance with embodiments of the present technology.

DETAILED DESCRIPTION

Figure 1:
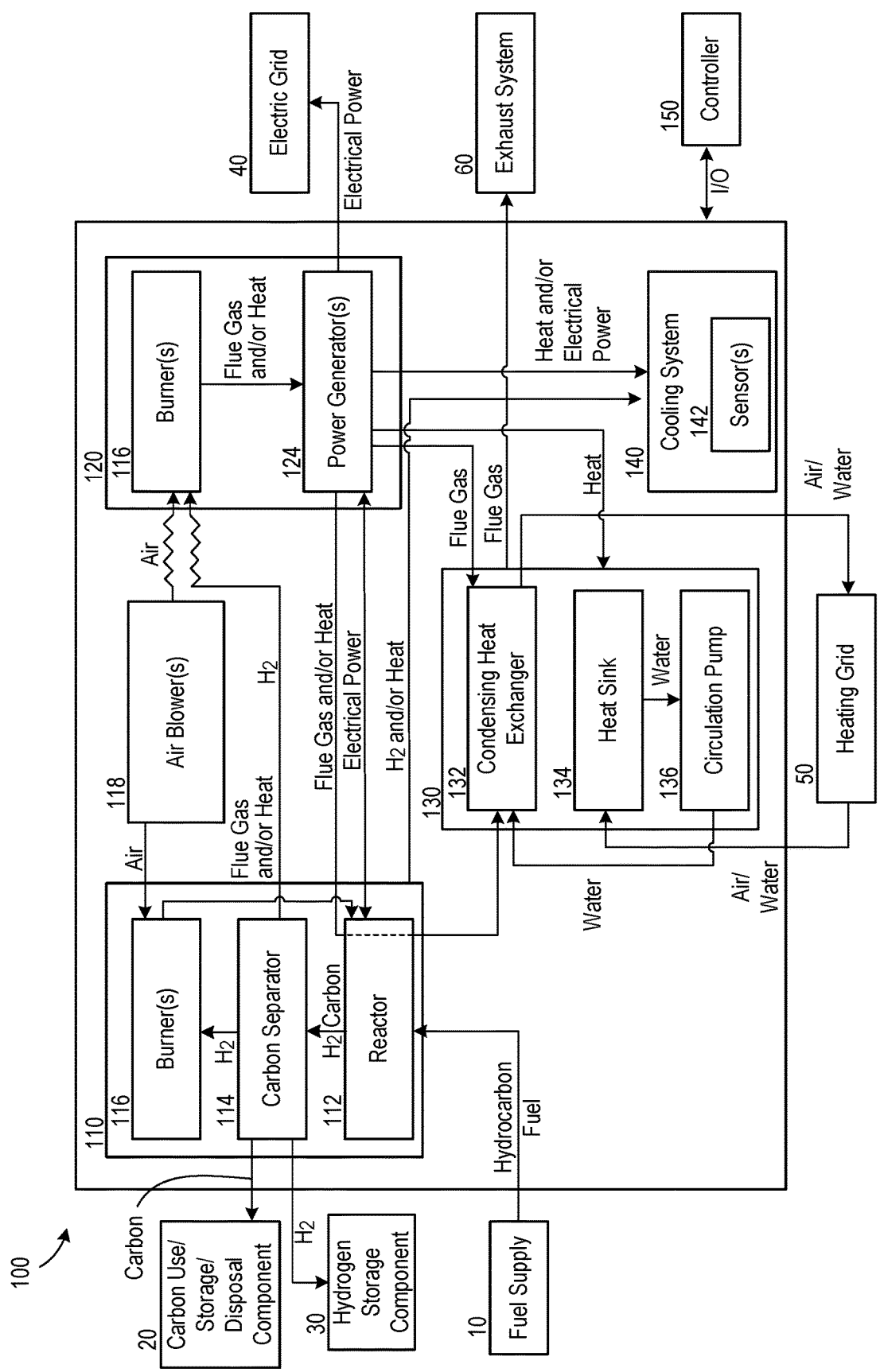
FIG. 1 is a block diagram of a system for producing hydrogen gas for local distribution, consumption, and/or storage in accordance with some embodiments of the present technology.

For purposes of discussion, the following description is presented in several sections under corresponding headings. It will be understood that elements discussed under any heading may be applied to systems described under other headings, without limitation, unless expressly stated otherwise. The sections include the following:

1. Overview
2. Representative Overall Combustion Pyrolysis Systems
3. Representative Regenerative Thermal Pyrolysis Systems
4. Representative Combined Combustion and Pyrolysis Systems
5. Representative Reactor Configurations with Deposited Carbon Removal Systems
6. Representative Test and Simulation Data
7. Liquid Intermediate Products
8. Representative Gas-Borne Carbon Removal Systems

1. Overview

To enable the wider use of hydrogen that has been generated by industrial reactors using steam methane reforming (SMR) and gasification, hydrogen transportation and storage technologies and infrastructure will be required. This will in turn require replacing existing natural gas pipelines with hydrogen-compatible materials, or finding more economical and mass/volume efficient ways to store hydrogen, or transport it. Current state-of-the-art hydrogen storage has an approximate ratio of 5:95 between hydrogen weight and storage tank weight. This and other factors would indicate that the wholesale replacement of gas pipelines, and/or creating a new transportation infrastructure may be prohibitively expensive, and/or slow to be rapidly adopted. Due to these limitations, hydrogen use has been predominantly confined to use as a chemical molecule at sites close to where it is produced. For example, the United States has about 1,600 miles of hydrogen pipelines (mostly located in the vicinity of refineries/chemical plants) versus 2,000,000 miles of natural gas pipelines. However, the current industrial methods of hydrogen production emit large amounts of greenhouse gases (GHGs), limiting their potential to be scaled up. Similarly, decarbonizing these current production methods requires carbon capture and storage (CCS), which is difficult and non-economical to operate at small scales. Finally, current methods of hydrogen production become less efficient at small scales. Together, these factors limit the potential of current methods of hydrogen production to downsize in scale, so as to meet local demand and avoid the challenge and cost of hydrogen transport and storage.

If hydrogen can be made locally, with low GHG emissions, avoiding transportation and storage, it could expand its user base beyond use in chemicals as a reactant, to applications including: the building sector (heating, cooling, electricity), power generation (electricity), transportation fuel (e.g., for trucks, shipping, cars and/or other vehicles), other industrial sectors (steel, glass, cement), and/or other traditional chemical plant users. A switch to hydrogen as a fuel for combustion or clean chemical reactant would provide enormous environmental benefits.

For example, in the building sector (commercial and residential), space heating and water heating via fossil fuels is one of the largest contributors to global greenhouse gas emissions. Accordingly, a switch to hydrogen combustion in building appliances would provide enormous environmental benefits. Hydrogen can also be converted directly to electricity using fuel cells and/or other devices, or indirectly via heat-to-electricity converters and heat engines at the building level. The use of hydrogen to generate electricity locally (e.g., in the same building, within the same neighborhood, within a single appliance and/or housing, within a space previously designated for a traditional appliance, and/or for local combined heat and power generation), could further reduce reliance on carbon-emitting power sources, thereby delivering further environmental benefits.

Systems for producing hydrogen gas for local distribution, consumption, and/or storage, and related devices and methods are disclosed herein. In some embodiments, a representative system includes an input line connectable to a supply of reaction material that includes a hydrocarbon or mixture of hydrocarbons, and a reactor in fluid communication with the input line. The reactor includes one or more flow channels positioned to transfer heat to the reaction material to convert the hydrocarbon into an output (e.g., an output product stream) that includes hydrogen gas, carbon particulates, and heat (as well as other gases, such as leftover reaction materials and intermediates). The overall system can also include a carbon removal system to remove the carbon from the reactor, and a separation system operably coupled to the reactor to separate the hydrogen gas from the carbon particulates in the output stream. In various embodiments, the system can also include components to locally consume the filtered hydrogen gas. For example, the system can include one or more burners that burn all or a fraction of the hydrogen gas, and one or more thermal pathways coupled between the burners and the reactor (and/or specific chambers within the reactor) that transfer heat from the burners to the reactor. In some embodiments, for example, operation of the system includes a heating period followed by an operative period. During the heating period, the reactor cannot transfer sufficient heat into a reactant to cause pyrolysis at a desired rate (e.g., because the reactor and/or reactor walls are not hot enough yet). Accordingly, the pyrolysis reaction occurs at a relatively low rate (e.g., a smaller amount of reactant is passed through the reactor and/or a large percentage of the reactant is not reacted while passing through), and hydrogen gas production is relatively low. As a result, all (or most) of the hydrogen gas produced by the reaction may be necessary to continue to heat the reactor. During the operation period, the reactor (and/or walls within the reactor) are at a sufficient temperature to drive the pyrolysis reaction at a desired rate. Accordingly, excess hydrogen gas can be produced such that only a portion of the hydrogen gas is consumed to continue to heat the reactor. To transfer heat, in one example, the thermal pathways can direct hot flue gas from the burners over and/or through the reactor. In a specific example, the burners can be positioned within a first chamber of the reactor and transfer heat into a second chamber via conduction and/or radiation through a shared wall.

The system can also include one or more power generators operably coupled to the reactor and/or the burners. The power generators receive hydrogen and/or heat to generate electricity. The electricity can be used to power various components of the system and/or can be directed into an electric grid. In turn, the electric grid can power a single-family residence, a multifamily residence, a commercial building, and/or any other suitable space. In some embodiments, more electricity is produced than consumed for near point use (e.g., at the building level). In some such embodiments, the excess electricity is exported to an external electrical power grid. In some such embodiments, the excess electricity is stored in a secondary electrochemical or thermal storage system for later consumption at the building scale. The overall system can also include a circulation system operably coupled to the reactor, the burners, and/or the power generators via thermal pathways. The circulation system receives excess heat from other components in the system and circulates the heat in a heating grid and/or hot water grid for a single-family residence, a multifamily residence, a commercial building, and/or any other suitable space.

The system can also include one or more ways to utilize the hydrogen product for use as a chemical reactant by supplying it to an oil and gas refinery, chemical plant for use of $H_2$ as a reactant, or to a gas supplier for purification and storage, for instance via compression and storage in a tank. In turn, the compressed hydrogen gas tanks can be distributed for a variety of uses such as fuel cell stations, small scale hydrogen users for specialty and fine chemicals production.

As disclosed herein, representative systems can be scaled (down or up) to match appropriate applications to: (a) residential, neighborhood, or single commercial building levels; (b) industrial users—small scale hydrogen users or large scale users; and/or (c) as a fuel—for instance for fuel cell stations to power automobiles, or for other power or heat generation purposes. In any of these embodiments, the hydrogen is generated near the point of use, thereby avoiding the need for infrastructure overhauls to enable a hydrogen or mixed hydrogen/natural gas grid. That is, embodiments of the disclosed system designs enable partial or complete decarbonization of the above identified sectors without any changes to the natural gas grid, since hydrogen is generated from natural gas in situ and consumed in situ. However, pyrolysis reactors at a small scale also raise numerous challenges. To meet those challenges, various embodiments disclosed herein include features that adapt the pyrolysis reactors for small-scale, distributed applications and/or integration with building heating systems.

Representative systems can also include one or more ways to generate a solid carbon by-product. The solid carbon collected from the system can be used for various applications, including but not limited to use: as a soil amendment material for water and nutrient retention, road construction, tires, building construction, waterproofing material, carbon black, activated carbon, graphitic carbon, an additive for polymer and metal composites, a binder or filler material, a catalyst support, refractory material, carbon-carbon brakes, thermal paste for inks and coatings, replacement of metallurgical coke for manufacturing iron steel, and/or recycled to the pyrolysis reactor system to act as a catalyst or nucleation site to aid the pyrolysis reaction of the hydrocarbon fuel. The bulk carbon by-product can be segregated into various grades and subjected to chemical and/or physical functionalization for various intended applications.

Representative systems can also include a feature for incomplete conversion of hydrocarbon fuel to an intermediate product that can be condensed into a liquid or a solid (for example, wax) hydrocarbon product. The intermediate product can also be produced intermittently to generate a sufficient quantity to be used as a binding agent for the principal by-product (e.g., solid carbon). Alternatively, the intermediate product can be used as a fuel or a chemical, with high physical and energy density that is easier to transport compared to gaseous natural gas feed or the product of complete conversion—namely, hydrogen.

The system can also include one or more ways to remove solid carbon byproducts from the reactor and separate them from the gaseous hydrogen. Methods include both mechanical and non-mechanical ways to remove carbon on a periodic or continuous basis. Several representative techniques are described later.

The system also may include components and methods for controlling the system during start-up, shut-down, and steady state operation, for sensing its own operation, and/or for communicating with operators. For instance, one or more sensors may sense pressure drops and flow rates, and, via an appropriate controller, adjust valves and/or other components to optimize operation, or adjust operation to match the temporally varying demand for hydrogen production. The system may also contain a communication device for remote monitoring, as well as a local monitoring station (e.g., via screen and/or other indicator to the operator). The system may also contain a valve sub-system that enables the system to be heated and/or have the endotherm supplied initially by a first combustion fuel (e.g., natural gas and/or another suitable hydrocarbon). Then once the system reaches a suitable operating temperature, the valves can switch to heating the system and/or supplying the endotherm via a second combustion fuel (e.g., the hydrogen produced by the pyrolysis reaction in the system and/or a mixture of the produced hydrogen and the first combustion fuel). The system may be configured to operate in continuous/steady state mode, or it may be configured to turn on and off according to a command or signal from an operator, sensor, and/or other automated system. For instance, the system may turn on or off according to heat demand in a building, and can include hardware to communicate with thermostats or other HVAC control systems. Similarly, the system may include a control unit to turn off and start up the unit as required for maintenance.

For ease of reference, the systems and components therein are sometimes described herein with reference to top and bottom, upper and lower, upwards and downwards, and/or horizontal plane, x-y plane, vertical, or z-direction relative to the spatial orientation of the embodiments shown in the figures. It is to be understood, however, that the system and components therein can be moved to, and used in, different spatial orientations without changing the structure and/or function of the disclosed embodiments of the present technology.

Further, although primarily discussed herein as a system for breaking natural gas down into hydrogen gas for local consumption, one of skill in the art will understand that the scope of the present technology is not so limited. For example, the pyrolysis reactors described herein can also be used to break down any other suitable hydrocarbon or hydrocarbon mixture. Accordingly, the scope of the present technology is not confined to any particular subset of embodiments.

Representative systems disclosed herein include regenerative thermal pyrolysis (RTP) reactors and/or combined combustion and pyrolysis (CCP) reactors. RTP reactors typically include at least two reaction vessels or chambers that operate in tandem, with one fully heated vessel carrying out a pyrolysis reaction, while the other vessel is being heated. CCP reactors typically have a common wall or surface between a combustion chamber and a reactor chamber, for example, in a concentric or annular arrangement.

2. Representative Overall Combustion Pyrolysis Systems

FIG. 1 is a block diagram of a system 100 that can produce and/or utilize (e.g., distribute, consume, and/or store) hydrogen gas at a localized scale in accordance with some embodiments of the present technology. In some embodiments, producing and utilizing the hydrogen gas in the system 100 occurs within a single residential home. For example, the system 100 can be implemented as a single appliance positioned in a space previously occupied by conventional natural gas furnaces or burners, and/or can act as a direct replacement for these conventional appliances. In another example, the system 100 can take the form of multiple devices and/or appliances operably connected to each other. Further, in some embodiments, the system 100 produces and utilizes the hydrogen gas at other localized scales. For example, as discussed in more detail below, the system 100 can produce and utilize the hydrogen gas for a single room, a single residential home, a multifamily home, an apartment building, a residential neighborhood, a public building (e.g., a single store, government building, hospital, school, or any other public space), a commercial building (e.g., an office building), a datacenter, or any other suitable space. Because the system 100 produces and utilizes hydrogen gas locally, the system 100 can be implemented to replace and/or supplement existing uses of hydrocarbon fuels (e.g., natural gas, methane, and other hydrocarbons), as well as replace and/or supplement existing sources of electricity, without any overhaul in infrastructure.

In the illustrated embodiment, the overall system 100 includes a reactor system 110, one or more air blowers 118, an electric generation system 120, a circulation system 130, and a cooling system 140 separate from the circulation system 130. The reactor system 110 includes a reactor 112 operably coupled to a fuel supply 10 and a carbon separator 114 operably coupled to the reactor 112. The reactant from the fuel supply 10 includes a hydrocarbon that can be decomposed by the reactor system 110. Examples of suitable reactants include natural gas or methane, gasoline, jet fuel, propane, kerosene, diesel, and/or any other suitable hydrocarbon fuel.

As discussed in more detail below, the reactor 112 receives the reactant and decomposes the hydrocarbon into hydrogen gas and carbon particulates, which are then directed to the carbon separator 114. The carbon separator 114 removes the carbon particulates from the hydrogen gas, thereby producing hydrogen fuel. The carbon separator 114 can direct the carbon particulates to a carbon disposal component 20 (e.g., an emptiable bin), allowing the carbon to be disposed of, stored or resold, while the hydrogen gas can be utilized within the reactor system 110 and/or elsewhere in the overall system 100. For example, in the illustrated embodiment, the reactor system 110 also includes one or more burner(s) 116 operably coupled to one or more air blowers 118 to combust the hydrogen gas. A thermal pathway between the burner(s) 116 and the reactor 112 can communicate the heat generated by combusting the hydrogen gas. For example, the thermal pathway can direct the hot flue gas around and/or through the reactor 112. The reactor 112 receives the heat from the combusting hydrogen gas and uses the heat to decompose further hydrocarbons.

Additionally, or alternatively, the reactor system 110 can direct the hydrogen gas to the electric generation system 120 (where it is consumed) and/or a hydrogen storage component 30 for distribution and/or later consumption. For example, the hydrogen storage component 30 can be drawn on for combustion fuel to reheat the reactor 112 after periods of non-use. For a reactor 112 having a volume of 0.21 cubic feet and formed as an alumina shell, the amount of energy to heat the reactor 112 from room temperature to an operating temperature of about 1000° C. is roughly 720 kilojoules (kJ). This energy can be generated by combusting about 66 standard liters of hydrogen gas, assuming relatively complete utilization of the heat. In another example, hydrogen storage can be used to decouple generating the hydrogen from consuming the hydrogen. That is, the stored hydrogen can supplement and/or replace the stream of produced hydrogen during periods of high demand. In another example, stored hydrogen can be redistributed into a hydrogen grid. The hydrogen grid can be used to charge fuel cells (e.g., fuel cells used later by the system 100, used in automobiles, and/or any other suitable fuel cell), and/or redistribute hydrogen to neighboring apartments, homes, and/or buildings with higher energy demand with minimal additions in infrastructure.

Non-limiting examples of the materials that can be used to store hydrogen include typical gas storage tanks and solid materials such as zeolite, Pd, H3N:BH3, and/or any of the solid materials set out in Table 1 below.

TABLE 1

| Material | $P_{abs}, T_{abs}$ | Storage capacity (wt. %) | Vol. needed to hold 2300 standard liters of $H_2$ (L) |
| --- | --- | --- | --- |
| 60 wt % Mg-Ni | 2 bar, 250° C. | 4 | 1.95 |
| MgH$_2$-5 wt % V | 2 bar, 300° C. | 5 | 2.2 |
| MgH$_2$-0.2 mol % Cr2O3 | 2 bar, 300° C. | 5 | 1.431 |
| MgH$_2$-37 wt % benzene | 0.66 bar, 180° C. | ~1 wt % in 0.5 hr | 15.7 |
| ZrMnNi | ~2 bar, 30° C. | ~0.3 wt % | 9.1 |
| La0.27Mg0.23Ni3.5 | 1 bar, 25° C. | ~1 wt % | 2.6 |
| TiMn$_{1.5}$ | 7 bar, 30° C. | 1.86 | 1.79 |
| Li$_3$N | 1 bar, 255° C. | 10 wt % | 3.7 |

As further illustrated in FIG. 1, the electric generation system 120 also includes one or more burners 116 operably coupled to the air blower(s) 118 to burn the hydrogen gas, and one or more power generators 124 operably coupled to the burner(s) 116 and/or the output from the reactor 112 (e.g., hot gases, hydrogen gas, and/or heat through a physical transfer medium such as a heat transfer fluid). The power generator(s) 124 use the flue gas from the burner(s) 116, the heat from the burner(s) 116, and/or the output from the reactor 112 to generate electricity. In various embodiments, the power generator(s) 124 can include a thermionic converter, a thermophotovoltaic system, an alkali metal thermal energy converter (AMTEC), a fuel cell, an internal combustion engine, a turbine or microturbines, a thermoelectric generator, a steam turbine, and/or a Stirling engine. The electric generation system 120 can then direct the generated electricity into an electric grid 40 for local consumption, local storage, and/or distribution. For example, the electric grid 40 can include a secondary cell that stores a portion of the generated electricity and various electronic appliances in a residential home that consume a portion of the generated electricity. As described above, in some embodiments, more electricity is produced than is consumed in near-point use (e.g., locally). In some such embodiments, the excess electricity is exported to the electric grid 40 and/or stored in secondary fuels for later consumption.

As further illustrated in FIG. 1, the electric generation system 120 can direct the excess hot flue gas and/or heat to the reactor system 110 and/or the circulation system 130. The reactor system 110 can use the non-converted heat and flue gas to help heat the reactor to decompose further hydrocarbons into the hydrogen gas. The reactor system 110 can then direct excess and/or parasitically lost heat to the circulation system 130 (e.g., through the flow of hot gases and/or hot fluids, and/or through a physical transfer medium such as a heat transfer fluid or other suitable heat transfer medium).

In the illustrated embodiment, the circulation system 130 includes a condensing heat exchanger 132 operably coupled to the reactor system 110, a heat sink 134 operably coupled to the electric generation system 120, and a circulation pump 136 operably coupled to the condensing heat exchanger 132 and the heat sink 134. The condensing heat exchanger 132 receives the excess and/or parasitically lost heat from the reactor system 110. The condensing heat exchanger 132 then recycles the heat (e.g., in a boiler, furnace, and/or a similar appliance) to circulate heat into a heating grid 50. For example, the condensing heat exchanger 132 can use the excess heat from the reactor 112 to supply hot water for an apartment building. The heat sink 134 receives the excess and/or parasitically lost heat from the electric generation system 120. The circulation pump 136 then circulates a fluid (e.g., water, air, or another suitable heat transfer fluid) over the heat sink 134 and the condensing heat exchanger 132 to communicate heat from the heat sink 134 to the condensing heat exchanger 132 for additional recycling into the heating grid 50.

As further illustrated in FIG. 1, after the components of the system 100 have extracted heat from the flue gas for various uses, the system 100 can direct the flue gas to an exhaust system 60. In some embodiments, the system 100 replaces the hydrocarbons in the reactant entirely with the hydrogen gas product from the reactor system 110. Accordingly, in these embodiments, the flue gas includes only water vapor, oxygen gas, and/or any other molecules present in the air from the air blower(s) 118 (e.g., nitrogen gas). That is, the flue gas does not include new carbon dioxide molecules that would ordinarily result from burning the hydrocarbons. In some embodiments, the exhaust system 60 utilizes the existing ventilation systems in the space that the system 100 is implemented in (e.g., an existing ventilation system to direct carbon dioxide away from a furnace).

As further illustrated in FIG. 1, the electric generation system 120 can direct heat and/or electricity into the cooling system 140. The cooling system 140 utilizes the heat and/or electricity to circulate cold air. In various embodiments, the cooling system 140 can include an absorption chiller, a compression air conditioner, and/or a heat pump. In some embodiments, the cooling system 140 is operably coupled directly the reactor system 110 to receive hydrogen gas and/or heat (not shown). In such embodiments, the cooling system 140 utilizes the hydrogen gas and/or heat to drive any of the cooling system components described above. Further, in some embodiments, the cooling system 140 can be integrated with and/or into the circulation system 130.

In some embodiments, the reactor system 110 and/or the electric generation system 120 can direct heat and/or electricity to a heating component and/or a cooling component in a unidirectional manner, e.g., without circulating a fluid. For example, the heating component (e.g., the condensing heat exchanger 132) can receive heat from the reactor 112, transfer the heat into a fluid (e.g., water, air, or another suitable fluid), and direct the heated fluid into the heating grid 50 without receiving a fluid back. In a specific example, the heating component can receive heat from the reactor 112, transfer the heat into water from an outside supply, and direct the hot water into a residential space. The used hot water then drains into a sewage and/or greywater disposal system rather than circulating back into the circulation system 130. In another specific example, the cooling component can receive heat and/or electricity from the power generator(s) 124, use the heat and/or electricity to drive a cold air generator, and direct the cold air into a residential space. The cold air can then dissipate in the residential space while the cooling component can pull new air for cooling from an outside source.

In various embodiments, the reactor system 110, the electric generation system 120, the circulation system 130, and/or the cooling system 140 can include one and/or more sensors 142 to collect data associated with the components of the system. For example, the sensors can measure a weight and/or optical characteristic of the solid carbon produced by the reactor system 110. The data from these sensors can then be used to generate a report on the amount of carbon removed from the reactant, allowing users to access carbon credits or carbon reduction payments (e.g., from state, federal, and/or commercial carbon markets). The data can also be used to alert the user that the carbon disposal component 20 is full (or close to full), prompting the user to empty the carbon disposal component 20.

In some embodiments, the sensors can measure electrical characteristics at the reactor 112 (e.g., conductivity, frequency-dependent conductivity, electrical impedance spectroscopy, and/or any other suitable characteristics). In some embodiments, the sensors can perform ultrasound measurements to determine reactant flow through the reactor 112 and/or a build-up of carbon within the reactor 112. In some embodiments, gas flow rate sensors can determine a ratio of reactant (e.g., methane) to a product (e.g., hydrogen) flowing out of the reactor 112. In such embodiments, the ratio can indicate the extent/efficiency of the pyrolysis reaction occurring within the reactor 112. In some embodiments, thermocouples and/or other temperature sensors measure the temperature of the reactor 112, the flue gas from the burner(s) 116, the power generator(s) 124, the condensing heat exchanger 132, and/or any other suitable component of the system 100. In some embodiments, hydrogen gas sensors (e.g., sensors that pass a current through palladium wires) monitor the reactant conversion and/or hydrogen production rate.

In some embodiments, the system 100 includes a controller 150 operably coupled via input/output (I/O) links to the sensors and various components of the system. Based on any of the measurements discussed above, the controller 150 can adjust the operation of the system 100. For example, the controller 150 can adjust the input flow of the reactant and/or the operating temperature of the reactor 112 based on the ratio of reactant to hydrogen gas measured at the exit of the reactor 112 (e.g., to increase/decrease the amount of hydrogen in the ratio). In some embodiments, the controller 150 includes and/or is couped to a memory storing past conditions and hydrogen consumption, as well as a predictive analytics component. Based on any of the measurements discussed above and data from the memory, the predictive analytics component can determine an adjustment for the operation of any of the components in the system 100 and the controller 150 can complete the adjustment. For example, the predictive analytics can determine periods of high and low hydrogen demand and the controller 150 can toggle the reactor 112 on and off (e.g., by starting and stopping the input of the reactant) according to the determined periods.

As discussed above, the system 100 is scaled to produce and utilize the hydrogen gas for a single room, a single residential home, a multifamily home, an apartment building, a residential neighborhood, a public building (e.g., a single store, government building, hospital, school, or any other public space), a commercial building (e.g., an office building), a datacenter, or any other suitable space. The scale can be quantified in terms of typical reactant consumption rates. For example, using methane as the reactant, typical scales include a natural gas flowrate range of from about 500 standard cubic centimeters per minute (sccm) to about 37,500 sccm for a single-family residence (e.g., a standalone house or single unit in a multifamily building); from about 150,000 sccm to about 3,750,000 sccm for a multi-family building with a centralized system 100; and from about 150,000 sccm to about 3,750,000 sccm for a neighborhood with a centralized system 100. In another quantification example, using methane as the reactant, typical scales include a natural gas consumption rate of from about 10 million British thermal units per year (MMBtu/year) to about 164 MMBtu/year for a single-family residence (or from about 15981 Btu/hr to about 18721 Btu/hr); from about 4875 MMBtu/year to about 6300 MMBtu/year for a small multi-family building; from about 9500 MMBtu/year to about 136,189 MMBtu/year for a commercial building (e.g., an industrial site, an office, a campus, an airport, a hospital, a mall, and/or any other suitable commercial building) with a centralized system 100; from about 453,963 MMBtu/year to about 1,232,184 MMBtu/year for a larger multi-family building and/or a neighborhood; and from about 2,468,421 MMBtu/year to about 3,350,000 MMBtu/year for data centers with high power and cooling demands.

FIG. 2 is a table with additional examples of the scales for various applications, as well as the power consumed by specific components of representative systems 100 at the different scales. As illustrated, the table shows the power, heating, cooling, and natural gas required for different embodiments of the system 100 (FIG. 1), as well as the approximate scales for each embodiment in terms of demand and usage. The illustrated scales include: residential, commercial, district, and data center usage and the associated needs for power, heat, and cooling. Accordingly, the table of FIG. 2 provides context to differentiate the needs and system requirements for these embodiments in contrast to the much larger scales used in industrial generation of hydrogen. It will be understood, however, that the values in the table of FIG. 2 are illustrative examples, and that the intention is not to limit the technology to the particular examples that are illustrated.

Returning to FIG. 1, in any of the applications discussed above, the system 100 can include multiple reactors 112 to meet the consumption demands of the space in which the system 100 is deployed. For example, using methane as the reactant, a single reactor can have a $CH_4$ consumption rate of from about 500 sccm to about 172,853,881 sccm, or from about 10 MMBtu/year to about 3,350,000 MMBtu/year. This range is significantly below a typical output for industrialized pyrolysis reactors, even when multiple reactors 112 are used in conjunction. To enable the reactor 112 to operate efficiently at the scales required for localized consumption, especially at the residential level, the reactor includes one or more features to address a number of shortcomings.

First, the carbon produced by the pyrolysis reaction in typical embodiments can be removed from the reactor 112 and separated from the product stream while balancing safety, efficiency, and convenience concerns. For example, the carbon can be removed from the reactor 112 in ways that provide separation between a user to and the relatively high temperature components of the reactor 112. Further, the carbon can be separated by a system that does not require overly frequent (e.g., hourly, daily, weekly, etc.) upkeep, so that the user (e.g., a residential consumer) will be more willing to adopt the reactor. In another example, the carbon can be separated by a system that does not consume much power, to avoid reducing the efficiency of the system 100 below a useful level. Accordingly, in various embodiments, the reactor system 110 can include features that help address these concerns.

Second, because of the cyclical and/or uneven demand for heat and electricity in a residential and/or single building setting, the output of the reactor 112 may need to be frequently modulated. In some embodiments, the target modulation scale is on the order of minutes to hours. Further, in some embodiments, the modulation includes periods when no hydrogen gas is demanded (e.g., when a residence is unoccupied during a work day) and when hydrogen gas is demanded at a rate higher than it can be produced by the reactor (e.g., during peak power consumption times).

Third, the reactor 112 may be subject to space constraints. For example, the reactor may be retrofitted into an existing appliance space (e.g., a furnace space). Accordingly, the reactor 112 can include features that allow it to operate efficiently despite the space constraints. Relatedly, the system 100 and/or the reactor 112 can include features that help to reduce and/or minimize parasitic heat loss, thereby increasing (or maximizing) energy efficiency from the reactor 112. For example, as discussed above, the reactor 112 can be coupled to the circulation system 130 to recycle parasitic heat loss in the circulation system 130. Concerns regarding the efficiency of the system 100 and/or the reactor 112 can be especially important in residential scale reactors, since they can have a relatively high surface area-to-volume ratio relative to industrial scale systems, and therefore can have more parasitic heat loss. In addition, the reactor 112 can include monitoring and control schemes that are unique to the residential scale and/or localized consumption of the hydrogen gas product.

In addition, the system 100 can be operated in accordance with different output modes, depending on the specific requirements at a particular time. For example, as illustrated, electricity from the power generator(s) 124 can be directed to the reactor system 110 to power one or more components therein, or the reactor 112 can provide energy for the power generator 124. The electricity produced by the power generator 124 can power heat generators (e.g., resistive coils coupled to the reactor, input valves, output valves, the carbon separator 114, and/or any other suitable component. In the illustrated embodiment, hot flue gas from the power generator(s) 124 is sent directly to the condensing heat exchanger 132 to deliver heat into the circulation system 130.

Figure 3:
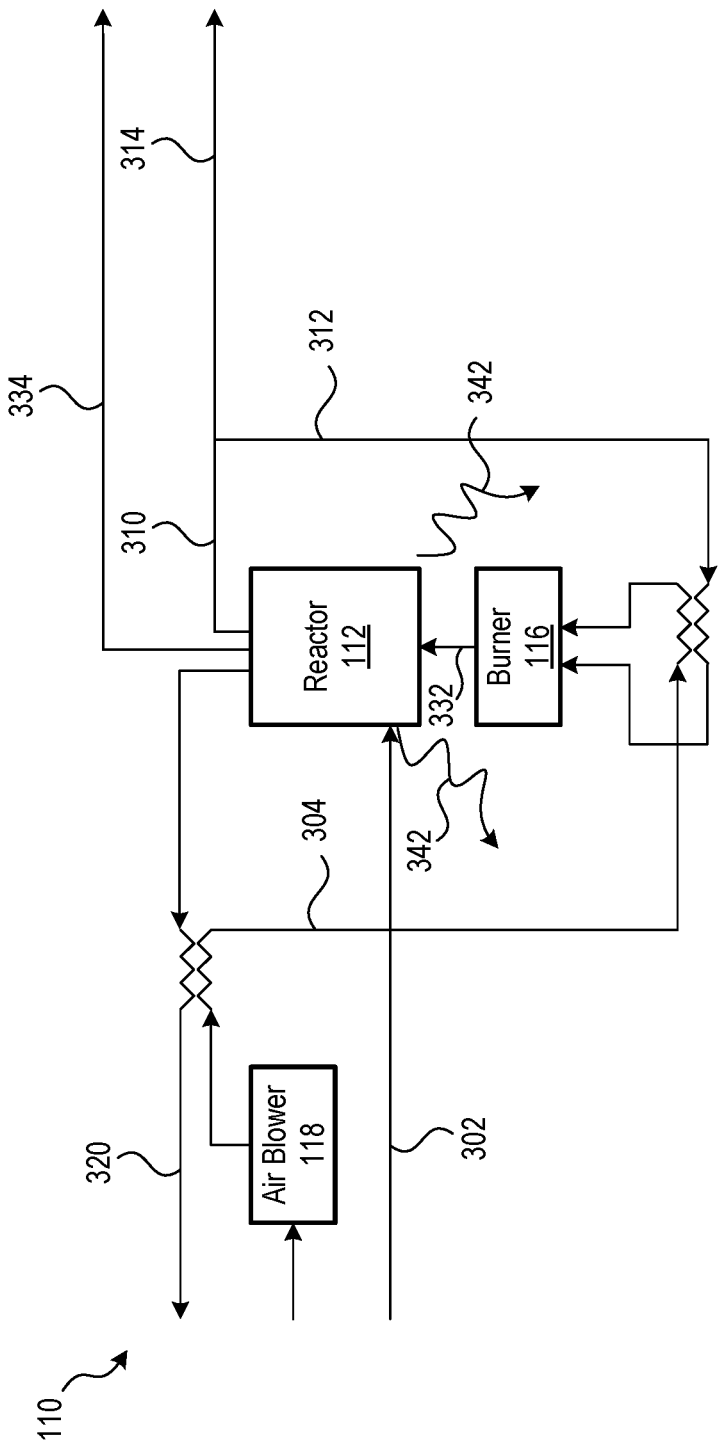
FIG. 3 is a block diagram of reactor system for producing hydrogen gas in accordance with some embodiments of the present technology.

FIG. 3 is a schematic diagram of the flow of materials through a representative reactor system 110 in accordance with some embodiments of the present technology. As illustrated, a reactant enters the reactor along an input path 302. As described above, the reactant can be natural gas, or pure methane. In such embodiments, the input path 302 can be connected to existing gas lines to supply the reactant to the reactor 112. The reactor 112 controllably heats the reactant beyond an enthalpy point, which represents the minimum energy for any amount of the pyrolysis reaction to occur (e.g., the reactor 112 provides at least an initiation energy). As a result, the reactor 112 causes a pyrolysis reaction that breaks hydrocarbons in the reactant into hydrogen gas and carbon. For example, for a methane reactor, the pyrolysis reaction is:

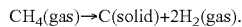

$CH_4(gas) \rightarrow C(solid) + 2H_2(gas)$.

Further, for $CH_4$, the enthalpy of pyrolysis is about 75 kJ per mol of $CH_4$, which causes the $CH_4$ to heat to about 650° C. In some embodiments, to ensure the pyrolysis reaction fully occurs over relatively short residence times (e.g., on the order of seconds), the reactor 112 controllably heats the reactant above about 1000° C. In some embodiments, the reactor 112 is or includes a heated column containing a molten material such as molten metal, molten salt, and/or a combination thereof. The hot liquid can include pure materials or a mixture of multiple materials. In such embodiments, the reactant is delivered into the reactor 112 under the surface of the liquid, for example by a subsurface delivery tube or a porous sparger. The reactor includes a component to cause the reactant to separate into bubbles that are carried to the top of the heated column by their buoyancy. As the bubbles rise, the hot liquid delivers heat to the reactant to cause the pyrolysis reaction described above. In some embodiments, the reactor 112 includes one or more heat storage devices, which can have a reaction chamber in accordance with some embodiments discussed below.

Each reaction chamber includes a heat exchange material and one or more flow paths for the reactant through the heat exchange material. The heat exchange material can be selected based on the material's thermal conductivity, relatively low thermal coefficient of expansion, and/or relatively high thermal stability. In various embodiments, the heat exchange material can include cordierite, mullite, alpha alumina, and/or combinations thereof. As the reactant flows through the flow paths, the heat exchange material delivers heat to the reactant to cause the pyrolysis reaction described above.

As further illustrated in FIG. 3, the output from the reactor 112 is split into a hydrogen path 310 and a carbon path 320 corresponding to the two main products from the pyrolysis reaction. Hydrogen gas is directed into the hydrogen path 310 while carbon particulates are directed to the carbon path 320. As discussed above, the hydrogen in the hydrogen path 310 can be directed back into the reactor system 110 and/or elsewhere in the system 100 (FIG. 1). The carbon path 320 can direct carbon to a disposal system (e.g., the carbon disposal component 20 discussed with respect to FIG. 1). As illustrated, the carbon path 320 can be in fluid communication with the air blower 118 to help ensure the carbon particulates travel all the way to the carbon disposal component 30 (FIG. 1), rather than clogging an outlet from the reactor 112. In some embodiments, the split is accomplished by a carbon separator (described later) that is separate from and in fluid communication with the reactor 112.

In the illustrated embodiment, the hydrogen path 310 can split into first and second hydrogen paths 312, 314. A portion of the hydrogen gas is directed toward the burner 116 in the first hydrogen path 312. The burner 116 mixes and combusts the hydrogen gas in the first hydrogen path 312 with air received from the air blower 118 via an air input path 304 to provide heat to the reactor 112 along heat flow path 332. The heat compensates for parasitic heat loss 342 from the reactor 112 and supplies the energy necessary to heat the reactant beyond the enthalpy point to cause the pyrolysis reaction. Another portion of the hydrogen gas is directed out of the reactor system 110 along the second hydrogen path 314 for any of the purposes described above with reference to FIG. 1. That is, the hydrogen gas directed out of the reactor system 110 along the second hydrogen path 314 can be used to generate heat and/or electricity within the overall system 100 (FIG. 1), can be stored for later use, and/or can be put into further distribution. For example, in a neighborhood or multi-family scale device, the hydrogen gas exiting the reactor system 110 along the second hydrogen path 314 can be delivered to individual homes or units through a pipe system for local consumption.

As further illustrated in FIG. 3, the flue gas from the burner 116 exits the reactor system 110 via a flue path 334 after heating the reactor 112. In some embodiments, the flue path 334 directs gas to other systems for consumption (e.g., to the electric generation system 120 and/or the circulation system 130 discussed above with respect to FIG. 1). In some embodiments, the flue path 334 directs gas to an exit to be emitted (e.g., into the exhaust system 60 discussed above with respect to FIG. 1).

Figure 4:
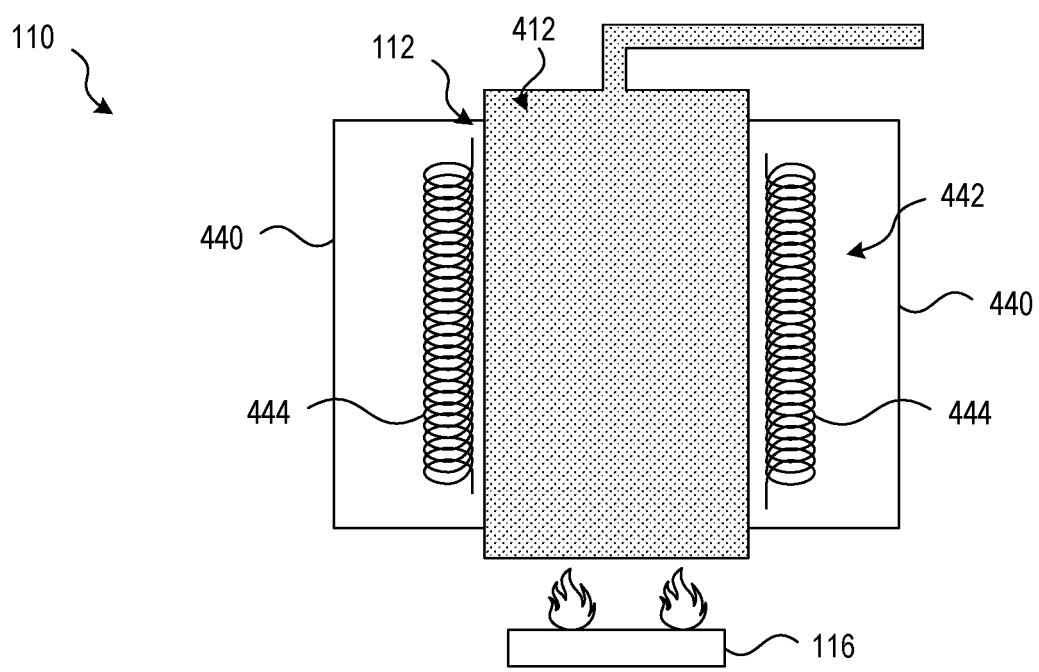
FIG. 4 is a schematic diagram of a reactor system having integrated heating features in accordance with various embodiments of the present technology.

FIG. 4 is schematic diagram of a reactor system 110 that includes one or more quick-heating features integrated into the reactor 112 in accordance with embodiments of the present technology. The main body 412 of the reactor 112 can be enclosed by a chamber 440. The chamber 440 includes a space 442 with one or more electrical heaters 444 (two shown). During periods of low demand, the space 442 can be evacuated to reduce parasitic heat loss (e.g., creating an at least partial vacuum). In some embodiments, the internal surface of the chamber 440 is reflective to further reduce parasitic heat loss. When demand begins to rise, the space 442 can be filled (e.g., with air) and the electrical heaters 444 can deliver heat around the main body 412 while the burner 116 delivers heat into the main body 412 to quickly reheat the reactor 112. In some embodiments, the electrical heaters 444 deliver heat around the main body 412 during periods of low demand to further reduce the parasitic heat loss. Further, in some embodiments, the chamber 440 includes a power generator (e.g., a thermoelectric generator) that captures a portion of the parasitic heat loss. In some such embodiments, the captured parasitic heat loss is then used to power the electrical heaters 444 to reheat the reactor.

3. Representative Regenerative Thermal Pyrolysis Systems

In some embodiments, the reactor can have a regenerative configuration. Such reactors may be referred to herein as regenerative thermal pyrolysis (RTP) reactors. Such reactors typically include at least two reaction vessels or chambers that operate in tandem, with one fully heated vessel carrying out a pyrolysis reaction, while the other vessel is being heated. When the heat in the first vessel is depleted, the reaction shifts to the now-fully-heated second vessel, while the first vessel is re-heated.

Figure 5:
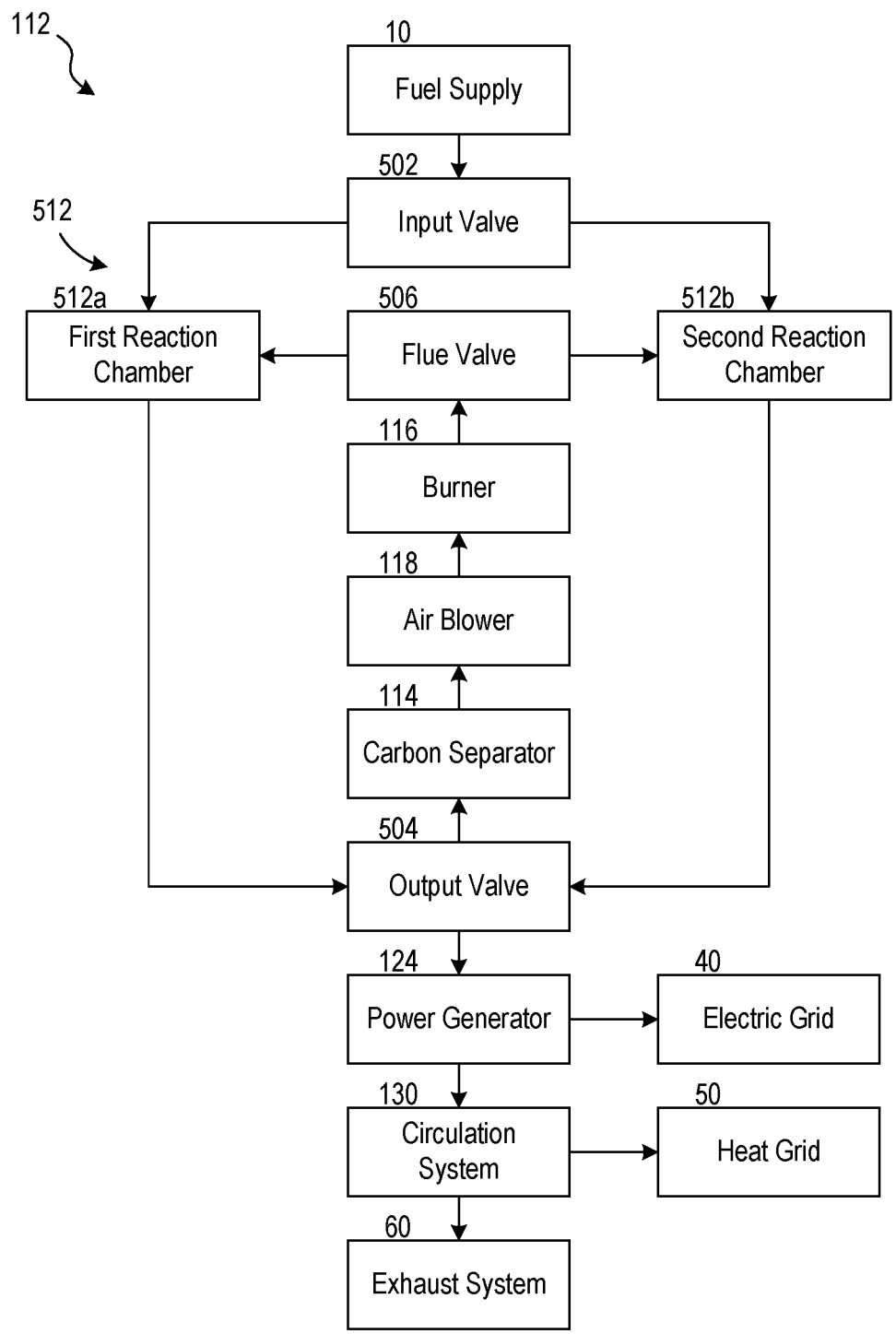
FIG. 5 is a block diagram of a representative reactor system for producing hydrogen gas in accordance with some embodiments of the present technology.

FIG. 5 is a block diagram illustrating the flow of materials through a representative regenerative pyrolysis reactor 112 in accordance with embodiments of the present technology. In the illustrated embodiment, the reactor 112 includes an input valve 502 operably coupled to the fuel supply 10, two reaction chambers 512 (referred to individually as first reaction chamber 512a and second reaction chamber 512b) operably coupled to the input valve 502, and one or more output valves 504 operably coupled to the reaction chambers 512. Each of the reaction chambers 512 can include a heat exchange material and one or more flow paths through the heat exchange material. In various embodiments, the heat exchange material can include cordierite, mullite, alpha alumina, and/or combinations thereof. Further, in some embodiments, each of the reaction chambers 512 has a unitary and/or monolithic structure defined by the heat exchange material. As a reactant flows through one of the reaction chambers 512, the heat exchange material heats the reactant above the enthalpy point for the pyrolysis reaction, thereby causing hydrocarbons in the reactant to break down into hydrogen gas and carbon particulates. The hydrogen gas can then be used to generate heat and/or electricity. In some embodiments, the hydrogen gas is burned to preheat and/or maintain the heat of the reaction chambers 512.

As introduced above, the reaction chambers 512 operate in a cyclical manner. For example, during a first time period, the input valve 502 can direct a reactant into the first reaction chamber 512a. The first reaction chamber 512a can support the pyrolysis reaction, breaking the reactant down into carbon particulate and hydrogen gas. The output valve 504 can then direct at least a portion of the output from the first reaction chamber 512a to the carbon separator 114, the air blower 118, and the burner 116. As described above, the carbon separator 114 can remove the carbon particulates from the flow of hydrogen gas, the air blower 118 can mix the hydrogen gas with oxygen, and the burner 116 can combust the hydrogen with the oxygen. A flue valve 506 can then direct the resulting hot flue gas into, and/or otherwise in thermal communication with, the second reaction chamber 512b to heat the second reaction chamber 512b. In some embodiments, the hot flue gas causes carbon within the second reaction chamber 512b to combust, further delivering heat to the second reaction chamber 512b. The output valve 504 can direct the hot flue gas flowing out of the second reaction chamber 512b toward the power generator 124 and/or the circulation system 130. The power generator 124 can use the hot flue gas to generate and output electricity into the electric grid 40, while the circulation system 130 can use the hot flue gas to output heat into the heating grid 50. Any remaining flue gas is then emitted though the exhaust system 60.

During a second time period, the valves 502, 504, and 506 can be reset to utilize the heat transferred into the second reaction chamber 512b to cause the pyrolysis reaction, and to reheat the first reaction chamber 512a. That is, the input valve 502 directs the reactant into the second reaction chamber 512b, the output valve 504 directs at least a portion of the hydrogen gas from the second reaction chamber 512b towards the burner 116, the flue valve 506 directs the hot flue gas into thermal communication with the first reaction chamber 512a, and the output valve 504 directs the hot flue gas from the first reaction chamber 512a towards the power generator 124 and/or the circulation system 130.

In some embodiments, the reactor 112 cycles the reaction chambers 512 between an active stage and a preheating stage (e.g., by switching from directing the reactant into the first reaction chamber 512a to directing the reactant into the second reaction chamber 512b) after a suitable amount of time. For example, in various embodiments, the reactor 112 can cycle between the reaction chambers 512 every minute, every two minutes, every ten minutes, every thirty minutes, or after any other suitable period. In some embodiments, the reactor 112 cycles between the reaction chambers 512 when the temperature in the active reaction chamber (e.g., the reaction chamber causing the pyrolysis reaction) falls below a predetermined point. The predetermined point can be selected to help ensure the reactant sufficiently reacts while in the active reaction chamber. Below the predetermined point, the reactant may not react fast enough within the active reaction chamber and/or may not react at all. In various embodiments, the reactor 112 can cycle between the reaction chambers 512 when the temperature in the active reaction chamber falls below about 1200° C.

In some embodiments, the inputs and outputs of the reaction chambers 512 can be connected to the valves 502, 504, and 506 by a piping system and the valves 502, 504, and 506 can be coupled to actuators to toggle the valves 502, 504, and 506 to direct the flow of fluids through the pipes. Accordingly, the reactor 112 can cycle between the reaction chambers 512 by instructing the switches to toggle the valves 502, 504, and 506. As a result, the reactor 112 can cycle between the reaction chambers 512 in a fast, efficient manner, depending on the time it takes the valves to change position. In various embodiments, the reactor 112 can cycle between the reaction chambers 512 in less than a minute, less than thirty seconds, less than ten seconds, or nearly instantaneously. In some embodiments, each of the valves 502, 504, and 506 can toggle simultaneously. In some embodiments, one or more of the valves 502, 504, and 506 can toggle sequentially. For example, the output valve 504 can toggle after all of the hydrogen gas from the active reaction chamber is directed to the appropriate destination.

The output valve 504 can direct a portion of the hydrogen gas from the active reaction chamber away from the reactor 112, e.g., to the power generator 124 to produce electricity, and/or to a hydrogen storage facility. In some embodiments, the stored hydrogen gas can later be used to heat one or more of the reaction chambers 512. In some such embodiments, the use of stored hydrogen allows the reactor 112 to cool between periods of high use without requiring another source of energy (e.g., heat and/or electricity) to restart the reactor 112.

The reactor 112 can include one or more additional components, and/or an alternative arrangement of one or more of the components discussed above. In some embodiments, for example, the carbon separator 114 can be positioned between the reaction chambers and the output valve 504. In some embodiments, the reactor 112 can include multiple output valves 504, multiple carbon separators 114, and/or multiple burners 116. Further, in some embodiments, one or more of the components of the reactor 112 are combined. For example, the burner 116 can be integrated with the air blower 118 in a single component. In another example, one or more of the valves 502, 504, and 506 can be combined in a single component. In some embodiments, the reactor 112 can include more than two reaction chambers 512, such as three, four, five, ten and/or any other suitable number of reaction chambers 512. In some such embodiments, two or more reaction chambers 512 are active (e.g., used to heat the reactant) during operation of the reactor 112. In some such embodiments, two or more reaction chambers 512 are preheating during operation of the reactor 112.

Figure 6:
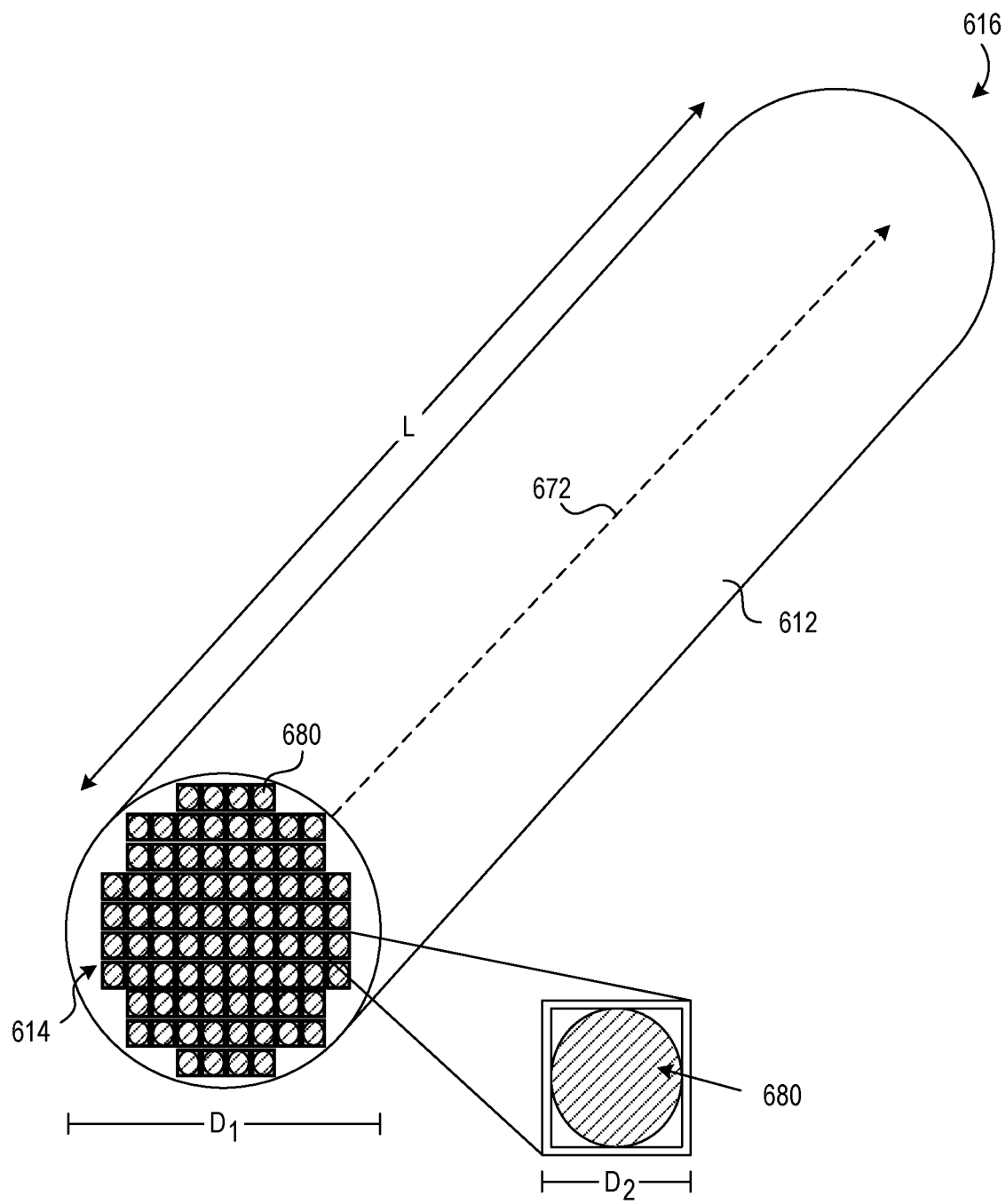
FIG. 6 is a schematic diagram of a reaction chamber for use in the reactor system of FIG. 4 in accordance with some embodiments of the present technology.

FIG. 6 is a partially schematic diagram of a reaction chamber 612 for use in the reactor 112 of FIG. 5 in accordance with some embodiments of the present technology. In the illustrated embodiment, the reaction chamber 612 includes multiple flow channels 680 extending from a first end 614 of the reaction chamber 612 to a second end 616 of the reaction chamber 612 opposite the first end 614. Together, the flow channels 680 define a pathway 672 through the heat exchange material of the reaction chamber 612. Accordingly, during operation, the reactant can flow into the flow channels 680 at the first end 614, along the pathway 672, and out of the flow channels 680 at the second end 616. The reaction chamber 612 can transfer heat to the reactant traveling along the pathway 672, thereby causing the pyrolysis reaction to occur.

In the illustrated embodiment, the reaction chamber 612 has a circular tube shape. In various other embodiments, the reaction chamber 612 can have other cross-sectional shapes, such as square, rectangular, hexagonal, and/or other tubular shapes, e.g., a coil or other non-axial shape, and/or any other suitable shape. Similarly, in the illustrated embodiment, each of the individual flow channels 680 has a circular tube shape. In various other embodiments, the flow channels 680 and reaction chamber 612 can have other cross-sectional shapes, such as square, rectangular, hexagonal, and/or other tubular shapes, e.g., coils, and/or any other suitable shape. The reaction chamber 612 can be produced by various known manufacturing techniques. For example, the reaction chamber 612 can be produced by an additive manufacturing process (e.g., three-dimensional printing), a die process, molding process, an extrusion process, and/or any combination of such manufacturing techniques.

As illustrated in FIG. 6, the reaction chamber 612 has a length L corresponding to the length of the pathway 672, and a diameter $D_1$. As further illustrated, each of the flow channels 680 has a diameter $D_2$. The length L, diameter $D_1$, and diameter $D_2$ can each vary based on a desired output capability for the reaction chamber 612, size requirements for the space the reactor 112 (FIG. 5) will be integrated into, and/or preferred operating conditions for the reaction chamber 612. Further, the dimensions can be interdependent. For example, the diameter $D_1$ can be set according to the diameter $D_2$ and a desired channel density. In another example, the length L can partly depend on the diameter $D_2$ to help ensure that a reactant flowing through the flow channels 680 reaches the enthalpy point within the reaction chamber 612. In various example embodiments, the length L of the reaction chamber 612 can range from about 0.5 meters (m) to about 10 m; the diameter $D_1$ of the reaction chamber 612 can range from about 0.1 m to about 1 m; the diameter $D_2$ of the flow channels can range from about 0.01 centimeters (cm) to about 1 m; and/or the channel density can range from about 1 channel per square inch (CPI) to about 500 CPI. In one embodiment, for example, the length L of the reaction chamber 612 is about 1 m, the diameter $D_1$ of the reaction chamber 612 is about 1.3 cm, the diameter $D_2$ of the flow channels is about 0.635 cm, and the channel density is about 4 CPI.

Additional details on how each of the dimensions can be impacted by operational considerations are set out below. One of skill in the relevant art will understand that the example operational conditions discussed below are examples only, and that the reactor can have various other suitable operational considerations to meet the output demands discussed above. For example, although the reaction chamber 612 is discussed with reactant input flow rates of 1 standard liter per minute (SLPM) and 5 SLPM are discussed below, the reaction chamber 612 can have any other suitable reactant input flow rate.

One consideration for the reaction chamber dimensions is the ability of the reaction chamber 612 to heat the incoming reactant above a desired reaction temperature (e.g., above the enthalpy point or well-above the enthalpy point). For example, for a given heat transfer material, a given temperature of the reaction chamber, and a given surface to volume (S/V) ratio for the flow channel 680 (defined by the diameter $D_2$ of the flow channel 680), the reaction chamber 612 transfers the heat to the incoming reactant at a rate R1. At the heat transfer rate R1, a specific induction time (e.g., the time to heat the reactant above the desired temperature) and a residence time (e.g., reaction time) is required to convert the hydrocarbons in the incoming reactant into hydrogen and carbon via the pyrolysis reaction. Accordingly, at the heat transfer rate R1, the reactant can have a total time requirement to reach a desired extent of conversion in the pyrolysis reaction (e.g., a desired percent of hydrocarbons decomposed). In turn, the length L of the reaction chamber 612 and/or input flow rate of the reactant can be varied to satisfy the total time requirement. Additionally, or alternatively, the S/V ratio can be selected for a set length L to satisfy the total time requirement. In some embodiments, the desired operating temperature can be from about 1200° C. to about 1600° C. In some such embodiments, the residence time required to convert all, or almost all, of the hydrocarbon into hydrogen gas and carbon is on the scale of seconds, including less than one second. In one embodiment, for example, the operating temperature can vary from about 1200° C. to about 1400° C. in a reactor having an inlet flow rate of about 5 SLPM and a diameter $D_2$ of the flow channels of about 1.3 cm, resulting in an induction time of about 0.27 seconds, and a residence time of about 0.38 seconds. For a reaction chamber with a length L of about 1 m, about 90% of the reactant will be converted within the reaction chamber.

Figure 7:
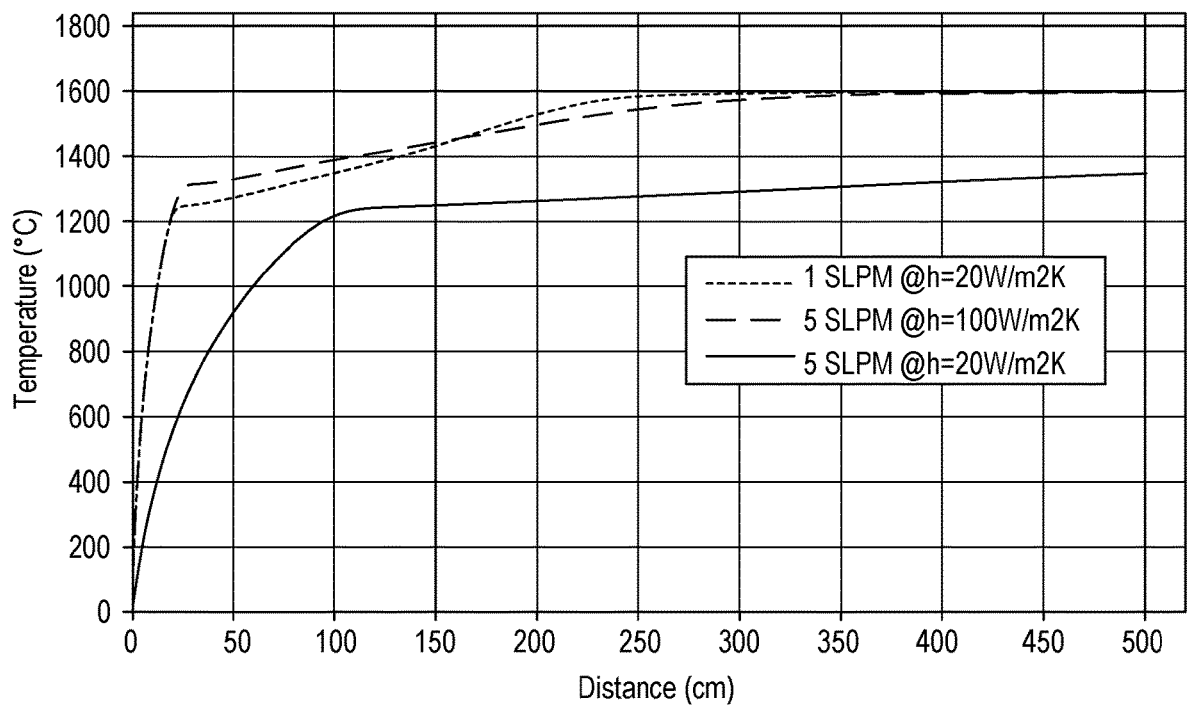
FIG. 7 illustrates a relationship between the length of a reaction chamber and the temperature of the reactant flowing through the reaction chamber for various flow rates in accordance with some embodiments of the present technology.

FIG. 7 illustrates an example of the relationship between the length of the reaction chamber 612 and the temperature of the reactant flowing through the reaction chamber 612 for various input flow rates and varying heat transfer rates. As illustrated, at a first heat transfer rate of 20 watts per meter-squared-Kelvin ($W/m^2K$) and an input flow rate of the reactant of 1 SLPM, the reactant increases in temperature by 1200° C. over a length L of about 40 cm. In contrast, at the first heat transfer rate and an input flow rate of the reactant of 5 SLPM, the reactant increases in temperature by 1200° C. over a length L of about 100 cm. In further contrast, at the input flow rate of the reactant of 5 SLPM and a second heat transfer rate of 100 $W/m^2K$, the reactant increases in temperature by 1200° C. over a length L of about 40 cm. For various embodiments, the inventors have determined that for an input flow rate of varying from about 1 SLPM to about 5 SLPM, a diameter $D_2$ of the flow channels 680 ranging from about 0.5 cm to about 5 cm, and a desired operating temperature increase of about 1000° C., the required length L can vary from about 0.05 m to about 1.3 m.

In some embodiments, the size of the reaction chamber 612 can be further reduced by preheating the reactant before it enters the reaction chamber 612. For example, in some embodiments, the reactant is preheated to a temperature of about 500° C. before the reactant enters the reaction chamber 612. In some embodiments, the reactant is preheated using the hot outputs flowing out of the active reaction chamber and/or the preheating the reaction chamber. For example, an input line for the reactant can include coils that wrap around the output from the active reaction chamber to simultaneously cool the output and preheat the reactant. In another example, as discussed above with respect to FIG. 5, the input line for the reactant can include coils that wrap around the output from the preheating reaction chamber to simultaneously cool the flue gas and preheat the reactant.

Another consideration for the dimensions of the reaction chamber is the ability of the reaction chamber 612 to sustain continuous and/or extended operation. One limitation on such operation is that the heat exchange materials in the reaction chamber 612 cannot withstand relatively high pressure drops between the flow channels 680 at high temperatures (e.g., greater than 1000° C.). Accordingly, the dimensions and the predetermined operating conditions of the reaction chamber 612 can be selected at least in part based on the expected pressure drop across the flow channels 680 during operation.

For example, the pressure drop across the flow channels 680 is dependent on the gas or fluid flow of the reactant, the channel diameter $D_2$, and the channel length (e.g., the length L of the reaction chamber 612). Accordingly, in some embodiments, the diameter $D_2$ of the flow channels 680 and/or the length L of the reaction chamber 612 can be selected to account for the pressure drop across the flow channels 680. For example, the inventors have determined that for a reaction chamber 612 with a length L of about 5 m, a flow channel diameter $D_2$ of between about 0.5 cm to about 1.5 cm, a reactant input flow rate between about 1 SLPM and about 5 SLPM, and an operational temperature of about 1500° C., the pressure drop is less than about 1 pound per square inch (psi), which is within an acceptable range.

Further, in some embodiments, carbon material deposited on the surface walls of the flow channel 680 (also referred to as "fouling") can partially (or fully) clog the flow channels 680 during operation. The reduction in the flow channel diameter $D_2$ due to fouling can affect the dimensions of the reaction chamber 612 selected to meet the pressure drop requirements. For example, carbon particulates can be produced in the reaction chamber 612 as a result of heterogenous and/or homogenous pyrolysis reactions. Heterogeneous reactions based on interactions between the reactant and the hot surface or wall of the reaction chamber 612. In contrast, homogenous reactions occur in the gas phase of the reactant, leading to nucleation and growth of carbon particulates in the gaseous reactant. Carbon particulates produced via homogenous reactions are carried by the gas flow to the second end 616 of the reaction chamber 612. Once out of the reaction chamber 612, the carbon particulates can be collected by a carbon separator, such as a series of cyclones and/or carbon filters. Carbon particulates produced via heterogenous reactions often remain within the flow chamber of the reaction chamber 612, thereby fouling the flow channels 680 over time. The ratio of heterogenous reactions and homogenous reactions is affected by the S/V ratio in the flow channels 680 (determined by the diameter $D_2$ of the flow channels 680) and the reactant's contact time with the walls of the reaction chamber 612. Accordingly, in some embodiments, the diameter $D_2$ of the flow channels 680 is selected to maximize the amount of the pyrolysis reaction that occurs as a homogenous reaction.

Figure 8:
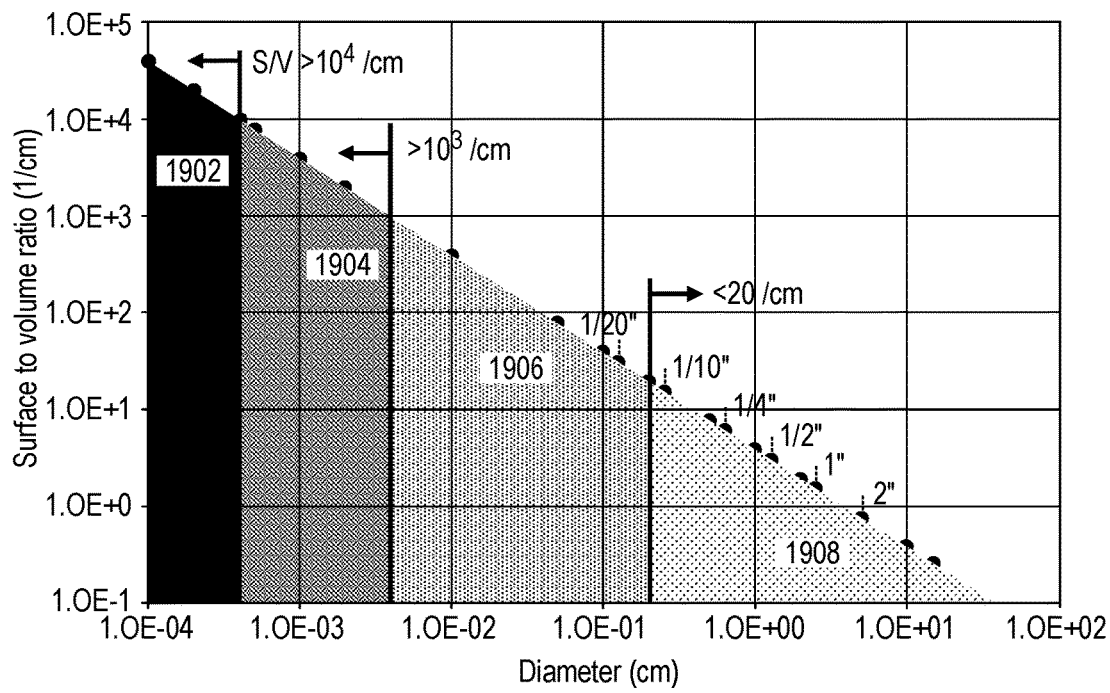
FIG. 8 illustrates an effect of the relationship between the surface-to-volume ratio and the diameter of a flow chamber on the reaction within a reaction chamber in accordance with some embodiments of the present technology.

FIG. 8 illustrates an effect of the relationship between the S/V ratio and the diameter $D_2$ of a flow channel 680 on the type of reaction within the reaction chamber 612 of FIG. 6 for a given input flow rate. In the illustrated relationship, the first region 1902 corresponds to an S/V ratio of between about 10,000/cm and about 1000/cm. In the first region 1902, the pyrolysis reaction is entirely (or almost entirely) a heterogenous reaction. The second region 1904 corresponds to an S/V ratio of between about 1000/cm and about 100/cm. In the second region 1904, the pyrolysis reaction is primarily a heterogenous reactions, with some homogenous reactions beginning to occur. The third region 1906 corresponds to an S/V ratio of between about 100/cm and about 20/cm. In the third region 1906, the pyrolysis reaction is primarily a homogenous reaction, with some remaining heterogenous reactions. The fourth region 1908 corresponds to an S/V ratio of less than about 20/cm. In the fourth region 1908, the pyrolysis reaction is entirely (or almost entirely) a homogenous reaction. Accordingly, in some embodiments, the flow channel diameter $D_2$ can be selected within the fourth region 1908, and therefore have of a diameter $D_2$ about 0.2 cm or above. In such embodiments, fouling can play a minimal role in the pressure drop between flow channels.

Figure 9:
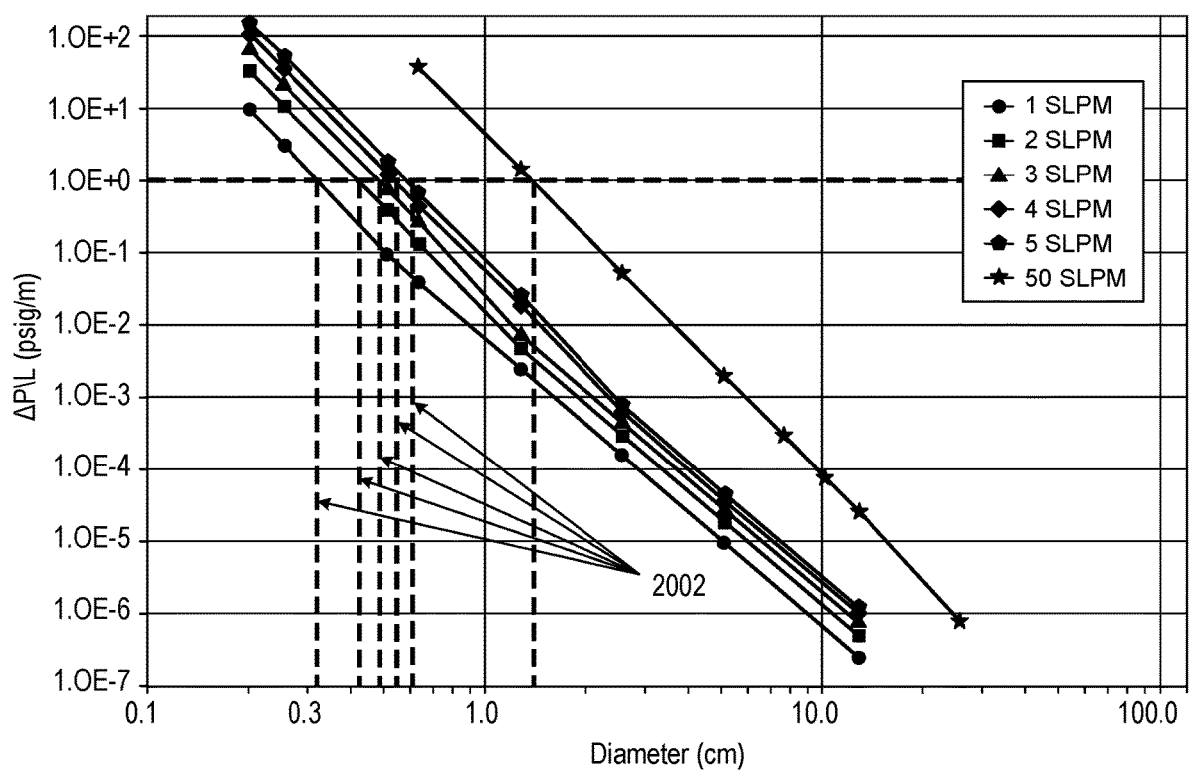
FIG. 9 illustrates representative dimensions for the reaction chamber that satisfy homogenous reaction conditions for a maximum pressure drop across the reactor in accordance with some embodiments of the present technology.

Further, the inventors have determined that the pressure drop for flow channels in the fourth region 1908 all satisfy the pressure drop requirements discussed above (e.g., having less than 1 psig/m pressure drop). For example, FIG. 9 illustrates a relationship between the diameter $D_2$ and the pressure drop across the flow channels for various input flow rates. In FIG. 9, the minimum diameter to remain below 1 psig/m pressure drop indicated by lines 2002. For example, for an input flow rate of 1 SLPM, the minimum diameter indicated by line 2002 is about 0.3 cm. In another example, for an input flow rate of 50 SLPM, the minimum diameter indicated by line 2002 is about 1.1 cm. As indicated by each of the lines 2002, the minimum diameter for each input flow rate is above the 0.2 cm for the fourth region 1908 discussed above with respect to FIG. 8. Accordingly, diameters that satisfy the pressure drop requirements for a 1 psig/m pressure drop will also result in almost entirely homogenous reactions, thereby avoiding pressure drop concerns from fouling.

Figure 10:
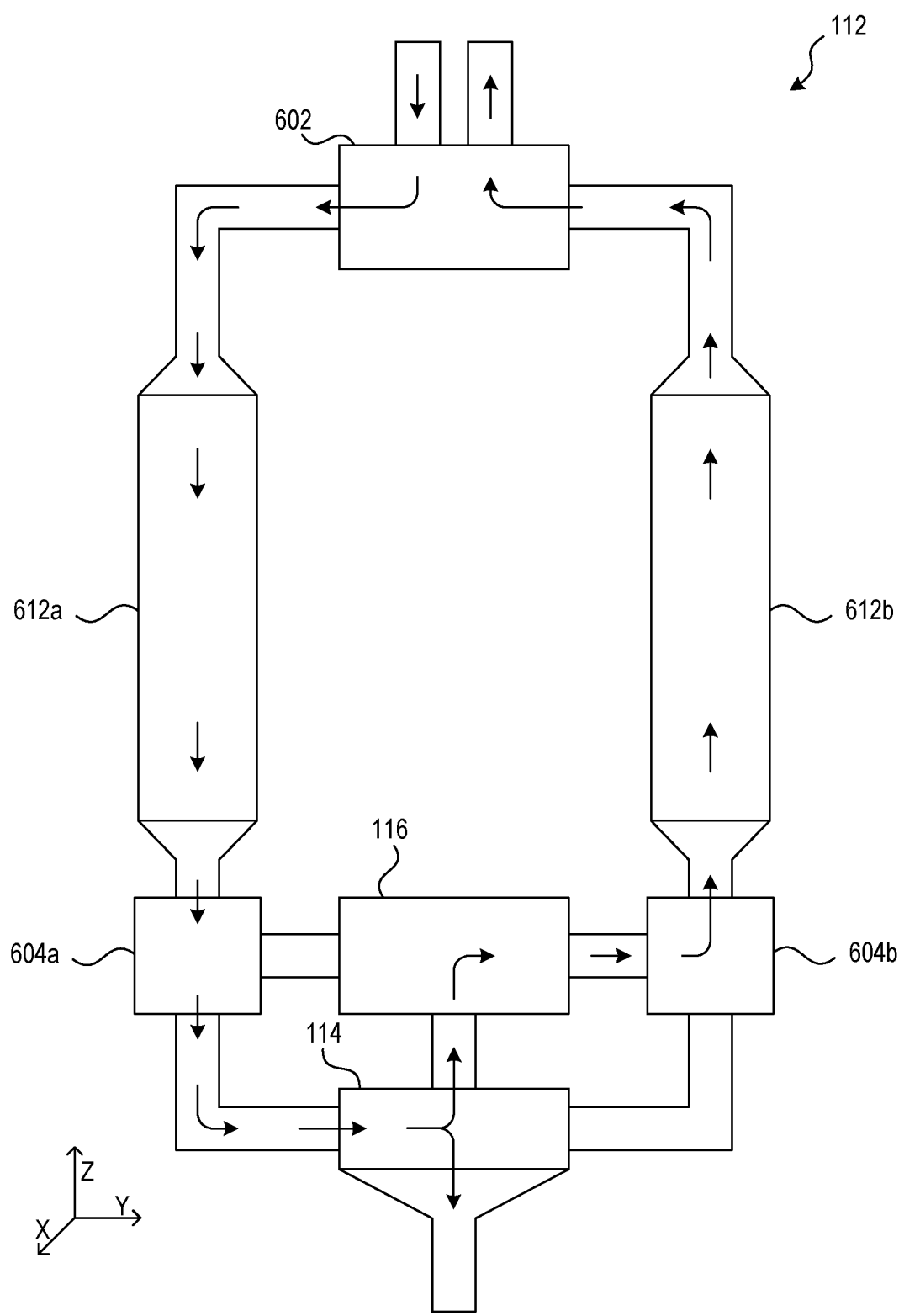
FIG. 10 is a schematic diagram of the reactor system of FIG. 4 having multiple reaction chambers in accordance with some embodiments of the present technology.

FIG. 10 is a partially schematic diagram a reactor 112 of the type illustrated in FIG. 5, configured in accordance with some embodiments of the present technology. For example, in the illustrated embodiment, the reactor 112 includes the input valve 602, two reaction chambers 612, two output valves 604 (referred to individually as a first output valve 604a and a second output valve 604b), a carbon separator 114 and a burner 116. In FIG. 10, the flow of materials through the reactor 112 is indicated by arrows for a first time period, generally in the same manner discussed above with respect to FIG. 5. However, in the illustrated embodiment, the output valves 604 have been combined with the flue valve 506 (FIG. 5) to operate in conjunction. For example, the first output valve 604a directs the output from the first reaction chamber 612a into the carbon separator 114 and the burner 116, while the second output valve 604b directs the flue gas from the burner 116 into the second reaction chamber 612b. During a second time period, the flow of fluids through the reactor 112 is reversed. During the second time period, the second output valve 604b directs the output from the second reaction chamber 612b into the carbon separator 114 and the burner 116, while the first output valve 604a directs the flue gas from the burner 116 into the first reaction chamber 612a.

As further illustrated in FIG. 10, the reaction chambers 612 of the reactor 112 can be oriented in a vertical direction (e.g., along the z-axis). The vertical orientation can help avoid effects from fouling by using gravity to help carry carbon particulates out of the reaction chambers 612. The gravity-assist feature can be important because the carbon particulates can change the effective fluid density and/or velocity, and therefore the fluid's ability to carry carbon out of the reactor even if the carbon is formed entirely by homogenous reactions. The inventors have determined that, for reaction chambers 612 with a superficial gas velocity from about 1 meter per second (m/s) to about 30 m/s, an operating temperature of about 1400° C., and near 100% pyrolysis for a $CH_4$ molecule, the reaction chambers 612 will need to be able to remove about 268 grams per cubic meter ($g/m^3$) of carbon particulates to avoid fouling effects. The inventors have also determined that reaction chambers 612 with a diameter $D_2$ of the flow channels 680 (FIG. 6) between about 1 cm to about 5 cm and a vertical orientation, the carbon particulates will stabilize the flow of gas through the reaction chambers 612 and will be removed from the reaction chambers 612 by the flow of materials therethrough. Further, it is believed that for the diameter $D_2$ of the flow channels 680 (FIG. 6) between about 1 cm to about 5 cm, the carbon will be completely removed from the reaction chambers 612 even for a horizontal reactant flow and/or a vertically-upward reactant flow. Further, the inventors have determined that for flow channels 680 having a larger diameter $D_2$, the pressure drop will be lower. Accordingly, for such flow channels 680, the inventors have determined that larger flow rates are possible while avoiding the pressure drop concern.

As further illustrated in FIG. 10, the input valve 602 can act as an output valve for the preheating reaction chamber (e.g., the second reaction chamber 612b in the illustrated flow) to direct hot flue gases out of the reactor 112. In some embodiments, accordingly, the input valve 602 can include input coils wrapped around output channels from the reaction chambers 612 to use heat from the hot flue gas to preheat the reactant flowing into the reactor 112. Further, in some embodiments, the output line from the reactor can be positioned adjacent the input line to the reactor, also allowing the hot flue gases to preheat reactant flowing into the reactor 112.

4. Representative Combined Combustion and Pyrolysis Systems

Figure 11:
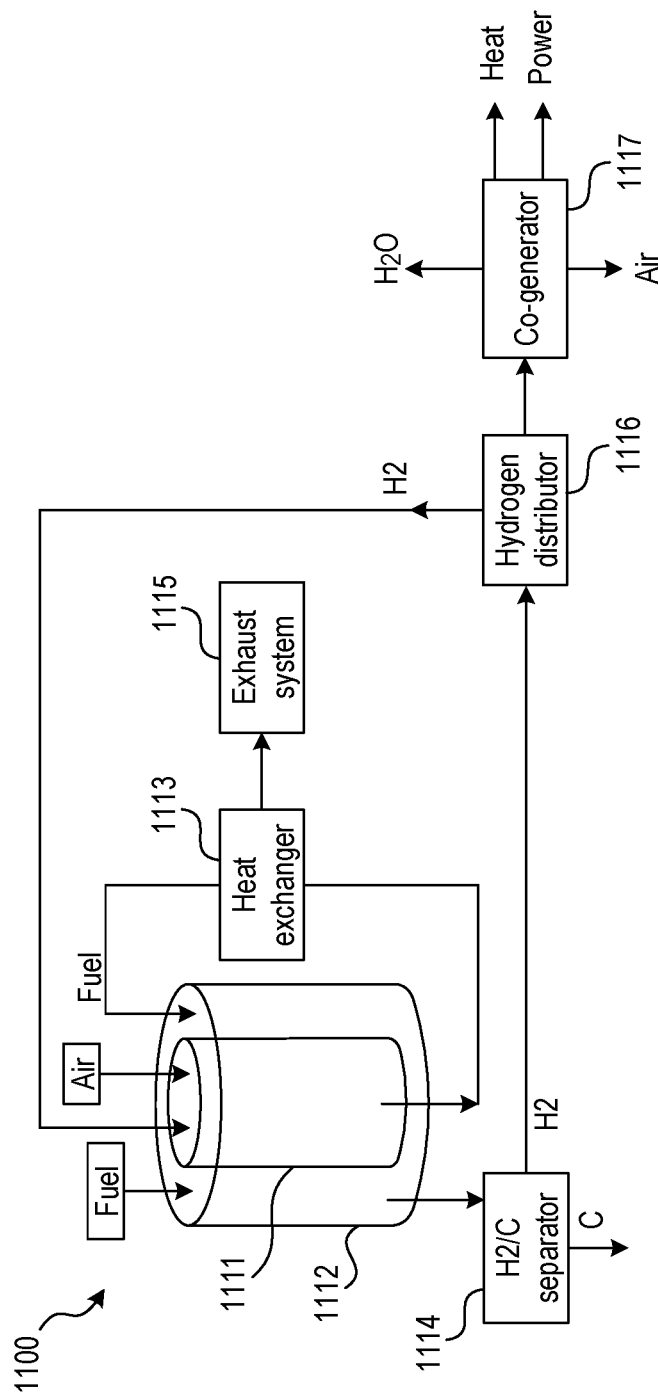
FIG. 11 is a schematic illustration of representative components of a reactor system configured in accordance with embodiments of the present technology.

FIG. 11 is a partially schematic, isometric illustration of a system 1100 configured in accordance with further embodiments of the present technology. Systems of this type are sometimes referred to herein as combined combustion and pyrolysis (CCP) systems, which have a first chamber and a second chamber that are in thermal communication with each other. As a result of the thermal communication, combustion in the first chamber (e.g., a combustion chamber) can heat a reactant in the second chamber (e.g., a reaction chamber) to drive a pyrolysis reaction in the second chamber. The thermal communication can be established by any suitable means. For example, a common wall or surface between a concentric or annular arrangement of the first and second chambers can establish thermal communication therebetween. For example, as shown in FIG. 11, the system 1100 can include a central combustion chamber 1111 (sometimes also referred to herein as a "combustor 1111"), surrounded by an annular reaction chamber 1112 (sometimes also referred to herein as a "reactor 1112"). The combustor 1111 can combust a fuel (e.g., methane, natural gas, hydrogen, and/or another suitable combustible material) with an oxidant (e.g., air, pure oxygen, and/or another suitable oxygen-carrying material) to heat the radially outwardly positioned reaction chamber 1112. A hydrocarbon fuel (sometimes referred to herein as a "reactant" and/or a "reactant fuel"), such as methane or natural gas, is directed into the reaction chamber 1112 and is heated by heat from the combustion in the combustor 1111. The heat causes the hydrocarbon to be dissociated or decomposed via a pyrolysis reaction, resulting in an output that includes hydrogen gas and carbon particulates (including, for example, unreacted hydrocarbon fuel and/or byproduct gases from secondary reactions). A separator 1114 separates the carbon and hydrogen in the output. For example, the separator 1114 can include a screen filter, a baghouse filter, a cyclone separator, a serpentine flow channel, and/or various other suitable structures to remove the carbon particulates from the output. The carbon can then be for any number of purposes, including carbon sequestration.

The hydrogen is directed to a hydrogen distributor 1116, which directs the hydrogen gas to one or more endpoints. For example, as illustrated, a portion of the hydrogen gas can be directed back to the combustor 1111 to continue heating the reactor 1112 (e.g., fully or partially fueling the combustion), while other portions of the hydrogen gas can be directed externally to the system 1100 for other purposes. For example, a portion of the hydrogen gas can be directed to a co-generator 1117 where it is mixed with air and combusted to produce heat and electrical power. In various other examples, portions of the hydrogen gas can be directed to a hydrogen storage device for later consumption, used in a generator (e.g., to only produce electricity), packed into fuel cells (e.g., for later use to power a vehicle), used in fertilizer production, used in various manufacturing processes (e.g., as a carrier gas in electronics manufacturing, as a float gas in glass manufacturing, and the like), and/or used in various other suitable settings.

As further illustrated in FIG. 11, an exhaust stream from the combustor 1111 (e.g., a flue gas from the combustion) can be directed through and/or into contact with a heat exchanger 1113 to transfer heat into the hydrocarbon fuel directed into the reactor 1112. That is, remaining heat in the exhaust stream can be recycled by a recuperator to preheat the hydrocarbon fuel directed into the reactor 1112. By preheating the hydrocarbon fuel, the recuperator can increase the amount of the hydrocarbon fuel that is converted into hydrogen gas and carbon (e.g., by increasing the amount of time the hydrocarbon fuel is above the enthalpy point for the pyrolysis reaction). The relatively cool exhaust can then be directed to an exhaust system 1115 (e.g., similar to the exhaust system 60 of FIG. 1) for disposal, scrubbing, and/or other post-processing functions.

Figure 12:
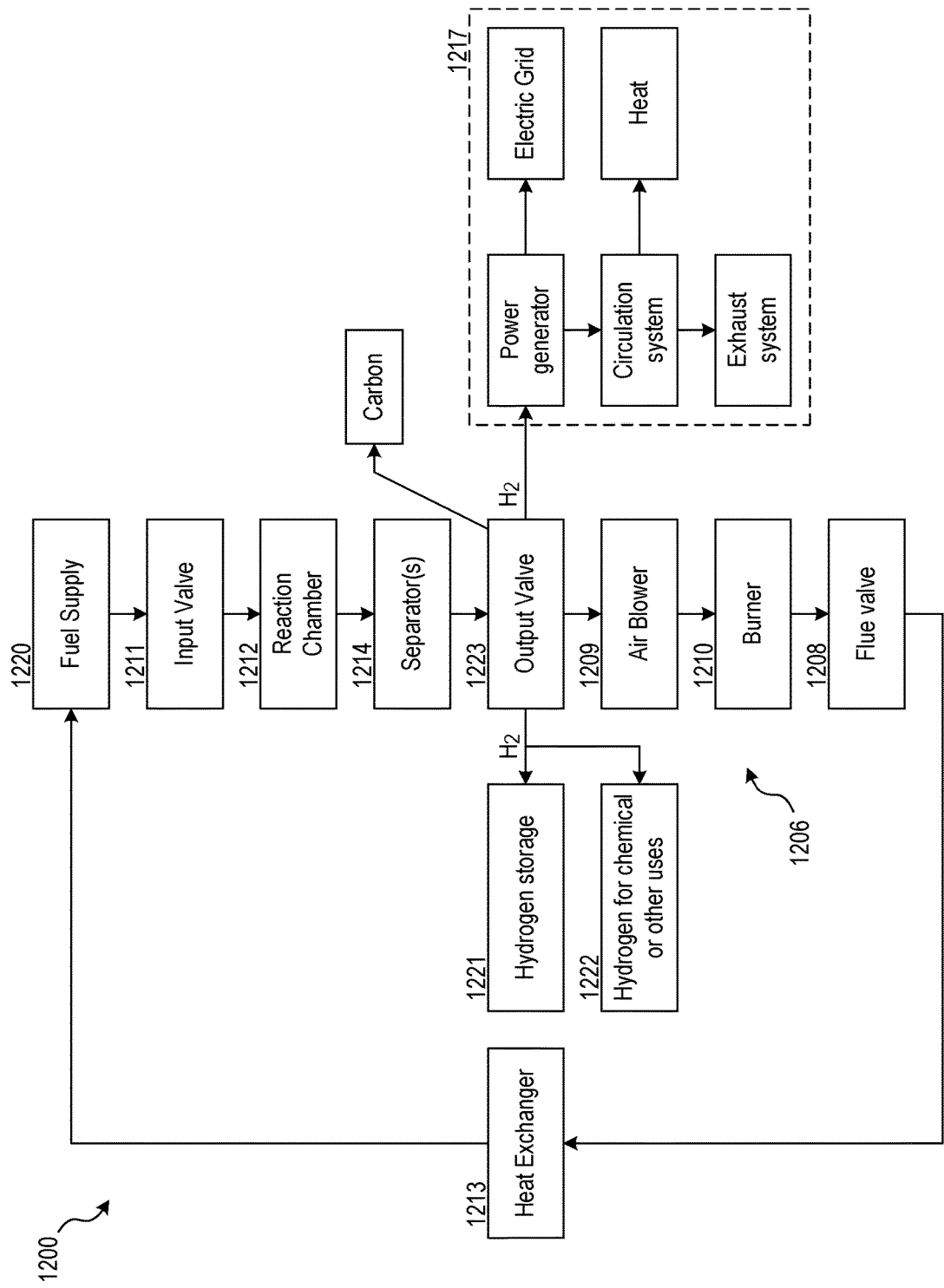
FIG. 12 is a block diagram illustrating representative components of a reactor system configured in accordance with embodiments of the present technology.

FIG. 12 is a block diagram illustrating a representative CCP system 1200 having several of the elements described above with reference to FIG. 11. In particular, FIG. 12 illustrates a fuel supply 1220 that is fluidly coupleable to an input valve 1211 to supply methane, natural gas, and/or another suitable hydrocarbon reactant to a reaction chamber 1212 (e.g., the reactor 1112 of FIG. 11). After undergoing a pyrolytic reaction at the reaction chamber 1212, the reaction products (e.g., hydrogen gas, carbon particulates, unreacted hydrocarbon reactants, and the like) are directed through one or more separator(s) 1214. The separator(s) 1214 can include a carbon separator to remove at least some of the carbon from the output and/or a gaseous separator to remove at least some of the non-hydrogen gases (e.g., unreacted hydrocarbon, byproduct gases, and the like) from the output. The hydrogen in the separated output can then be directed into an output valve 1223 and routed to various destinations.

For example, as illustrated in FIG. 12, a portion (or all) of the hydrogen can be directed to a hydrogen storage facility 1221 and/or can be used for various manufacturing purposes at block 1222. Additionally, or alternatively, a portion (or all) of the hydrogen can be directed to a co-generation facility 1217. The co-generation facility 1217 can include a power generator to combust the hydrogen to generate power (e.g., electricity), which is then directed to an electric grid or other end user. Unconverted (e.g., excess) heat can be directed to a circulation system. The circulation system can include heat exchangers and/or other components to utilize the excess heat for residential and/or other heating applications. Remaining heat/constituents are ultimately directed to an exhaust system.

Additionally, or alternatively, a portion (or all) of the hydrogen can be directed to a combustion component 1206 that includes a burner 1210 (or other suitable combustion initiator, such as an ignitor, a flame holder, a sparker, and the like) and is fluidly coupleable to an air blower 1209 (or other oxidant supply). In some embodiments, the combustion component 1206 can include the air blower. In the combustion component 1206, the hydrogen (and/or any other suitable fuel, such as natural gas) can be mixed with air from the air blower 1209 and introduced to the burner 1210. In some embodiments, the ratio of combustion fuel and oxygen entering the burner 1210 is controlled (e.g., to maintain a stoichiometric ratio). At the burner 1210, the hydrogen-air mixture is combusted, generating heat that is then used to heat the reaction chamber 1212 and the hydrocarbon fuel therein. The exhaust stream from the combustion process (e.g., the flue gas) can then be directed through a flue valve 1208 and to a heat exchanger 1213 in a recuperator. The heat exchanger 1213 can absorb excess (e.g., unused) heat from the flue gas and use the absorbed heat to preheat the hydrocarbon fuel from the fuel supply 1220 before it is introduced into the reaction chamber 1212. Additionally, or alternatively, the heat exchanger 1213 can absorb excess heat from the flue gas and use the absorbed heat to preheat combustion fuel (e.g., hydrogen gas, natural gas, air, and the like) before it is introduced into the combustion component 1206. In some embodiments, the heat exchanger 1213 is a mutual, conductive wall between the flue gas flow (e.g., traveling in an exhaust system) and the hydrocarbon reactant flow entering the reaction chamber 1212 and/or the combustion fuel entering the burner 1210.

In some embodiments, the output valve 1223 can actively distribute the separated output between various destinations. For example, the output valve can have a first position that directs a controlled portion of (or all) of the filtered output to the combustion component 1206, and a second position that directs a controlled portion of (or all) of the filtered output external to the system 1200 (e.g., to the hydrogen storage facility 1221 and/or the co-generation facility 1217). In various embodiments, the first and/or second positions can also controllably distribute a portion of the separated output to any other suitable destination. In some embodiments, the output valve 1223 passively distributes the separated output. For example, the output valve 1223 can include a junction (e.g., a T-junction) that has a first exit positioned to direct the separated output to the combustion component 1206 and a second exit position positioned to direct the separated output external to the system 1200.

Figure 13:
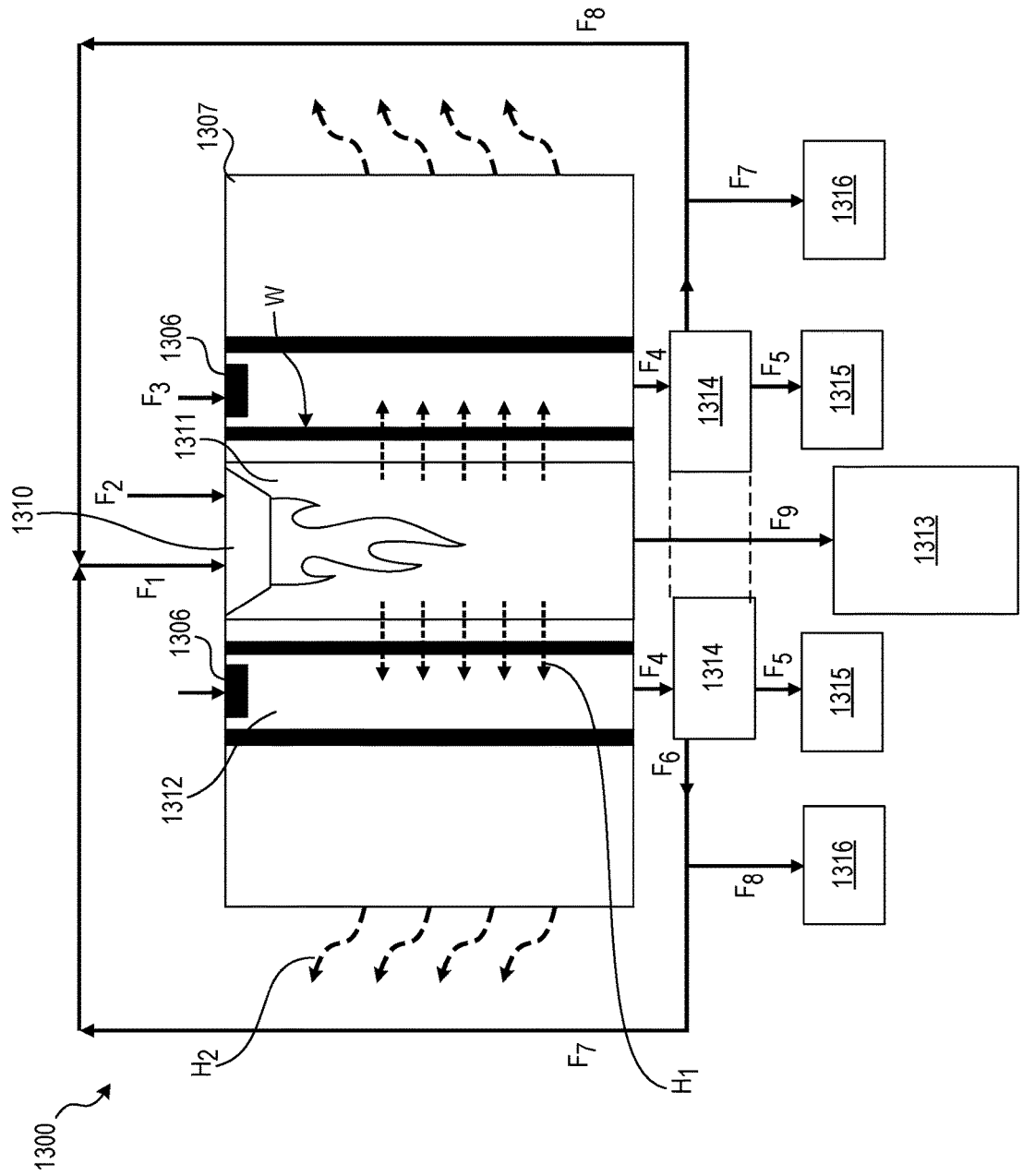
FIG. 13 is a schematic illustration of representative components of a reactor system configured in accordance with further embodiments of the present technology.

FIG. 13 is a schematic cross-sectional illustration of another CCP system 1300 having elements generally similar to those described above with reference to FIGS. 11 and 12. As illustrated, the system 1300 can include two concentric cylinders made of materials selected to withstand high temperatures (e.g., at or above 1000° C.) and communicate heat between the chambers formed therein. In the illustrated embodiment, the inner cylinder forms a combustion chamber 1311 and is equipped with a combustion component 1310 that is coupleable to a fuel supply (e.g., a gas meter) to receive a fuel (e.g., hydrogen, a hydrogen/natural gas mix, pure natural gas or/or other hydrocarbons) along a first flow path $F_1$ and an oxidant (e.g., air, oxygen, and/or another oxygen-bearing constituent) from an oxidant supply along a second flow path $F_2$. The combustion component 1310 then combusts the fuel and the oxidant within the combustion chamber 1311. Further, natural gas and/or other hydrocarbon reactants are introduced in the outer cylinder (e.g., a reaction chamber 1312, sometimes also referred to herein as a pyrolizer) along a third flow path $F_3$. As discussed above with reference to FIG. 12, the input of the hydrocarbon reactants can be controlled by an input valve (see, e.g., FIG. 11). At sufficiently high temperatures, the hydrocarbon reactants dissociate into hydrogen and carbon via a pyrolysis reaction. For example, as discussed above, the pyrolysis reaction for methane in the natural gas is as follows:

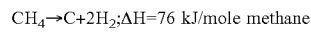

$CH_4 \rightarrow C + 2H_2; \Delta H = 76$ kJ/mole methane

The combustion in the combustion chamber 1311 can heat (or further heat) the hydrocarbon reactants to a sufficiently high temperature. For example, the heat generated by combusting the fuel and oxygen is transferred to radially outward and into the outer cylinder (e.g., the reaction chamber 1312) via radiation and conduction along first heat paths $H_1$ through a shared wall W between the combustion chamber 1311 and the reaction chamber 1312. Further, insulation 1307 (e.g., refractory materials) can reduce the heat losses from the reaction chamber 1312 along second heat paths $H_2$, thereby helping retain heat from the combustion within the system 1300.

The output from the reaction (e.g., $H_2$, residual hydrocarbons, and carbon) exit the reaction chamber 1312 along a fourth flow path $F_4$ and enter a separator 1314. The separator 1314 separates solid particles (e.g., the carbon particulates) from the gaseous hydrogen and left-over gaseous reaction materials in the output. The carbon is then moved (e.g., manually, mechanically, fluidically, and the like) along a fifth flow path $F_5$ to a carbon disposal system 1315. In turn, a first portion of the gaseous products from the reaction chamber 1312 (sometimes referred to herein as the separated output) can then flow out of the separator 1314 along a sixth flow path $F_6$. A portion of the separated output can then return to the combustion component 1310 along a seventh flow path $F_7$ to be combusted in the combustion chamber 1311. A second portion of the separated output can be directed away from the system 1300 along an eighth flow path $F_8$ to be used for variety of purposes as described above (e.g., stored in hydrogen storage devices 1316). It will be understood that the first portion can include any suitable portion of the separated output, such as five percent, ten percent, twenty percent, fifty percent, one hundred percent, and/or any other suitable portion of the separated output. Similarly, the second portion can include any suitable portion of the separated output.

Over time, some of the solid carbon generated by the pyrolysis reaction in the reaction chamber 1312 is deposited and/or accumulates on the walls of the reaction chamber 1312, thereby forming bridges and/or agglomerates. The carbon deposits can lead cause plugging in the reaction chamber 1312, which can over-pressurize the system 1300 and/or can decrease the productivity of the system 1300. Undesirable changes can include changes in temperature and/or pressure, such as by cooling the reactor or shutting it down, or by requiring several parallel systems with some being dormant while others are in use. All the foregoing deleterious changes can result in reduced efficiency, and accordingly embodiments of the present technology that reduce or eliminate such processes can increase efficiency.

For example, various embodiments presented herein describe methods and devices for removing the deposited and/or accumulated carbon on an intermittent or continuous basis, thereby allowing at least pseudo-continuous operation without requiring a significant change to the reactor conditions. For example, a representative carbon removal device includes a plunger or piston 1306 (referred to herein as a "plunger 1306"), various embodiments of which are described in further detail below. The plunger 1306 can move along a longitudinal axis of the reaction chamber 1312 and scrape the walls of the reaction chamber 1312 as it moves. The scraping motion loosens, breaks away, and/or otherwise removes the carbon deposits, thereby reducing the deleterious changes discussed above.

The concentric configurations shown in FIGS. 11 and 13 allow for an increased (e.g., maximum) use of heat. For example, combustion heat losses via radiation/conduction from the inner cylinder to the neighboring outer cylinder are directly used to feed the endothermic pyrolysis reaction carried out in the outer cylinder. Further, the heat from the inner cylinder can only flow radially outward through the reaction chamber 1312. In turn, the insulation 1307 radially surrounds the reaction chamber 1312, reducing heat losses via radiation/conduction radially outward from the reaction chamber 1312. Thus, the heat from the combustion in the inner cylinder can effectively heat the hydrocarbon reactants in the outer cylinder.

The flue gas exiting the combustion chamber 1311 typically includes $H_2O$, $N_2$, residual $H_2$, residual hydrocarbon fuel, and trace amounts of NOx, SOx, $CO_2$, and/or CO. The flue gas can carry heat that is not communicated to the reaction chamber 1312 (sometimes referred to herein as "excess heat" and/or "unused heat") out of the combustion chamber 1311 along a ninth flow path $F_9$. The excess heat in the exit stream can be at least partially recovered via a heat recuperator 1313 to preheat the hydrocarbon reactant entering the reaction chamber 1312 and/or the combustion fuel (e./g., air, hydrogen, natural gas, and/or another hydrocarbon fuel) entering the combustion and/or reaction chambers. By preheating the hydrocarbon reactant, for example, the recuperator 1313 can increase the efficiency of the system 1300. For example, the preheated hydrocarbon reactant can reach the pyrolysis temperature more quickly in the reaction chamber 1312 and therefore have more time for the pyrolysis reaction to complete before exiting the reaction chamber 1312. As a result, the output from the reaction chamber 1312 can include a greater ratio of hydrogen gas and carbon to unreacted hydrocarbons. In another example, preheating the combustion fuel can reduce the input heat required to cause a combustion, thereby using the excess heat to reduce the input energy for the combustion component. Alternatively, in some embodiments, plasma can be used to preheat the streams to a target temperature for faster kinetics.

During a startup phase, the system 1300 may operate by combusting stored hydrogen, natural gas (e.g., from a gas meter), and/or other hydrocarbons until the CCP reactor heats up to a suitable temperature to cause the pyrolysis reaction to proceed at a rate sufficient to supply a portion of the hydrogen in the output to the combustion component. At that point, a control unit (coupled to a temperature and/or other sensor) can direct valves (e.g., the output valve 1223 of FIG. 12) and/or other hardware to switch to the recirculation method described above, in which a portion of the hydrogen in the output is combusted to provide heat for the hydrocarbon pyrolysis.

The control system can include any of a wide variety of suitable sensors to control corresponding aspects of the system operation, including the startup phase described above. Sensor(s) can measure the temperature, composition, and/or pressure of any of the gas streams at various points throughout the system, and/or can measure other operational parameters. Data from the sensor(s) can be transmitted to an operator or automated control system, and can be used to control and/or improve (e.g., optimize) the performance of the system, and/or monitor its operation, for instance to inform when preventive maintenance is required. Other sensor(s) or control loop(s) can determine how much of the produced hydrogen to recirculate to the burner/combustion feed stream, and/or how much natural gas to mix into the combustion feed stream, and can actuate one of more valves or other components accordingly to align operation with varying demands for the system 1300 and/or the hydrogen produced by the system 1300 (for instance, during system startup, or to accommodate changes in demand from the end user). Additionally, or alternatively, other sensor(s) or control loop(s) can determine how much carbon has built up in the pyrolysis chamber (indicated, for instance, by a pressure change in particular parts of the system), and actuate/initiate one or more carbon removal mechanisms (e.g., actuate the plunger 1306) to detach (e.g., scrape, remove, abrade, grind, dislodge, and/or clean) at least a portion of the carbon deposits.

A control loop can be used to actuate a carbon removal mechanism periodically, for instance at pre-determined intervals of time, intervals of operational time, and/or intervals of cumulative pyrolysis feed flow. Other sensor(s) or control loop(s) can sense when the carbon collection system is full, and trigger an automated emptying process, or a signal to an operator to conduct such a process. Still further sensor(s) or control loop(s) can adjust the flow rates of combustion gas and pyrolysis gas according to temporally varying demand for hydrogen, heat, or electricity from the end use. For example, the control loop actuates the valves to block additional hydrocarbon reactants from entering the reaction chamber 1312 while the plunger 1306 is actuated (e.g., when the plunger 1306 fully blocks a flow path through the reaction chamber 1312). In another example, the control loop can maintain some (or all) of the flow of the hydrocarbon reactant while the plunger 1306 is actuated. Yet further sensor(s) or control loop(s) can communicate with a co-generation system to sense issues or faults, and turn off the reactor accordingly, or modulate combustion or pyrolysis flow rates accordingly to match demand. Still further sensor(s) or control loop(s) can monitor for safety conditions (for instance leaks) and safely turn off the system or portions of the system. Other sensor(s) or control loop(s) can measure the amount of hydrogen produced and send a signal to an operator, for instance to charge an end user fees based on their consumption of hydrogen.

Figure 14A:
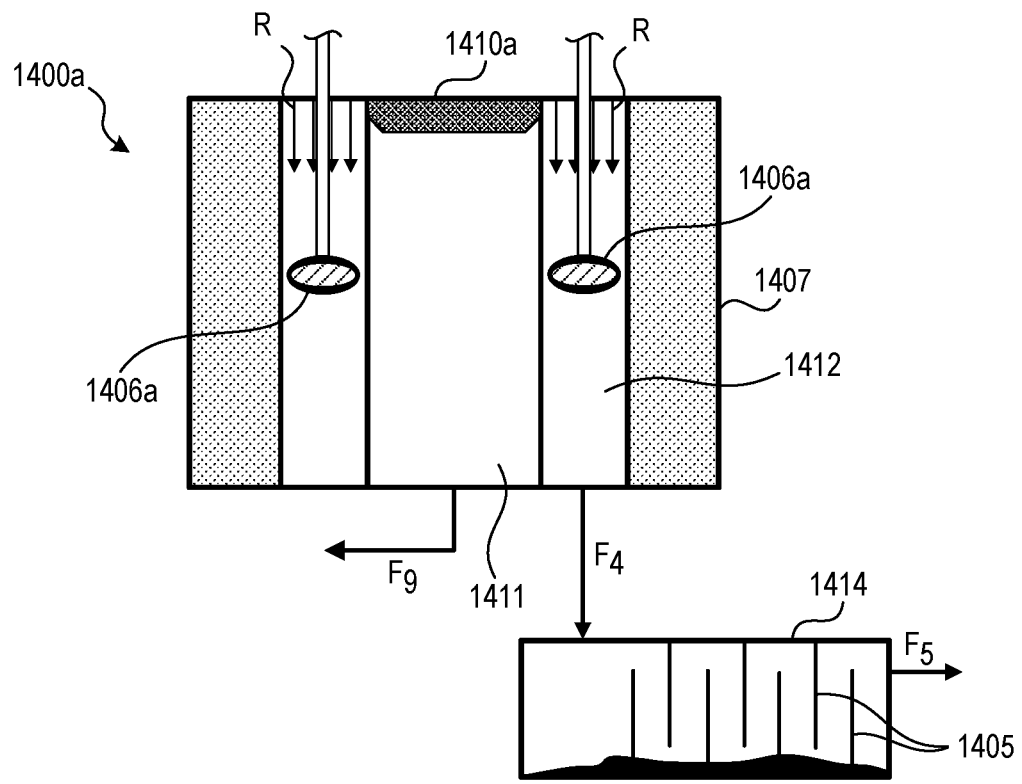
FIGS. 14A-14L are partially schematic illustrations of reactor systems having carbon removal components configured in accordance with embodiments of the present technology.
Figure 14B:
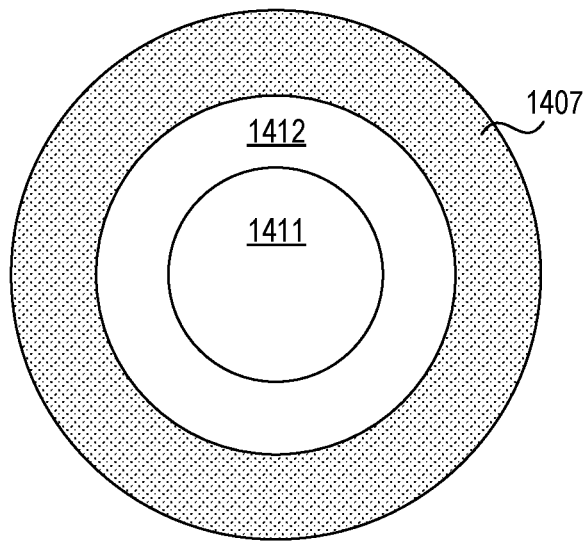

5. Representative Reactor Configurations with Deposited Carbon Removal Systems FIGS. 14A and 14B are a partially schematic cross-sectional view and a top plan view, respectively, of a representative system 1400*a* having a concentric reactor/combustion chamber arrangement. FIGS. 14A and 14B represents a simplified version of the system described above with reference to FIG. 13. As shown in FIG. 14A, the system 1400a can include a central first chamber 1411 that is at least partially surrounded by a concentric second chamber 1412. The second chamber 1412 can be surrounded by insulation 1407 (e.g. one or more solid, liquid, and/or gaseous materials, and/or a vacuum chamber) to reduce or eliminate heat loss from the first and second chambers 1411, 1412. In the illustrated embodiment, the first chamber 1411 is used as a combustion chamber while the second chamber 1412 is used as a reaction chamber. However, as discussed in more detail with reference to FIG. 14C, the utilization can be switched (e.g., the first chamber 1411 can be used as the reaction chamber while the second chamber 1412 is used as a combustion chamber). Returning to the illustrated embodiment, reactant gas(es) (the "reactant") (e.g., hydrocarbon reactants) are introduced to the second chamber 1412 as indicated by arrows R. A combustion component 1410a combusts a fuel (e.g., hydrogen gas, natural gas, and/or any other suitable fuel) to produce the heat required to carry out the pyrolysis reaction in the second chamber 1412. The heat is communicated into the second chamber via conduction and/or radiation through the shared wall of the concentric chambers and into the reactant therein. Once the reactant temperature exceeds the enthalpy point, a pyrolysis reaction decomposes the reactant to produce an output including hydrogen gas and carbon.

It is be understood that, although the flow within the first and second chambers 1411, 1412 is illustrated in a co-current configuration, the flow can also be in a counter-current configuration (e.g., with the flows in the two chambers moving in opposite directions). The second chamber 1412 (e.g., where the pyrolysis reaction generates carbon particulates) can be oriented vertically and have a flow from top to bottom to take advantage of gravity to help remove the carbon. In a co-current configuration of the system 1400a, the combustion component 1410a is also installed at top with flame facing downwards. In this orientation it is much easier to manage the flow of hydrogen gas (and other flue gases) and/or water condensate generated due to the combustion. This allows the system 1400a to maintain a stable flame. However, the co-current arrangement can have a poor heat transfer from the combustion in the first chamber 1411 into the reactant gas in the second chamber 1412, resulting in lower conversions. Additionally, or alternatively, the co-current arrangement may not allow enough residence time to pre-heat incoming natural gas stream, also resulting in lower conversions. In contrast, the counter-current configuration, with the combustion component 1410a located at the bottom of the first chamber 1411 and facing upwards and reactant flowing in the second chamber 1412 from top to bottom, allows better heat transfer for preheating the incoming natural gas by allowing greater residence time for heat exchange and/or greater surface area between hot flue gasses and the reactant. Accordingly, the counter-current configuration can improve overall conversion. However, the counter-current configuration can require a water management and/or removal system to prevent the hydrogen gas and/or water condensate produced by combustion from disrupting the combustion. For example, the counter-current configuration can either maintain a high enough temperature throughout the first chamber (all water remains in vapor phase) or can create a flow path to direct water condensate away from the flame in the combustion component 1410a.

Because, as discussed above, the carbon produced by the pyrolysis reaction in the second chamber 1412 may precipitate onto the walls of the second chamber 1412, the system 1400a can include a movable plunger 1406a. The moveable plunger 1406a can scrape the walls of the second chamber 1412 to loosen, break away, and/or otherwise remove deposited carbon. In various embodiments, the plunger 1406a can be one of multiple plungers, or can have the form of a single, annular plunger. In various embodiments, the plunger 1406a can have a simple scraper arrangement. In other embodiments, the plunger 1406a can include one or more sharpened knife blades to aid in removing the carbon, and/or an optional vacuum pump to aid in the gravity-based process for removing the particulate carbon from the second chamber 1412 and into the separator 1414. In any of these embodiments, the plunger 1406a can move longitudinally within the second chamber 1412 (e.g., upwardly and/or downwardly in the illustrated orientation), while in contact with the walls, to remove deposited carbon. Additionally, or alternatively, the system 1400a can periodically and/or occasionally feed air or another oxidizer into the second chamber 1412 to burn residual carbon.

Carbon products removed by the plunger 1406a are directed to the separator 1414 (e.g., carried by gravity and/or the flow of gases within the second chamber 1412). The separator 1414 can include baffles 1405 that define a serpentine flow path that allows carbon to fall out of the gas-flow and/or various other features (e.g., screens, filters, cyclone separators, other flow-path inhibitors, and the like) to separate the particulate carbon from the output.

The combustion products (e.g., flue gases) can be directed to a recuperator (e.g., into contact with a heat exchanger) to preheat the combustion fuel provided to the first chamber 1411 and/or the reactant provided to the second chamber 1412. Afterward, the combustion products can be directed to an exhaust system.

Figure 14C:
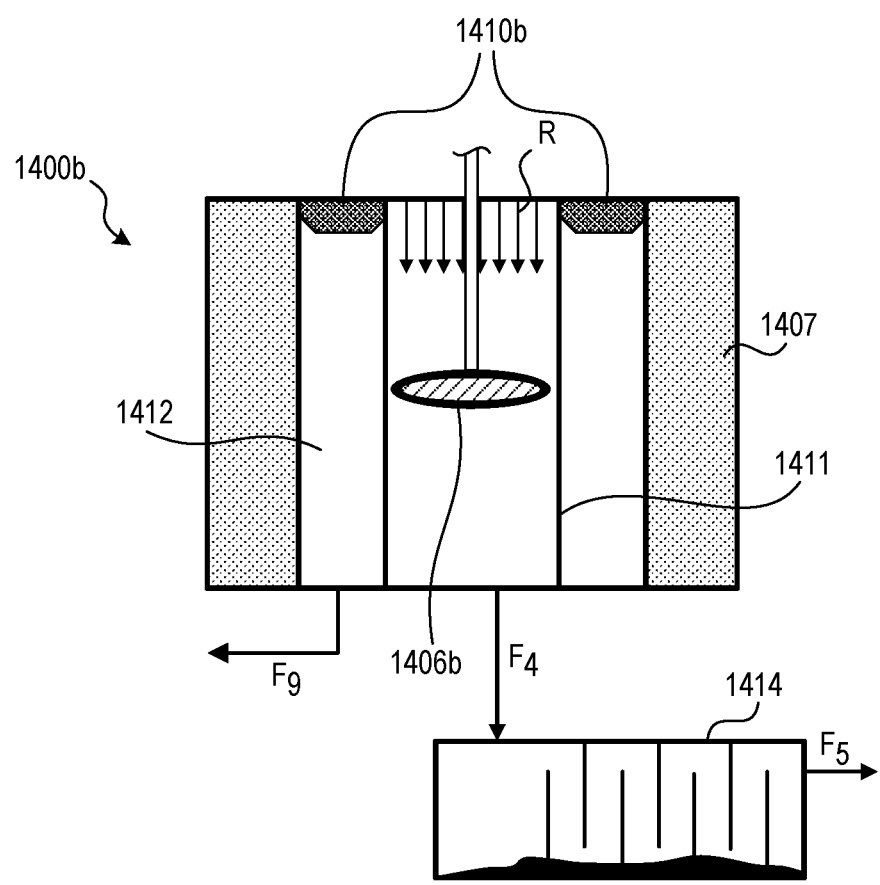

In the representative embodiment described above with reference to FIGS. 14A and 14B, the reaction chamber is positioned concentrically around the combustion chamber. FIG. 14C illustrates a system 1400b in which these positions are reversed. In particular, the first chamber 1411 is positioned in a central location and used as the reaction chamber, while the second chamber 1412 is positioned concentrically outwardly from the first chamber 1411 and used as a combustion chamber. In some such embodiments embodiment, the combustion component 1410b includes a concentric burner, to match the concentric arrangement of the second chamber 1412. In the illustrated embodiment, the combustion component 1410b includes multiple burners (e.g., two, four, five, ten, and/or any other suitable number) positioned circumferentially around the second chamber 1412. In turn, the plunger 1406b can have a simple circular shape, e.g., to match the circular cross-sectional shape of the first chamber 1411.

It will be understood that, for either of the systems 1400a, 1400b described above with reference to FIGS. 14A-14C, the first and second chambers 1411, 1412 can be scaled to meet varying demands. For example, high output systems will generally require chambers with larger diameters than those of lower output systems. In various embodiments, the diameter of the first chamber 1411 can be between about 0.01 meters (m) and about 10 m while the diameter of the second chamber 1412 can be between about 0.1 m and about 20 m (while maintaining a greater diameter than the first chamber 1411). Additionally, or alternatively, the flow rate of the hydrocarbon reactant (and/or the rate of combustion) within first and second chambers 1411, 1412 can be scaled to increase and/or decrease the volume of the output (and the amount of hydrogen gas therein). For example, increasing the flow rate of the hydrocarbon reactant can increase the volume of the output. However, the increasing flow rate can have diminishing returns (e.g., when the heat from the combustion cannot heat the hydrocarbon reactant to a sufficient temperature and/or at a sufficient rate, the amount of hydrogen gas in the output may be insufficient). In another example, increasing the flow rate of a fuel gas into the combustion can increase the ratio of hydrogen gas to unreacted hydrocarbon reactant in the output.

Figure 14E:
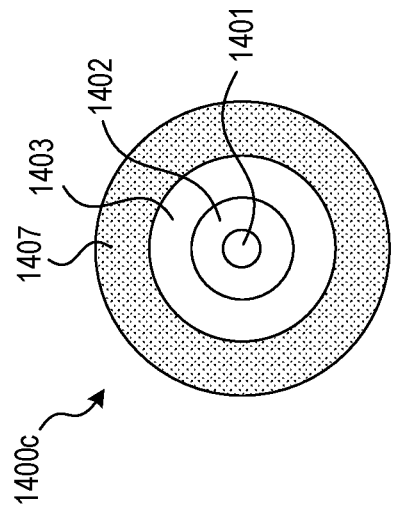
Figure 14D:
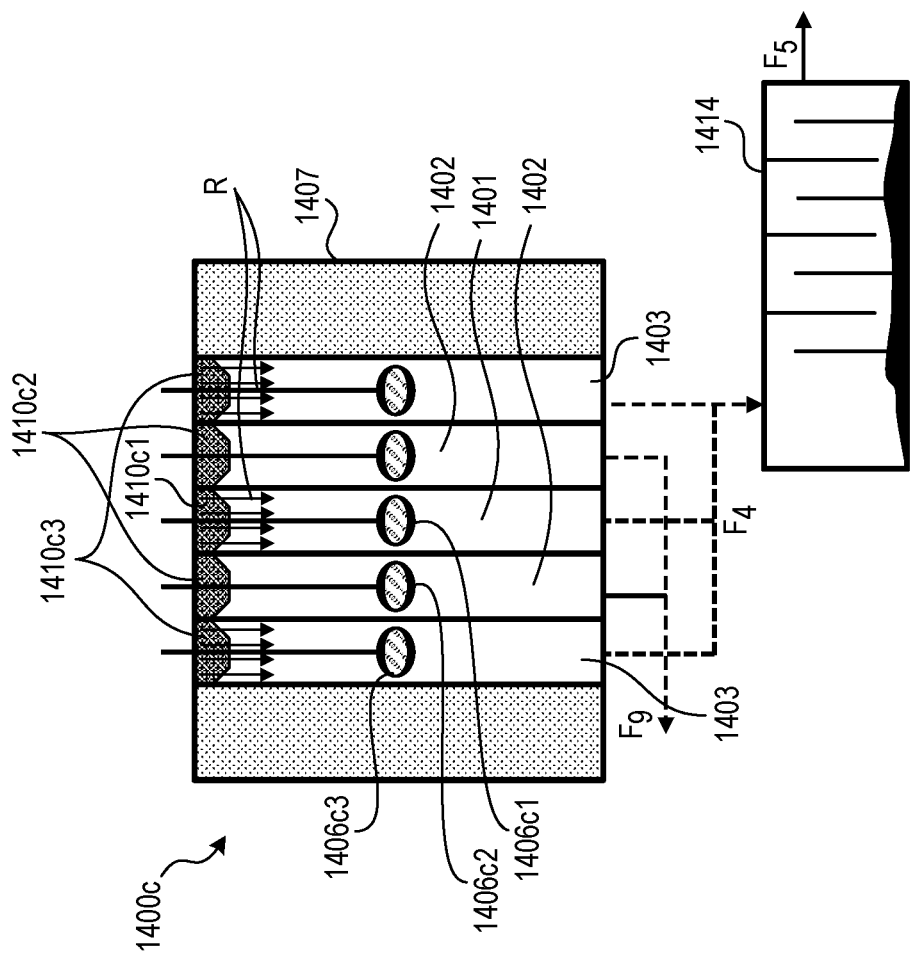

FIGS. 14D and 14E illustrate partially schematic cross-section and top plan views, respectively, of a system 1400c having concentric chambers in accordance with further embodiments of the present technology. In particular, the system 1400c includes a central first chamber 1401 ("first chamber 1401), and successive concentric second and third chambers 1402, 1403 positioned radially outwardly from the first chamber 1401. All three of the foregoing chambers can operate as a combustion chamber or a reaction chamber, depending on the operational phase or mode of the system 1400c. Accordingly, for example, each of the first-third chambers 1401-1403 can have a corresponding combustion component, illustrated as three combustion components 1410c1, 1410c2, and 1410c3. Each chamber can also include a corresponding plunger 1406c1, 1406c2, and 1406c3 for removing particulate carbon from the chamber when that chamber is operating as a reaction chamber. For example, in the configuration shown in FIG. 14D, the first chamber 1410c1 and the third chamber 1410c3 are operating as reaction chambers, with the reactant flowing into the first chamber 1410c1 and the third chamber 1410c3 downwardly along reactant arrows R. Further, the intermediate second chamber 1410c2 is operating as a combustion chamber, where the second combustion component 1410c2 can be activated to heat the reactant flowing into the first and third chambers 1410c1, 1410c3. In one aspect of the illustrated embodiment, the plungers 1406c2 for the active combustion chamber (e.g., the second chamber 1402) can be withdrawn to be positioned above the burner 1410c2 so as not to interfere with the combustion process.

In some embodiments, the first-third chambers 1401-1403 cycle between operating as combustion chambers and operating as reaction chambers during different phases of operation and/or to accommodate varying demands for the output. Purely by way of example, the second chamber 1402 can operate as a combustion chamber (e.g., combustion, no pyrolysis) while the first and third chambers 1401, 1403 operate as reaction chambers (e.g., pyrolysis, no combustion) during a first phase of operation. During the second phase of the operation, the roles can be reversed such that the first and third chambers 1401, 1403 operate as combustion chambers while the second chamber 1402 operates as a reaction chamber. In another example, the second chamber 1402 can operate as a combustion chamber full time while the first and third chambers 1401, 1403 rotate between active reaction and cleaning stages. That is, the first chamber 1401 can operate as a reaction chamber while the third chamber 1403 is cleaned by the plunger 1406c3 during a first phase of operation. Then, during a second phase of operation, the third chamber 1403 can operate as a reaction chamber while the first chamber 1401 is cleaned by the plunger 1406c1.

To cycle through operation, each of the first-third chambers 1401-1403 can be fluidly coupled to an input valve (e.g., the input valve 1211 of FIG. 12) that is, in turn, fluidly coupled to a reactant supply. Further, the input valve and the combustion components 1410c1, 1410c2, and 1410c3 can be operably coupled to a controller (e.g., the controller 150 of FIG. 1) to cycle through the various stages. For example, in the first phase of operation discussed above, the controller can cause the combustion component 1410c2 to combust a fuel and cause the input valve to direct a reactant through the first and third chambers 1401, 1403. As a result, combustion (but no pyrolysis) occurs in the second chamber 1402 while pyrolysis (but no combustion) occurs in the first and third chambers 1401, 1403. During the second phase of operation discussed above, the controller can cause the operations to be reversed.

Figure 14G:
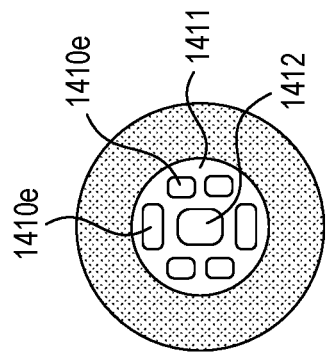
Figure 14H:
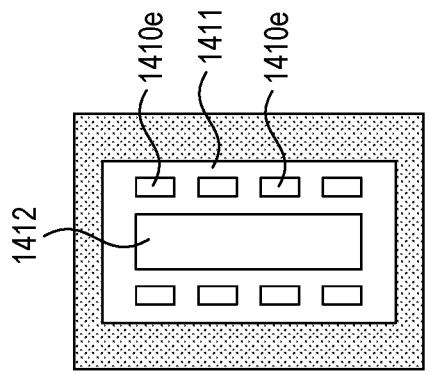
Figure 14F:
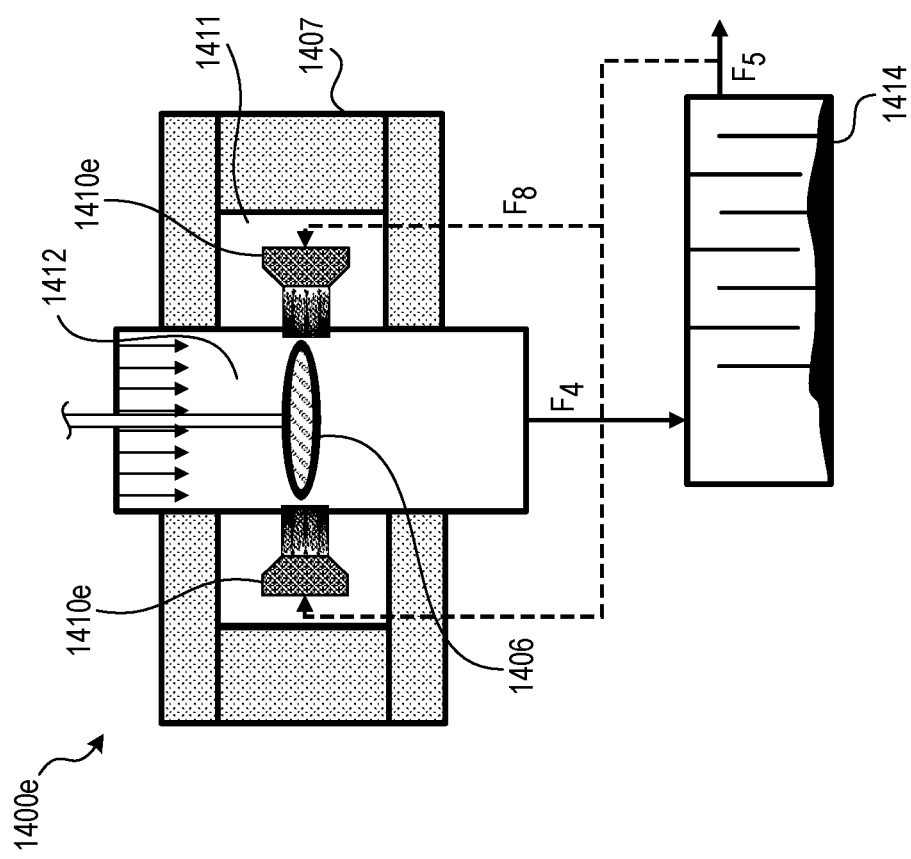

FIGS. 14F and 14G illustrate partially schematic side cross-section and top plan views, respectively, of a system 1400e configured in accordance with still further embodiments of the present technology. As illustrated in FIG. 14F the system 1400e includes a central second chamber 1412 (e.g., reaction chamber) and a concentrically surrounding first chamber 1411 (e.g., combustion chamber). The first chamber 1411 can include one or more combustion components 1410e (two shown in the cross-sectional view of FIG. 14F, six shown in the top view of FIG. 14G). Each of the combustion components 1410e are positioned within the first chamber 1411 and oriented to direct combustion flue gases into contact with a shared wall of the second chamber 1412. Similar to the embodiments described above, a plunger 1406 can be used to remove carbon particulates from the walls of the second chamber 1412. As best illustrated in FIG. 14G, the system 1400e can have an axisymmetric circular cross-sectional shape. Alternatively as shown by the embodiments illustrated in the top view of FIG. 14H, the system 1400e can have a rectangular crosse-sectional shape.

Figure 14I:
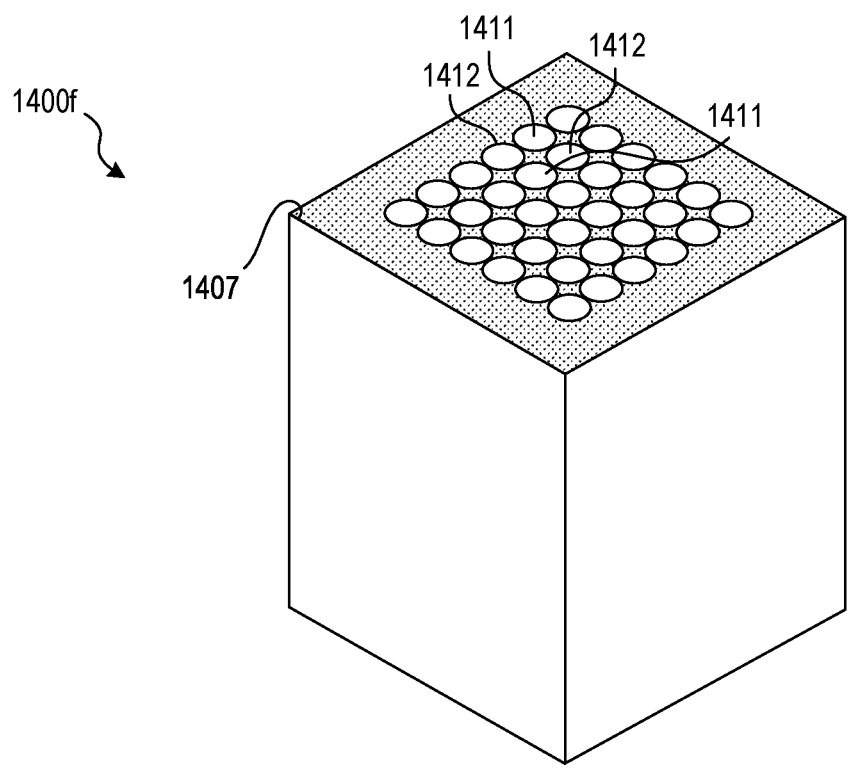
Figure 14J:
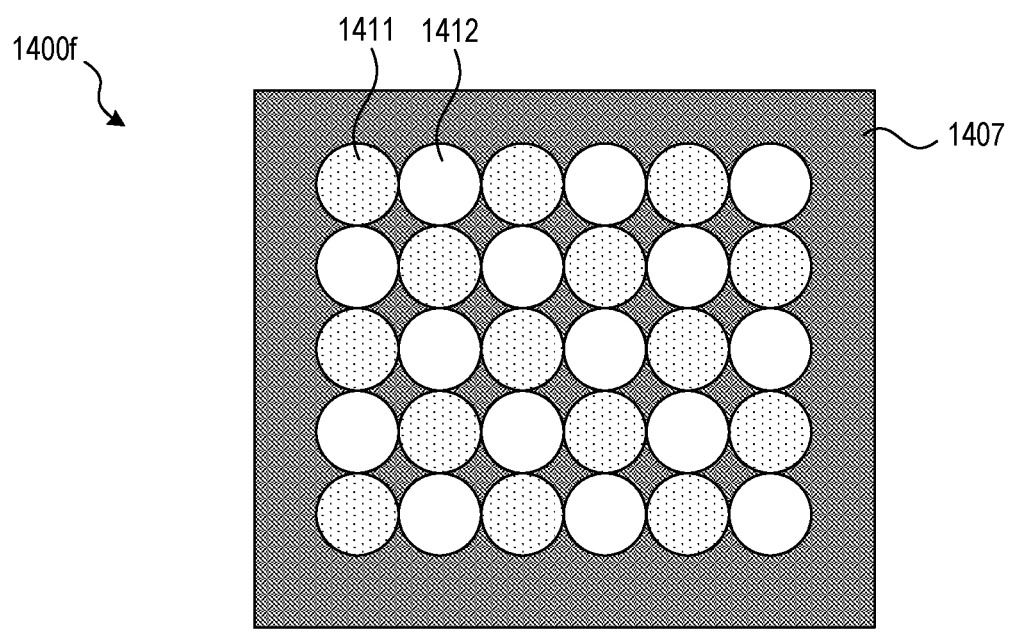

FIGS. 14I and 14J illustrate partially schematic isometric and top views, respectively, of a system 1400f configured in accordance with still further embodiments of the present technology. In the illustrated embodiment, the system 1400f includes a plurality of first chambers 1411 (fifteen shown), a plurality of second chambers 1412 (fifteen shown), and an insulation 1407 surrounding the first and second chambers 1411, 1412. During operation, one or more (or all) of the first chambers 1411 can operate as a combustion chamber while one or more (or all) of the second chambers 1412 can operate as a reaction chamber. Accordingly, each of the first chambers 1411 can include a corresponding combustion component (see, e.g., FIG. 14D) positioned to combust a fuel within the first chambers 1411. Alternatively, the system 1400f can include a single combustion component (see, e.g., FIG. 14C) with individual burners and/or outlets positioned to cause a portion of the combustion within the first chambers 1411 and/or to direct flue gas from the combustion through the first chambers 1411. Similarly, each of the second chambers 1412 can include a corresponding plunger and input valve (neither shown).

As best illustrated in FIG. 14J, the first and second chambers 1411, 1412 can be arranged in an alternating pattern. As a result, for example, each of the first chambers 1411 only shares walls with a second chamber 1412 or the insulation 1407. Thus, the heat generated in each of the first chambers 1411 is primarily radiated and/or conducted outward into a second chamber 1412 (e.g., heat directed into the insulation 1407 is primarily reflected). It will be understood that each of the first and second chambers 1411, 1412 can have a different cross-sectional shape. Purely by way of example, each of the first and second chambers 1411, 1412 can have a square cross-sectional shape. The square cross-section can increase the surface area of the shared walls between the first and second chambers 1411, 1412, which can help increase the heat transfer between the first and second chambers 1411, 1412. In various other examples, each of the first and second chambers 1411, 1412 can have a hexagonal cross-section, an octagonal cross-section, and/or any other suitable cross-section.

In some embodiments, subsets of the first and second chambers 1411, 1412 are operated depending on an operational phase for the system 1400f. For example, a first subset of the first and second chambers 1411, 1412 can be operated while the second chambers 1412 in a second subset are scraped by their corresponding plungers. The operation can then be flipped to allow the second chambers 1412 in the first subset to be scraped by their corresponding plungers. In another example, the number of first and second chambers 1411, 1412 operating can be scaled with demand for the output. That is, while demand for the output is low, only a few of the first and second chambers 1411, 1412 are in operation. As demand increases, the number of the first and second chambers 1411, 1412 in operation can increase to meet the increasing demand.

Figure 14K:
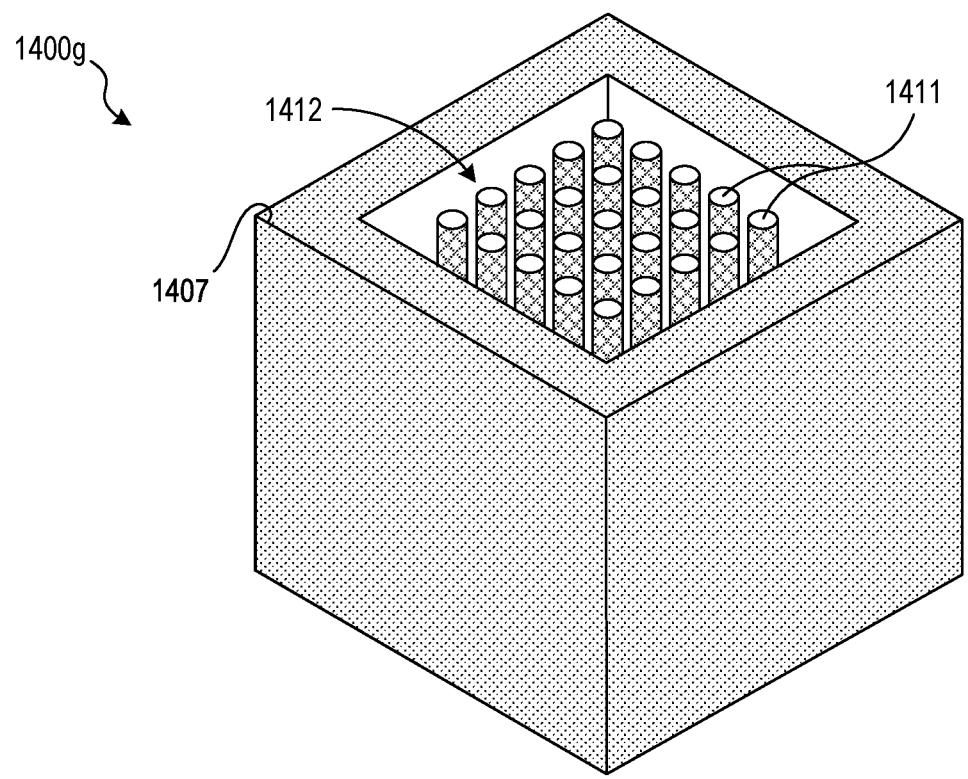
Figure 14L:
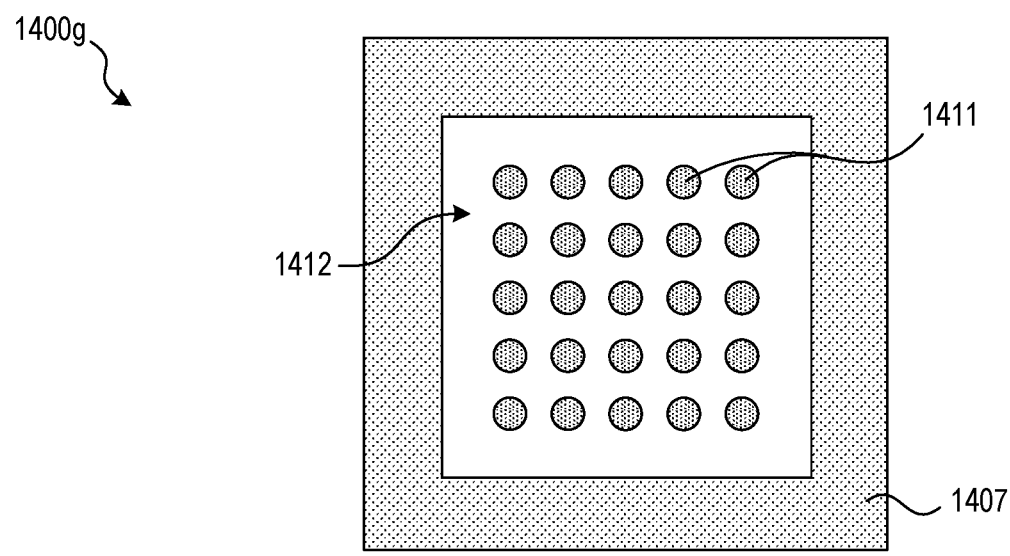

FIGS. 14K and 14L illustrate partially schematic isometric and top views, respectively, of a system 1400g configured in accordance with still further embodiments of the present technology. In the illustrated embodiment, the system 1400g includes a plurality of first chambers 1411 (twenty five shown) that extend through a larger second chamber 1412. In turn, the second chamber 1412 is surrounded by insulation 1407. Each of the first chambers 1411 can operate as a combustion chamber while the second chamber 1412 can operate as a reaction chamber. Accordingly, each of the first chambers 1411 can include a corresponding combustion component (see, e.g., FIG. 14D) positioned to combust a fuel within the first chambers 1411. Alternatively, the system 1400f can include a single combustion component (see, e.g., FIG. 14C) with individual burners and/or outlets positioned to cause a portion of the combustion within the first chambers 1411 and/or to direct flue gas from the combustion through the first chambers 1411.

In turn, the system 1400g can include one or more plungers (see, e.g., FIG. 14D) that can extend through the second chamber 1412 to scrape the walls of the second chamber. In some embodiments, the plunger has a relatively small cross-sectional area and is movable within the footprint of the second chamber 1412. In such embodiments, the plunger can scrape a portion of the second chamber 1412 while the remainder acts as a reaction chamber and continually move to cycle through scraping various portions.

It will be understood that the configuration of the first and second chambers 1411, 1412 can be flipped. That is, each of the first chambers 1411 can act as a reaction chamber while the second chamber 1412 acts as a combustion chamber surrounding the reaction chambers.

Figure 15A:
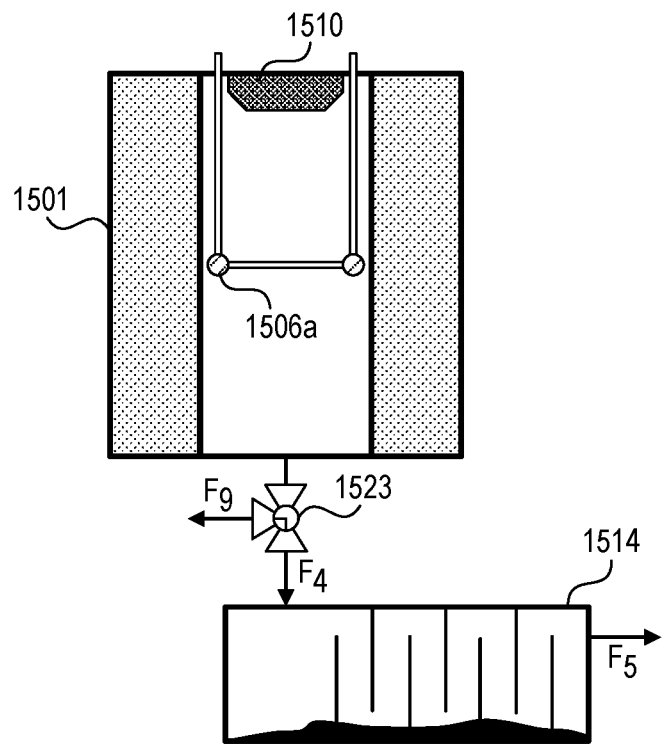
FIGS. 15A-15B are partially schematic illustrations of RTP reactor systems having carbon removal components configured in accordance with embodiments of the present technology.

The plunger arrangement for removing carbon from the walls of a reaction chamber can be applied to a CCP reactor, as described above, and/or can be applied to an RTP reactor, as described below with reference to FIGS. 15A and 15B. In FIG. 15A, a common chamber 1501 includes a combustion component 1510 that can control the amount of oxygen present in the common chamber 1501 while combusting a fuel and heating a hydrocarbon reactant. The combustion component 1510 can include a burner that heat the common chamber 1501 and/or an input valve to control provide a hydrocarbon reactant to be pyrolyzed in the common chamber 1501. During combustion, the combustion component 1510 can control the oxygen levels in the common chamber 1501 to ensure all of the oxygen is consumed by the burner. As a result, the hydrocarbon reactant undergoes a pyrolysis reaction rather than combusting as it is heated. In some embodiments, the combustion fuel and the hydrocarbon reactant are the same. For example, the combustion fuel and hydrocarbon reactant can both be natural gas. In such embodiments, the combustion component 1510 can ensure there is not enough oxygen present to combust all of the natural gas input into the common chamber 1501. As a result, a first portion will combust and heat a second portion that will undergo the pyrolysis reaction.

As further illustrated in FIG. 15A, a plunger 1506a can have ring-shaped body that includes an open central portion. The ring shape allows the plunger 1506a to scrape the walls of the common chamber 1501 while combustion flue gases, hydrogen gas, carbon particulates, and/or unreacted hydrocarbons travel through the common chamber 1501. The output from the common chamber 1501 then passes through an output valve 1523 and into a separator 1514. The output valve 1523 can include a first position that directs an output to an exhaust system, for example when the common chamber 1501 is undergoing a heating cycle (e.g., only combustion flue gasses exiting the common chamber). As discussed above, the separator 1514 can remove carbon and/or non-hydrogen gasses from the output. The separated output can then be directed to a destination (e.g., back into the common chamber 1501 to be combusted, to a hydrogen storage tank, and/or to any other suitable destination).

Figure 15B:
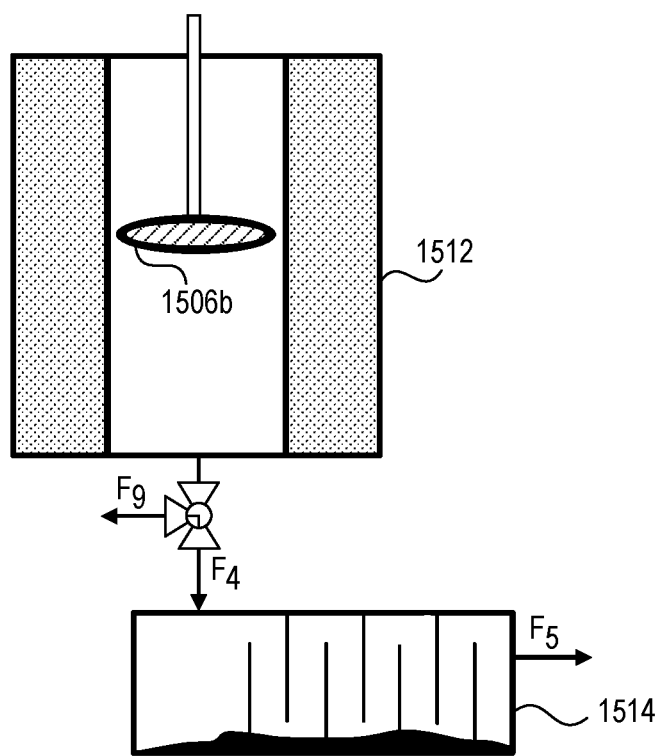

In FIG. 15B, the reaction chamber 1512 is heated by a separate combustion process. The separate combustion process can be conducted in a separate chamber that does not share a common wall with the reaction chamber 1512 (e.g., in a second chamber). Rather, the second combustion process can be thermally coupled to the reaction chamber 1512 by another device. For example, the flue gasses from the combustion process can be directed through the reaction chamber 1512 immediately after the combustion process. Additionally, or alternatively, the combustion process can be conducted adjacent the reaction chamber 1512 and thermally coupled through radiative heating. Additionally, or alternatively, the combustion process can be previously completed in the reaction chamber 1512 to preheat the reaction chamber 1512. As further illustrated in FIG. 15B, a plunger 1506b can be used to remove carbon particulates from the walls of the reaction chamber 1512 in the manner discussed above. In the illustrated embodiment, the plunger 1506b does not include an open center allowing gases to pass therethrough. Instead, for example, the plunger 1506b can be actuated in the reaction chamber 1512 after a cycle through the reaction process (e.g., before reheating the reaction chamber 1512).

Figure 16A:
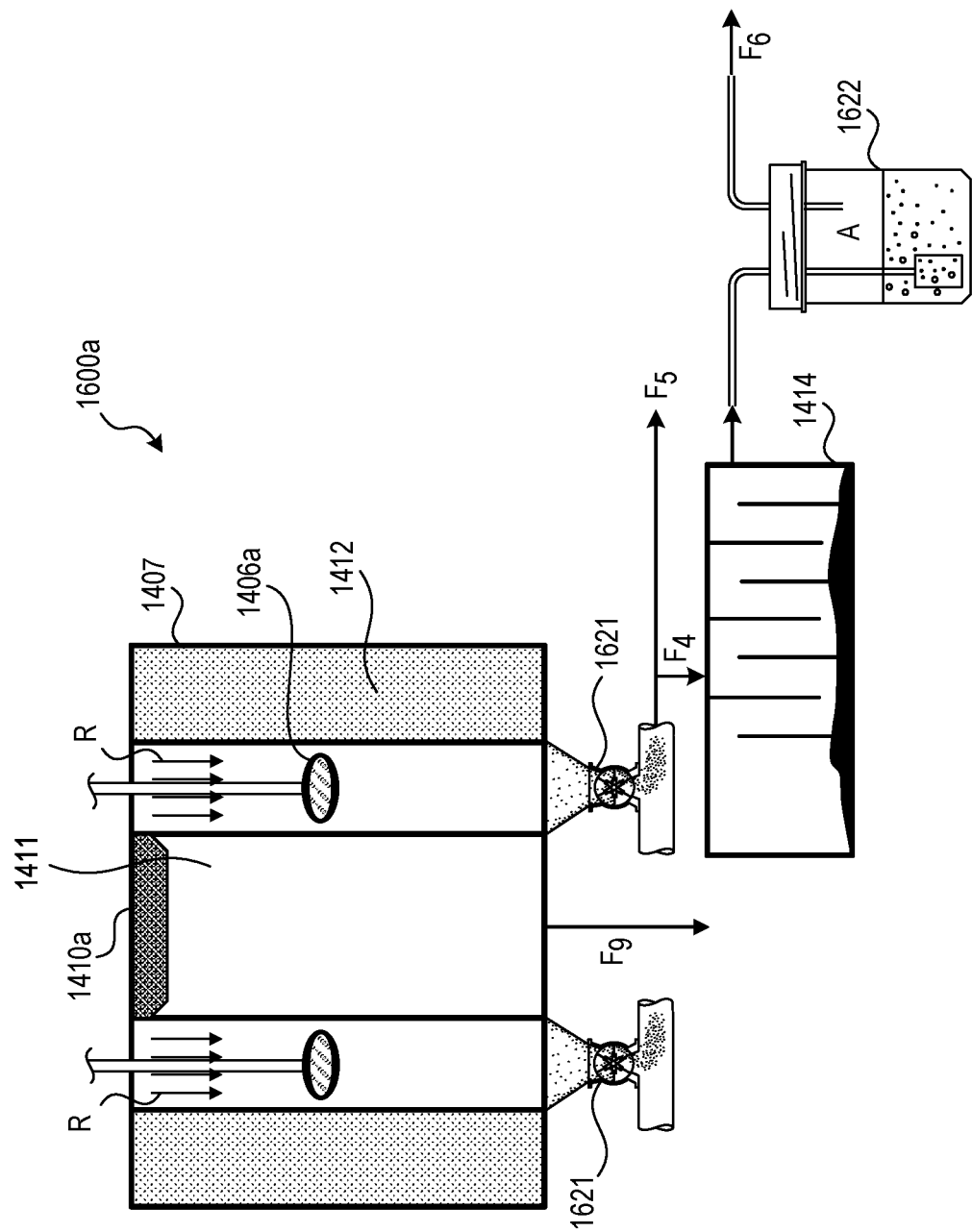
FIGS. 16A-16D are partially schematic illustrations of reactor systems having carbon removal components configured in accordance with still further embodiments of the present technology.
Figure 16C:
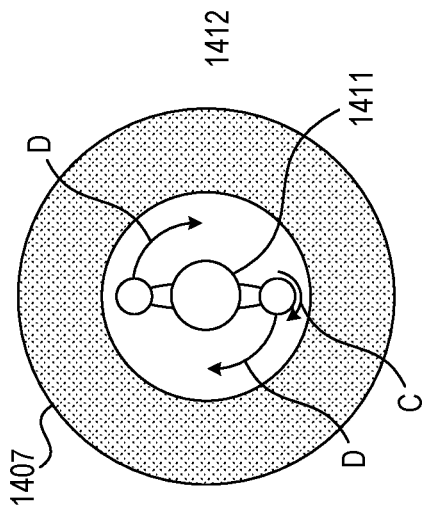
Figure 16B:
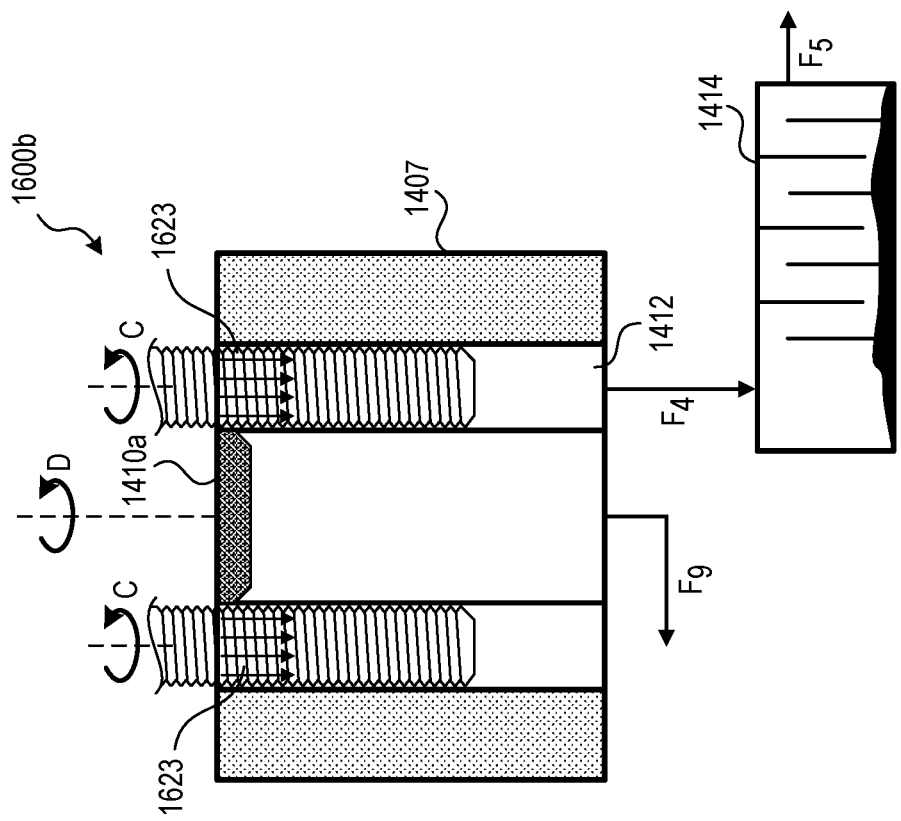

FIGS. 16A-16C are partially schematic illustrations of further arrangements for removing carbon particulates from a reaction chamber and/or the output, in addition to, or in lieu of, the plunger 1406a and separator 1414 described above with reference to FIG. 14A. For example, FIG. 16A illustrates a system 1600a that is generally similar to the system 1400a discussed above with reference to FIG. 14A. The system 1600a includes a first chamber 1411, a surrounding second chamber 1412, a combustion component 1410a positioned to combust a fuel within the first chamber 1411, and a plunger 1406a actionable to remove carbon from the walls of the second chamber 1412. As illustrated, however, the system 1600a can further include one or more lock hoppers 1621 in fluid communication with the second chamber 1412. The lock hopper(s) 1621 allow for continuous filtering and/or withdrawal of the solid carbon out of the output from the second chamber 1412. The lock hopper(s) 1621 can direct the separated output to the separator 1414 to further separate gaseous products from solid carbon products. For example, the output can be passed through a cyclone, a baghouse, and/or other devices to separate gaseous materials (e.g., hydrogen gas, leftover hydrocarbon reactants, and the like) from solid materials in the output. Purely by way of example, in the illustrated embodiment, the output is passed through a liquid column 1622 to further separate gaseous materials from solid materials in the output.

FIG. 16B is a partially schematic, cross-sectional illustration of a system 1600b that includes one or more screw-type extruders 1623 (two shown, sometimes also referred to herein as "augers 1623") that can remove carbon from the walls of the second chamber 1412, in lieu of the plunger 1406a described above with reference to FIG. 16A. Each auger 1623 can include a rotating screw-shaped member that scrapes the particulate carbon from the walls of the second chamber 1412. In some embodiments, the augers 1623 move axially along the length of the second chamber 1412 to remove particulates from the entire length (e.g., height) of the second chamber 1412 and/or to be removed during operation. In some embodiments, the augers 1623 remain in a fixed longitudinal position and rotate to scrape the walls and/or push removed carbon out of the second chamber 1412. In some embodiments, the second chamber 1412 includes a single auger 1623 that is concentric with and surrounds the first chamber 1411 (e.g., that has a hollow portion corresponding to the first chamber 1411).

In some embodiments, for example as shown in the top plan view of FIG. 16C, two augers 1623 can be connected to each other, and can travel along a circular path through the annular second chamber 1412 to remove particulates from the inner and outer circumferential walls of the second chamber 1412. Accordingly, the augers 1623 can rotate about their own axes, as indicated by arrow C, and orbit about a common central axis, as indicated by arrows D. The rotation about the common central axis allows a portion of the second chamber 1412 to remain in use while the augers 1623 remove carbon from the walls.

It will be understood that, in embodiments for which the first chamber 1411 operates as the reaction chamber, the system can include one or more augers 1623 positioned and/or movable within the first chamber 1411. For example, two augers 1623 can rotate about a central axis to clean the circumferential walls of the first chamber 1411 while the central portion and other walls allow the first chamber 1411 to remain in use. In another example, a single auger with a diameter generally similar to the first chamber 1411 can scrape the walls of the first chamber 1411 all at once.

Figure 16D:
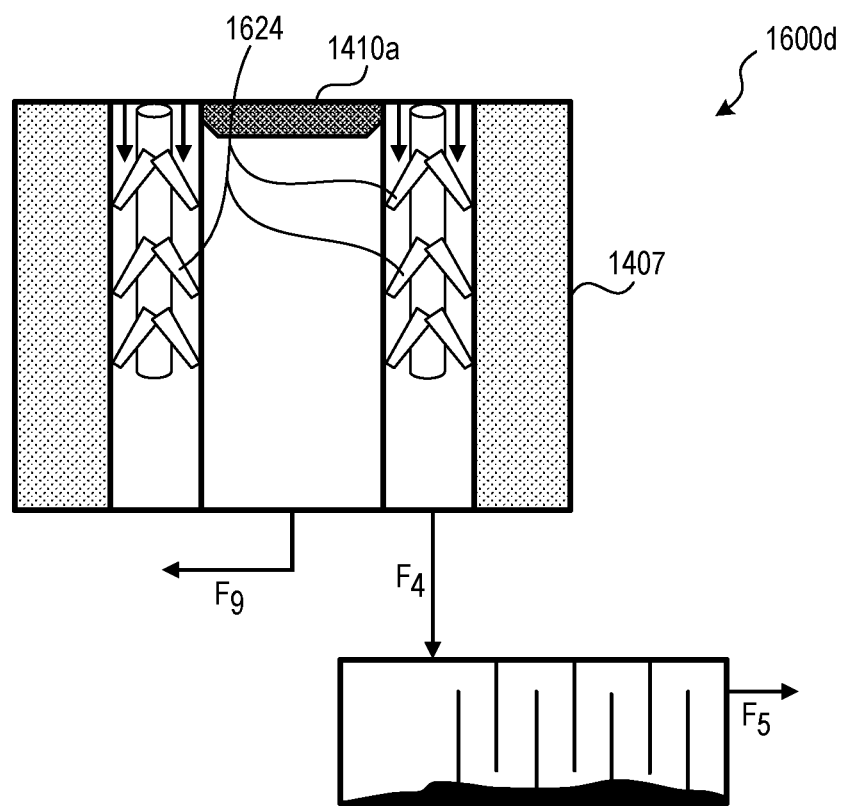

FIG. 16D is a cross-sectional view of a system 1600d configured in accordance with still further embodiments of the present technology. In the illustrated embodiment, the system includes an arrangement of gas jets 1624 (e.g., in place of the augers 1623) that remove the carbon particulates from the chamber walls via a pressurized fluid, and/or prevent the particulates from accumulating at all.

6. Representative Test and Simulation Data

Figure 17B:
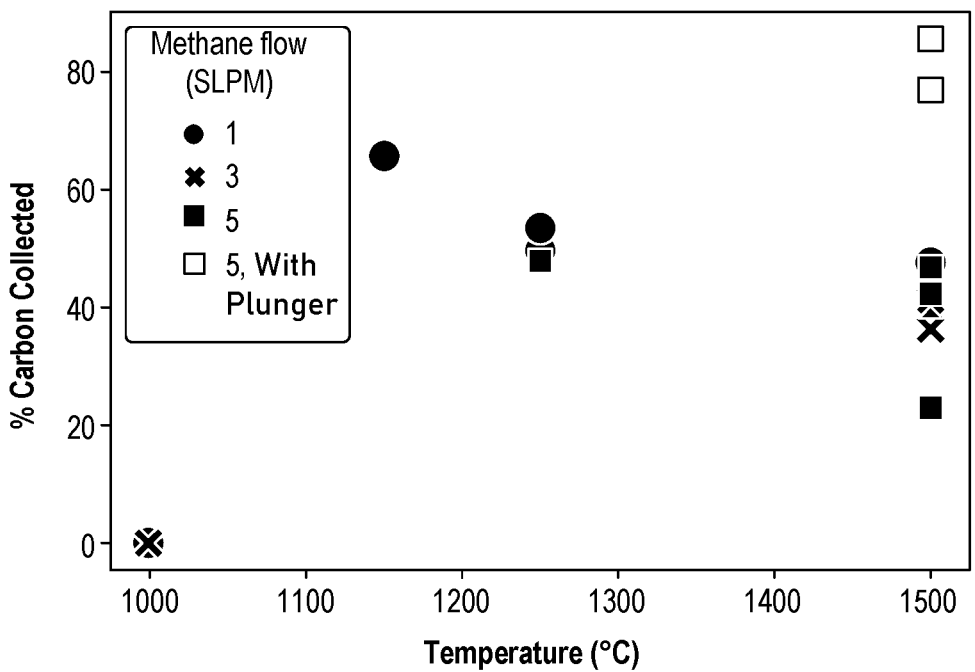
Figure 17C:
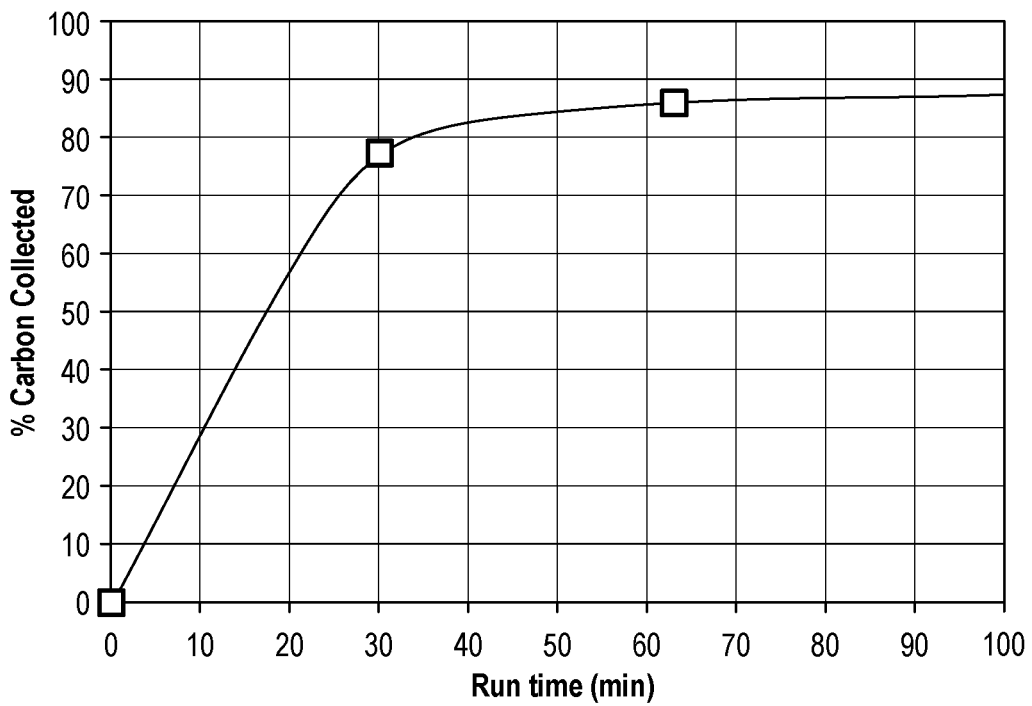

FIGS. 17A-17C illustrate test data obtained for a representative carbon removal system configured in accordance with embodiments of the present technology. These figures compare carbon removal efficacy for (a) a system that relies on fluid flow for carbon particulate removal and (b) a system that includes a mechanical removal device in addition to fluid flow. FIG. 17A illustrates that the methane flow through the reactor, which produces hydrogen and carbon, can collect up to 66% of the total carbon generated in the process at 1 SLPM methane flow and 1150° C. for 60 minutes In another example, 5 SLPM methane flow at 1500° C. run for 30 minutes produced 43% carbon outside the reactor in the carbon separator.

The system was also tested with a mechanical device made of a superalloy rod with a cylindrical piston or plunger at the end. The plunger was used to push the carbon formed in the reactor to a carbon separator. In a comparable experiment at 5 SLPM methane flow for 30 minutes at 1500° C., the carbon collection (carbon collected divided by total carbon formed) in the carbon separator increased from 43% to 77% due to the addition of the plunger. When the experiment was continued further, after removing the carbon, the overall carbon collected increased from 77% to 86% when the plunger was used again after 33 minutes. With the increasing number of cycles of carbon removal, the carbon collection increases asymptotically to 100%. FIG. 17B illustrates representative collection values for multiple methane flow rates in multiple tests, with and without a plunger. FIG. 17C graphically illustrates the increase in carbon collection with successive runs after an initial removal.

Figure 18A:
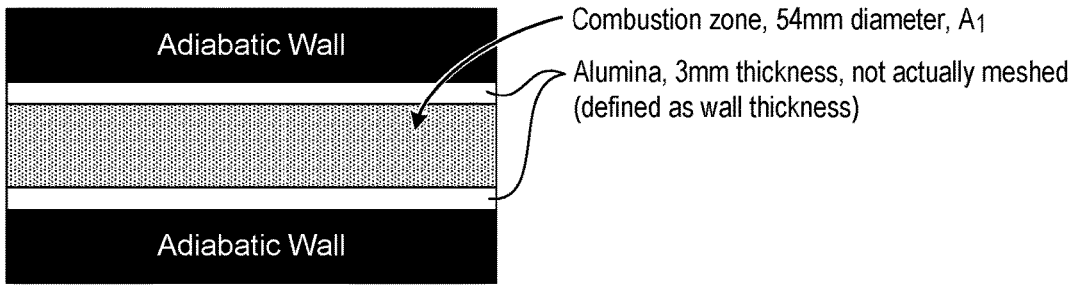
FIGS. 18A-18C illustrate representative reactor models having axial and radial pyrolysis zones in accordance with embodiments of the present technology.
Figure 18B:
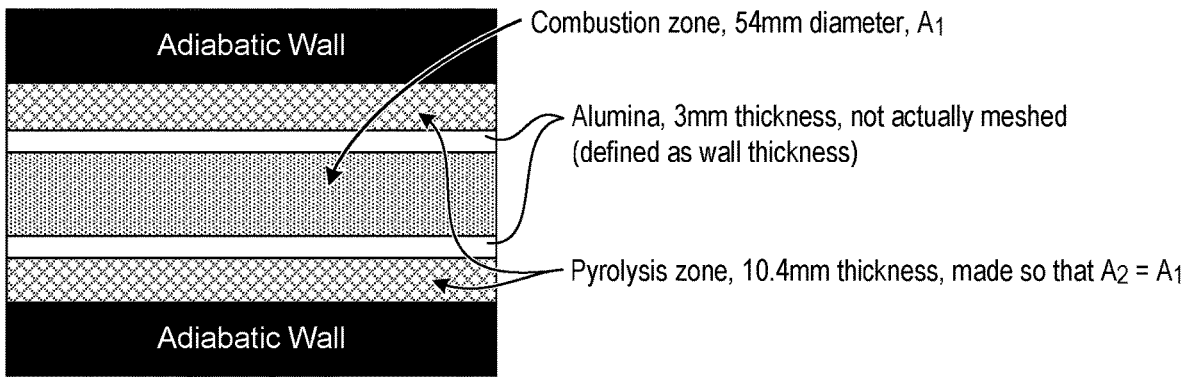
Figure 18C:
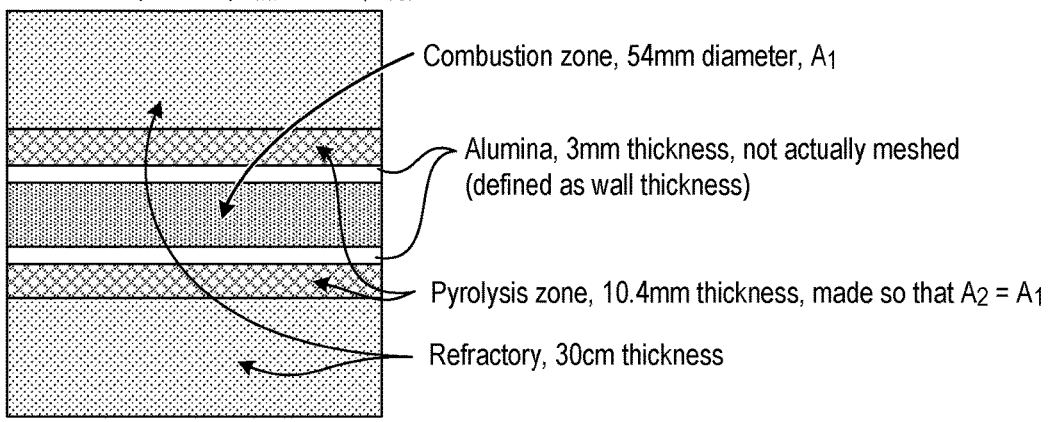

FIGS. 18A-18C illustrate simulations used to compare the performance of a regenerative thermal pyrolysis (RTP) reactor with a combined combustion pyrolysis (CCP) reactor. FIGS. 18A-18B are cross-sectional views of cylindrical reactors. In the RTP reactor (FIG. 18A), the fluid is switched from combustion gas to pyrolysis gas in a cyclic manner. In other words, the labeled combustion zone alternates between a heating phase, in which the zone is heated by combusting the incoming gas, and a pyrolysis phase, in which the incoming gas is pyrolyzed in the now-heated reactor. In the CCP reactor (FIG. 18B), combustion is carried out in the central combustion zone, and pyrolysis is carried out in the radially outward, concentric pyrolysis zone. The simulations were performed for 5 SLPM hydrogen combustion and 5 SLPM for methane pyrolysis. In the RTP system, the fluid is switched from combustion gas to pyrolysis gas in a cyclic manner, as indicated above. Accordingly, the steady state combustion temperature profile at the end of the combustion process was considered the starting condition for the pyrolysis phase. FIG. 18C is discussed later, after the discussion of FIGS. 19A-19F below.

Figure 19A:
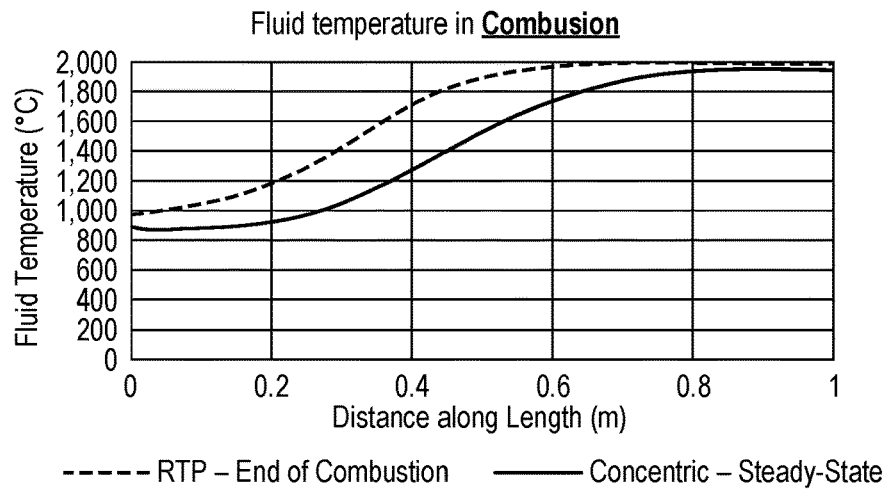
FIGS. 19A-19F illustrate predicted performance parameters for the representative reactor models shown in FIGS. 18A-18C.
Figure 19B:
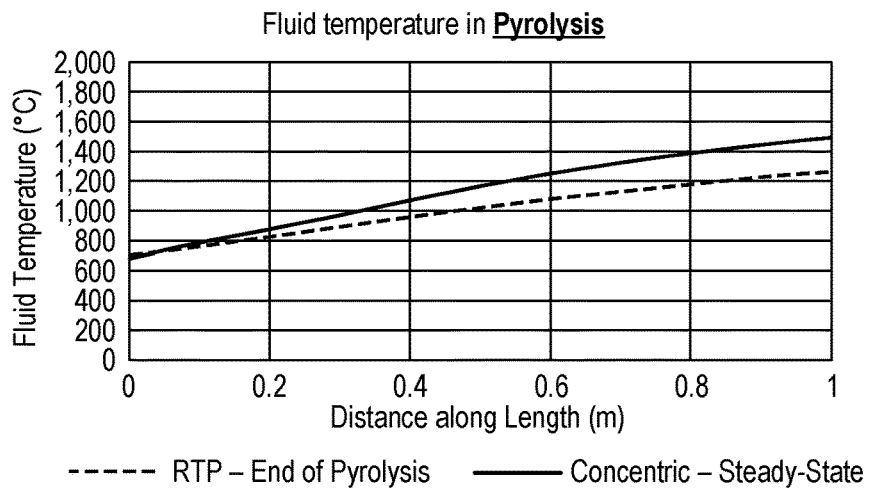
Figure 19C:
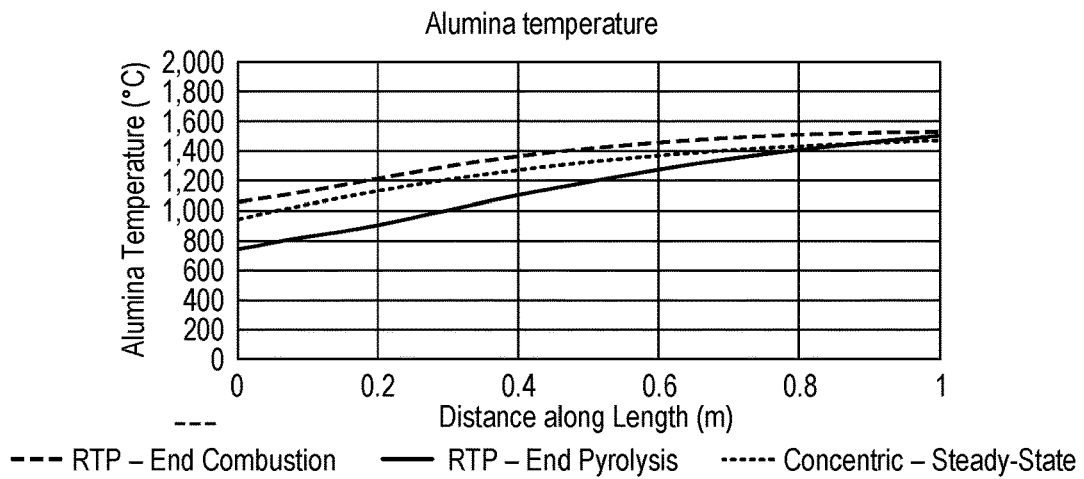

FIG. 19A illustrates the fluid temperature profile as a function of distance along the length of the combustion zone, for the RTP reactor and the CCP reactor. Assuming adiabatic conditions, the temperature of the fluid and the alumina wall increased with distance. FIG. 19B illustrates the temperature profile as a function of distance along the length of the pyrolysis zone, for the RTP reactor and the CCP reactor. The pyrolysis process was simulated until steady state was achieved (referred as RTP-End of Pyrolysis in FIG. 19B). In the case of the CCP system, the pyrolysis and combustion part of the reactors are simulated at steady state. The combustion temperature attained in the RTP system is higher than that of the CCP system, while the pyrolysis temperature is higher for CCP system compared to the RTP system. The alumina wall temperature for the CCP system is also lower than that of the RTP system, as shown by the temperature profile as a function of distance along the length of the pyrolysis zone illustrated in FIG. 19C.

Figure 19D:
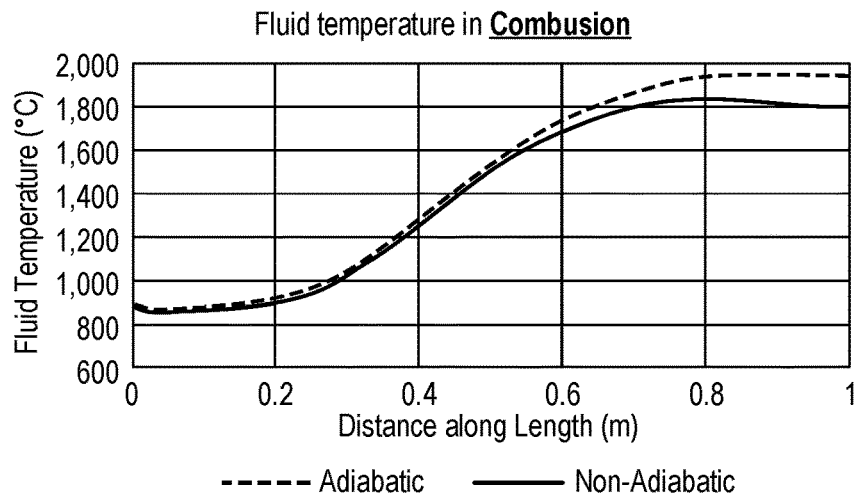
Figure 19E:
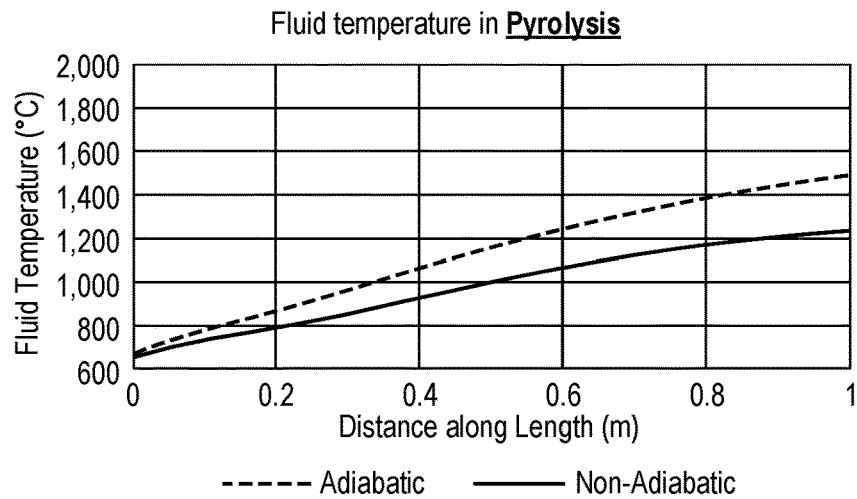
Figure 19F:
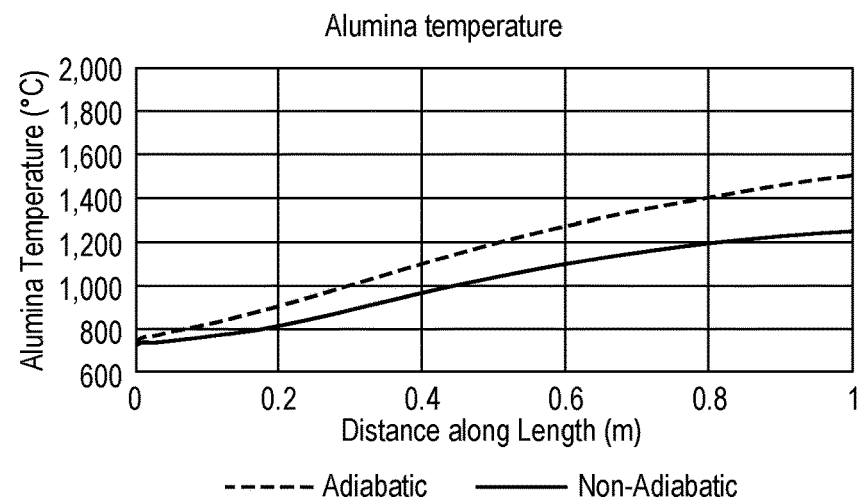

The foregoing examples assumed an adiabatic outer wall (e.g., no heat lost into the surrounding environment). In reality, a significant factor for the RTP and CCP reactor systems is the heat loss to the surrounding environment. FIGS. 19D-19F illustrate the effects of heat loss from non-adiabatic walls in the CCP system. In particular, FIG. 19D illustrates the fluid temperature profile as a function of distance along the length of the combustion zone for adiabatic and non-adiabatic walls; FIG. 19E illustrates the temperature profile as a function of distance along the length of the pyrolysis zone for adiabatic and non-adiabatic walls; and FIG. 19F illustrates the alumina wall temperature along the length of the CCP reactor assuming adiabatic and non-adiabatic conditions. Reducing (e.g., minimizing) the heat loss to the surrounding environment significantly improves the performance of the RTP system. In the CCP system, the combustion occurs in the inner cylinder. The heat lost from combustion is utilized for the pyrolysis reaction in the surrounding pyrolysis zone. Accordingly, the main heat loss mechanism in the CCP system is the loss from the pyrolysis zone to the surrounding environment. In both RTP and CCP systems, effective insulation improves the performance significantly.

FIG. 18C illustrates a representative CCP reactor in which the outer wall is not adiabatic. Instead, the outer wall has an insulation layer with a thermal conductivity of 0.15 W/m/K, a heat loss coefficient of 3 W/m$^2$K, an emissivity of 0.7 (radiation heat transfer), and an external temperature of 25° C. FIGS. 19D-19F compare the fluid and wall temperatures for the adiabatic and non-adiabatic models, indicating the impact of the adiabatic wall assumption, and the importance of effective insulation around the reactor. A non-adiabatic reactor will need a longer residence time to achieve the same conversion as the adiabatic counterpart. Accordingly, the insulation thickness can be increased to reduce the heat loss to the surroundings. In at least some embodiments, one of more additional channels (e.g., concentric channels) can be added between the insulation and the pyrolysis zone. These additional channels can circulate a heat transfer fluid (for example, methane, which is then directed into the reaction chamber to be pyrolyzed) as a way of capturing heat that might otherwise be wasted. In other embodiments, the additional channels can be evacuated to provide further insulation, or the additional channels can be used to carry out further pyrolysis reactions.

Accordingly, representative systems have configurations selected for safety and to improve (e.g., optimize) operation while meeting particular end user demands. Representative parameters that are selected to achieve these results include: the dimensions and dimensional ratios between the combustion and pyrolysis chambers, ratios of the combustion feed flow rate to the pyrolysis feed flow rate (which may change as a function of time), and/or flow rates (or mass or volume ratios) of hydrogen to hydrocarbon in the combustion gas feed (which also may change as a function of time).

Similarly, materials may be chosen to maximize or otherwise tune the heat transfer from the combustion chamber to the pyrolysis chamber. For instance, the combustion chamber may include high-temperature compatible materials such as: a metal with a coating (e.g., a ceramic-coated refractory metal like W, Mo, Nb, or Ta), a ceramic (carbide, nitride, boride or oxide such as aluminum oxide, silicon carbide, aluminum nitride, zirconium boride, zirconium oxide, yttrium doped zirconium oxide, fire brick, or similar), and/or a composite (e.g., a carbon matrix composite), Similarly, materials may be chosen for the pyrolysis chamber to minimize or otherwise tune the heat transfer from pyrolysis chamber to the outside of the system. The materials may include any of those listed above. Various surfaces may be deliberately polished or not, or coated with reflective or non-reflective (low or high emissivity) materials to adjust heat transfer. The "refractory" material may comprise a bulk material from the above list, or an aerogel, a vacuum environment, a low pressure gas (e.g., He or Ar), or insulating sheets, or some combination, composite, or other combination (e.g., layers) of the above.

Heat transfer features may be included on various surfaces. For instance, the combustion chamber inner wall or outer wall may have fins, channels, and/or other surface area enhancement features. The combustion and/or pyrolysis gases may be directed to swirl to enhance heat transfer. The pyrolysis gases may have multiple inlet points along the diameter, circumference, and/or height of the pyrolysis chamber to optimize pyrolysis and yield of hydrogen, or removal of carbon. The combustion gases may have multiple inlet points along the diameter, circumference, or length of the combustion chamber to improve (e.g., optimize) combustion and/or heat transfer. Similarly, the wall of the combustion chamber may in and of itself be or contain a burner, for instance a porous media burner or catalytic surface burner.

The pyrolysis and combustion chambers may not have a circular cross-section. For instance, they may have hexagonal or octagonal cross-sectional shapes. The pyrolysis and combustion chambers may also not have the same effective diameter along the flow axis. For instance, to facilitate carbon removal, the pyrolysis chamber may have an outwardly tapered sidewall such that its diameter increases further away from the gas inlet. This approach allows the gases to expand, which decelerates the particles. Further, a larger opening prevents plugging of the reactor for longer period of time, and simplifies collecting the particulates at the reactor exit. This approach can also reduce the frequency with which mechanical devices are used to remove carbon from the reactor. CCP systems can include single combustion channel and a single pyrolysis channel, or any suitable number of each, for example, as described above with reference to FIG. 14C.

In an installation that includes multiple individual CCP systems, a first reactor (A) may be running and its hydrogen output may be used as feed for a second reactor (B). This is especially valuable during startup or during temporally transient demand for hydrogen production during which the second reactor (B) may be turned on or off or otherwise modulated, since this avoids the requirement to burn a hydrocarbon to restart heating up the second reactor (B), and instead hydrogen can be burned to heat up the second reactor (B) without producing greenhouse gases.

Figure 20B:
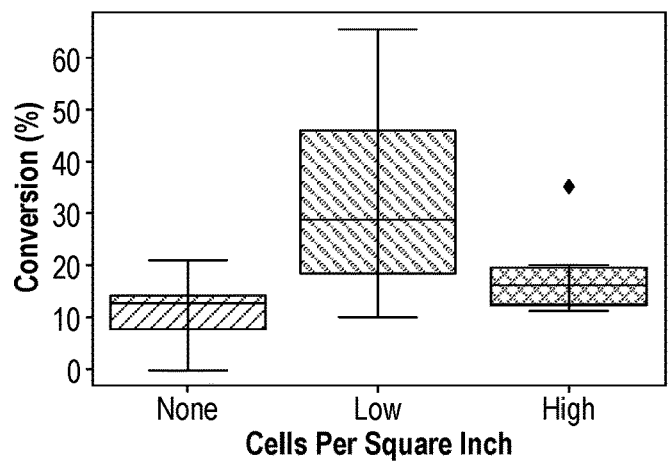
Figure 20C:
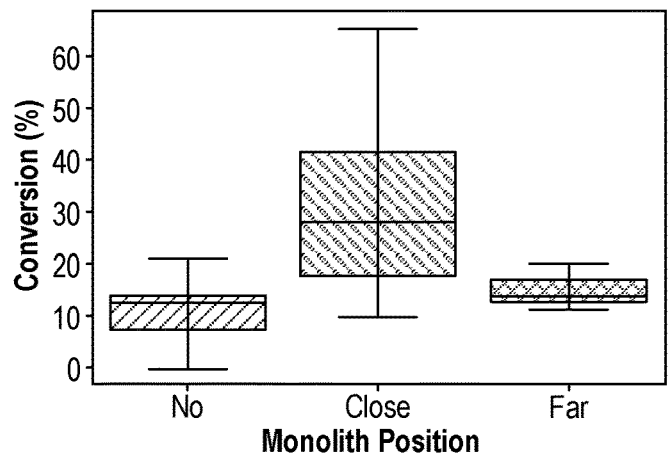
Figure 20D:
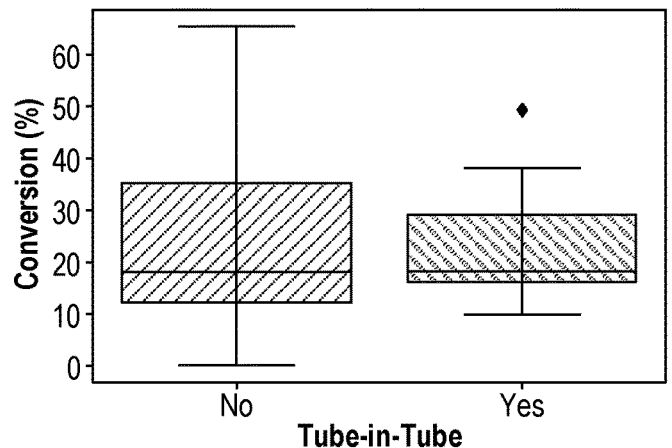
Figure 20E:
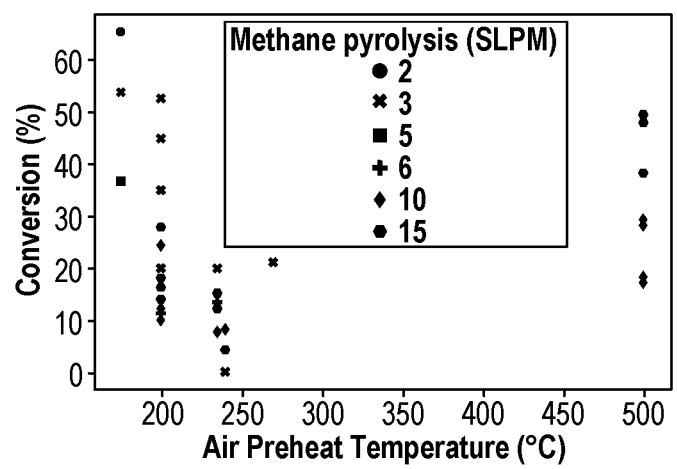
Figure 20F:
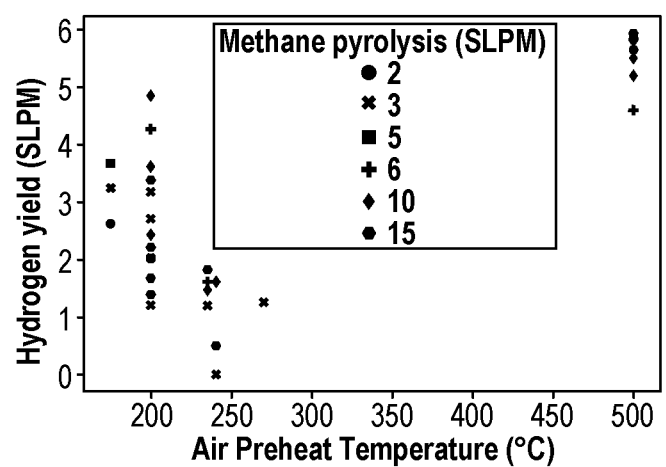
Figure 20G:
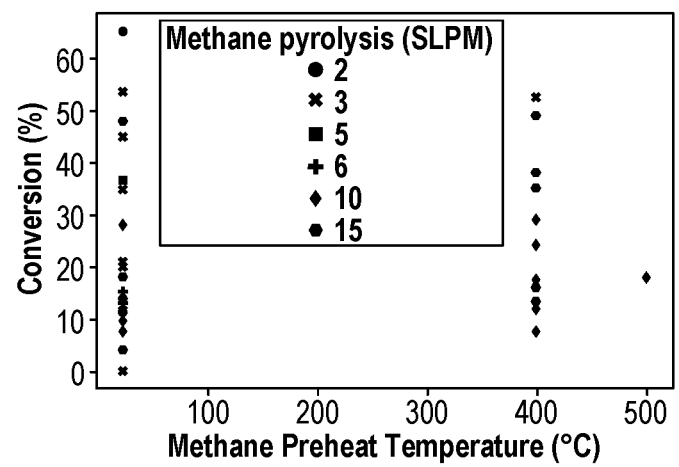
Figure 20H:
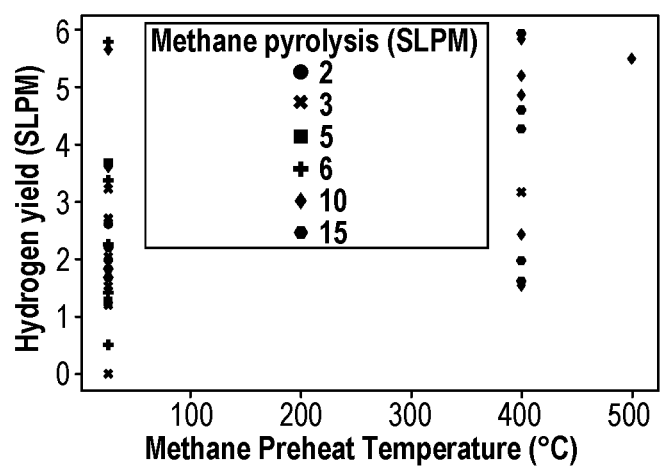

FIGS. 20A-20H illustrate test data for various representative pyrolysis reactor systems in accordance with embodiments of the present technology. In particular, the tests illustrate improvements from various features discussed above as well as the results of varying operating conditions (e.g., flow rates). For example, the tests illustrate the benefit of monolithic walls of ceramics, that include mullite, for improving the heat transfer between the combustion and reaction chambers in the CCP reactor system. In another example, the effect of preheating air before combustion, preheating methane (e.g., used as a hydrocarbon reactant), and varying the flow rate of methane into the reactor system were tested. The table of FIG. 20A illustrates the results of representative tests. The tests included varying the proximity of the monolithic walls to the flame from the combustion, the cells per square inch of the monolithic walls, and the effect of improved insulation. The table of FIG. 20A also illustrates the effect of a tub-in-tube reactor (e.g., a reactor with concentric combustion and reaction chambers (e.g., as shown in FIGS. 14A and 14B)).

Figure 21:
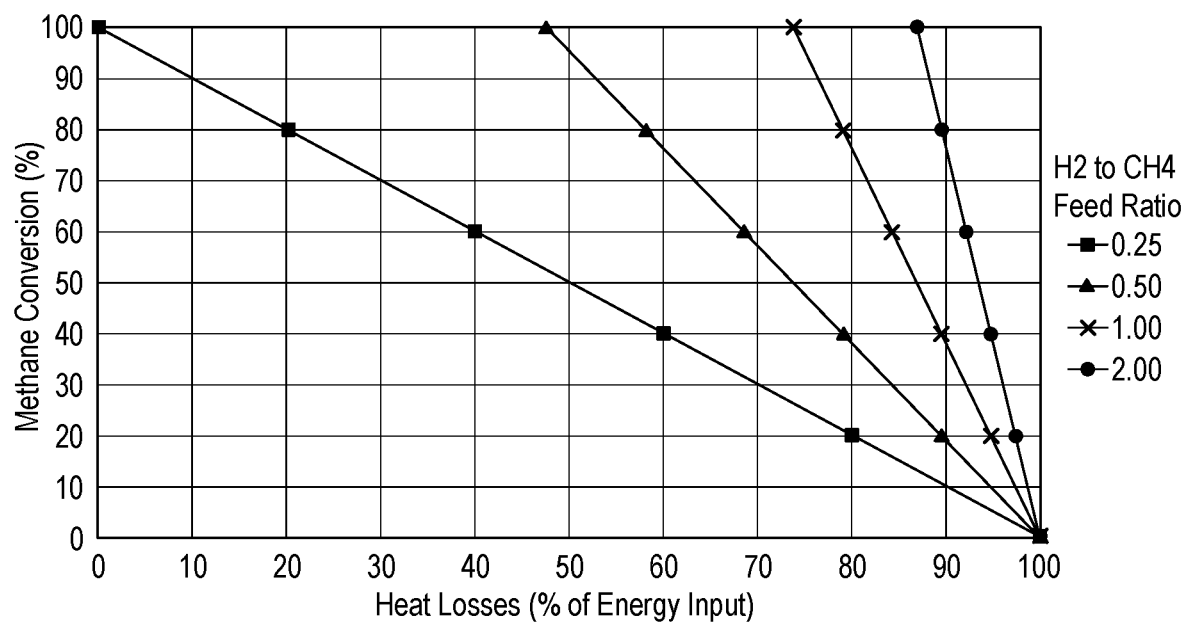
FIG. 21 illustrates a relationship between heat losses and pyrolysis conversion percentage for varying ratios of a reactant and a combustion fuel in accordance with embodiments of the present technology.

FIG. 21 illustrates a relationship between heat losses and pyrolysis conversion percentage for several representative combustion fuel: hydrocarbon reactant ratios. More specifically, FIG. 21 illustrates the relationship for the representative ratios of hydrogen gas (as a combustion fuel) to methane gas (as a hydrocarbon reactant). The relationship is defined by global mass and energy balance limits. As a result, for example, the pyrolysis conversion is maximized when heat losses are minimized. As clearly illustrated in FIG. 21, higher combustion fuel: hydrocarbon reactant ratios allow more heat to be lost while maintaining

7. Liquid Intermediate Products

In addition to the solid carbon removal techniques described above, representative reactors can include liquid removal techniques, for example, forming a liquid hydrocarbon by adjusting the point at which the reaction in the reactor ceases. Instead of allowing the reaction to progress all the way to gaseous hydrogen and solid carbon, some or all reactants can take the form of resins or heavier hydrocarbons. This may be a simpler way to remove some or all of the carbon because (a) the hydrocarbon resin can trap carbon and/or (b) the resin can flow and drop via gravity out of the reactor. Adjusting reaction conditions may also be used to adjust the amount of hydrogen produced.

In a particular example, experiments were performed with a 25 mm ID, 1000 mm length alumina reactor. The residence time in the reactor at a given volumetric flowrate is lower for a 25 mm reactor than it is for a 60 mm ID reactor. At 1 SLPM and 1250° C., the carbon collected outside the reactor was higher for the 25 mm reactor compared to the 60 mm reactor (58.2% vs 47.8%) with very similar carbon conversion values. Most notably, at 5 SLPM, 16% H2 was identified in the outlet gas analyzer, but no carbon was collected in the carbon separator 114 (see, e.g., FIG. 14A). The carbon separator can include one or more separation components such as but not limited to baffles, a bag filter, and/or liquid bubbler for particulates separation. The inventors observed oil formation at the inlet of the collection box. The residence time in the reactor was not sufficient to convert $CH_4$ completely to carbon, but only to a resinous hydrocarbon. This is very apparent when the percentage of methane converted to carbon is compared between the two diameters (25 mm vs 60 mm), at same flow rates, for example at 5 SLPM, 1250° C. (8.8% vs 22.2%), respectively.

Figure 22:
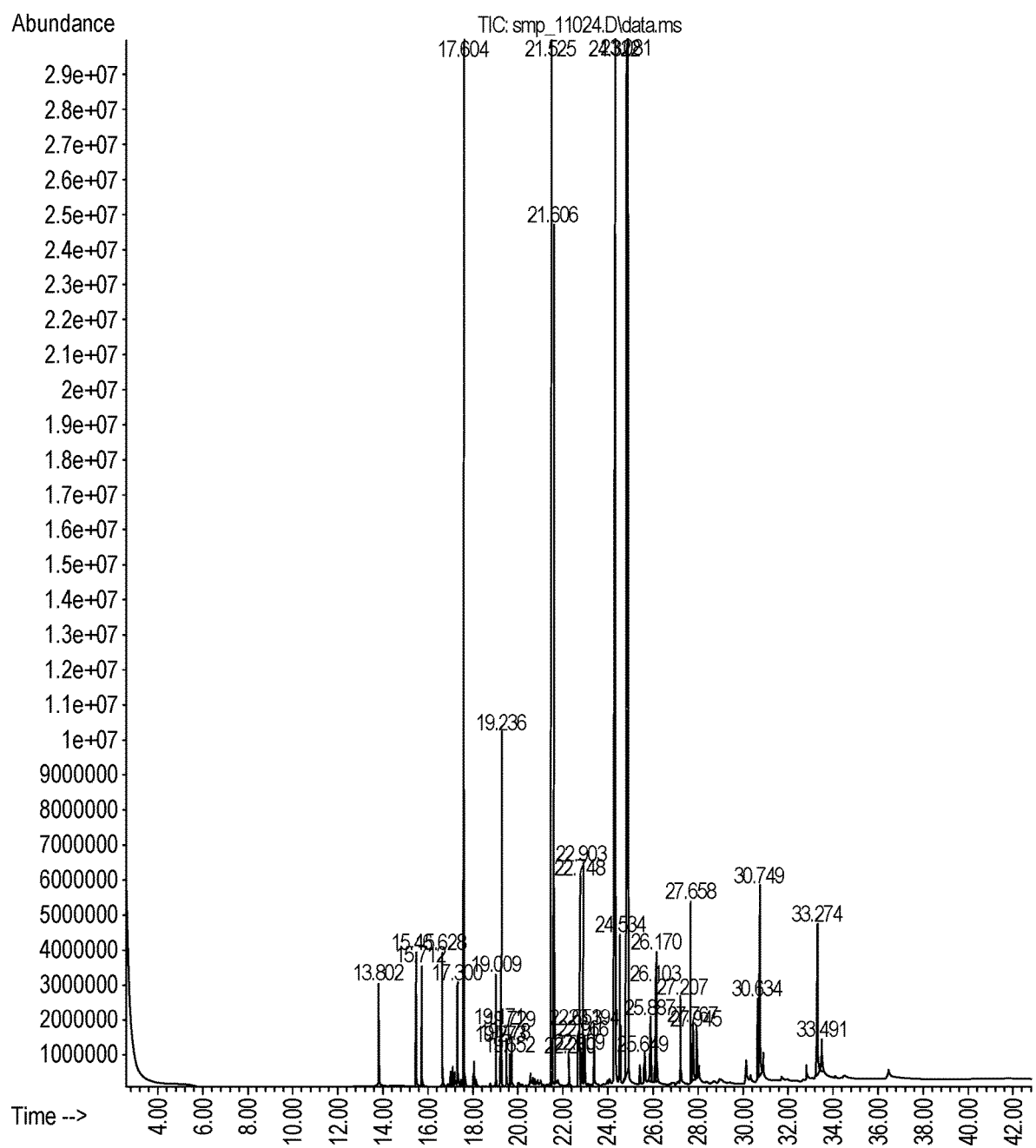
FIG. 22 illustrates spectral data from tests of reactors configured in accordance with embodiments of the present technology.

The liquid product was characterized via a chromatograph/mass spectrometer to determine the composition. The chromatogram is provided in FIG. 22. The predominant selected peaks are at retention time in minutes—21.525 (23.795%) corresponding to phenanthrene, 21.606 (5.175%) corresponding to phenanthrene, 24.322 (8.437%) corresponding to pyrene and 24.881 (31.153%) also corresponding to pyrene. Phenanthrene is $C_{14}H_{10}$ and pyrene is $C_{16}H_{10}$. Both molecules are polyaromatic hydrocarbons, and in liquid phase at ambient conditions.

8. Representative Gas-Borne Carbon Removal Systems

Solid carbon and liquid carbon capture techniques have been described above. Representative systems can also include separation systems for gas-borne carbon particulates, e.g., as part of any of the carbon/hydrogen separators described above.

Figure 23:
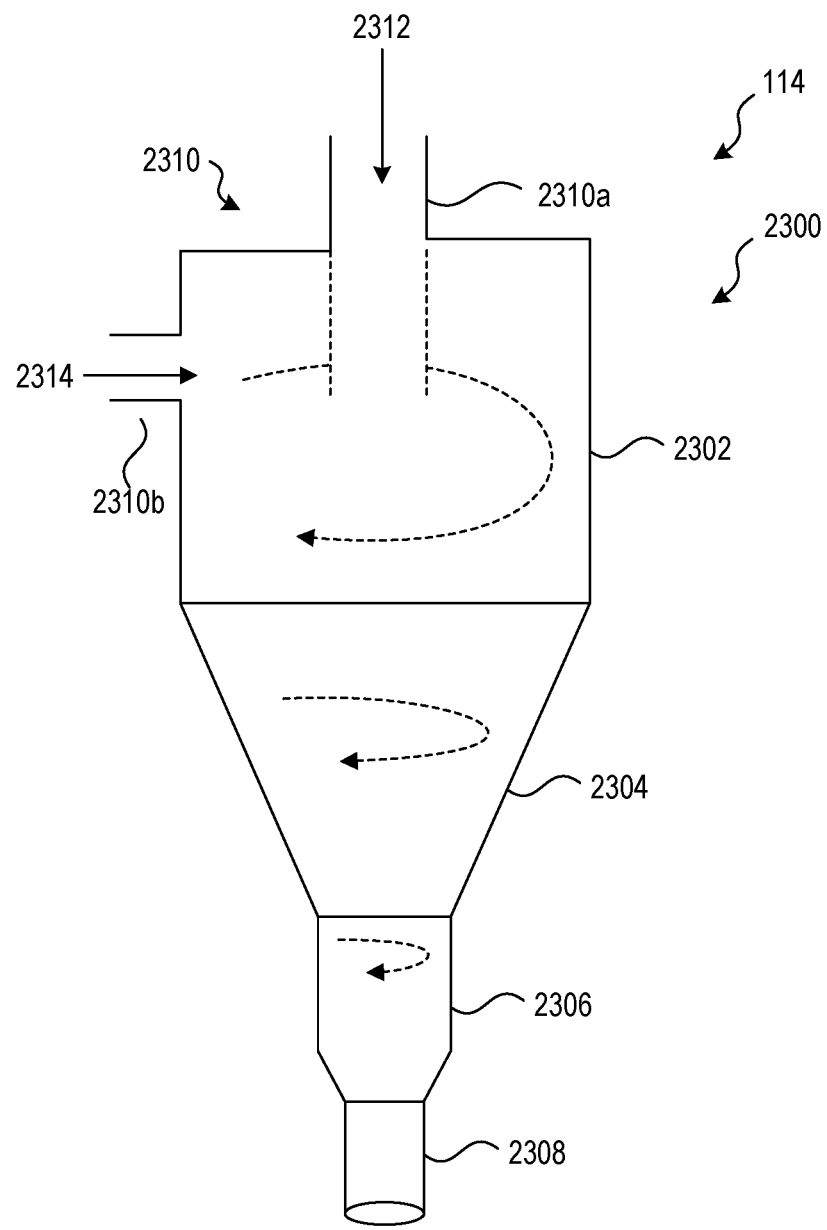
FIG. 23 is a schematic illustration of a cyclone separator for separating carbon from hydrogen gas in accordance with some embodiments of the present technology.

FIG. 23 is a schematic illustration of a cyclone separator 2300 that can be utilized in any of the foregoing separators, e.g., the carbon separator 114 shown in FIG. 1. As illustrated in FIG. 23, the cyclone separator 2300 includes a main barrel 2302 in fluid communication with inlet tubes 2310 (referred to individually as a first inlet tube 2310a and a second inlet tube 2310b), a cone section 2304 in fluid communication with the main barrel 2302, a collection section 2306 in fluid communication with the cone section 2304, and a dipleg 2308 in fluid communication with the collection section 2306.

The first inlet tube 2310a can be in fluid communication with the outlet from any of the reactors discussed above to receive a mixture that includes carbon particulates and hydrogen gas along a reactor output path 2312. The second inlet tube 2310b can be connected to a catalyst vapor source to receive a catalyst vapor along a catalyst input path 2314. As illustrated in FIG. 23, the catalyst input path 2314 impacts the reactor output path 2312 within the main barrel 2302 to generate a downward moving cyclone within the cyclone separator 2300. In turn, the cyclone imparts a centrifugal force on the mixture of carbon particulates and hydrogen gas flowing therein. Based on the impact from this force and the difference in density between the hydrogen gas and carbon particulates, the mixture separates as it travels through the cyclone separator 2300. The tapered walls of the cone section 2304 maintain the speed of the cyclone and funnel the mixture towards the collection section 2306 and the dipleg 2308. Some, or all, of the carbon particulates are captured in the collection section 2306 and sent to a carbon disposal component 20 (FIG. 1) before the dipleg 2308 routes the resulting hydrogen gas elsewhere. In some embodiments, the cyclone separator 2300 captures carbon particulates with a diameter of about 10 micrometers (µm) or above. Carbon particulates with a diameter below about 10 µm can escape into the output from the cyclone separator 2300. Accordingly, in various embodiments, the carbon separator 114 can include a series of cyclone separators and/or other particulate capturing units, such as a wet scrubbing component, a baghouse filter, and/or an electrostatic precipitator, and/or another suitable component.

For example, the carbon separator 114 can include a baghouse filter operably coupled to the cyclone separator 2300 to capture additional carbon particulates from the mixture. Baghouse filters are a type of fabric filter air-material separator employed for particulate removal from manufacturing and other industrial operations to keep dust and solid particulates from escaping in the open environment. Baghouses utilize fabric filter bags and/or pleated filters arranged in rows and mounted vertically in a sheet metal housing. A dusty gas stream is moved by an air blower and drawn into the baghouse through a duct system. The gases in the stream then pass through the filters, while particles remain on the filter media surface, thus separating the particulates from the gases. Over time, the dust begins to build up and form a filter cake on the filter surface. Accordingly, various cleaning systems can used to remove the dust from the filters and/or the filters can be manually emptied periodically. As applied in the carbon separator 114, the baghouse filter can receive a flow of hydrogen gas and carbon particulates. While the hydrogen gas can pass through the fabric filter, the carbon particulates can be caught by the filter.

Figure 24C:
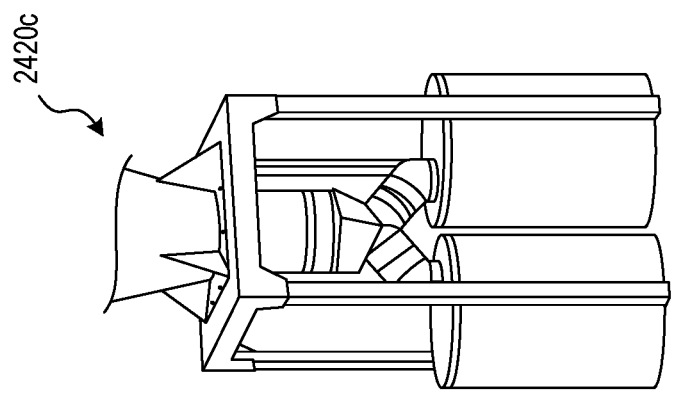
FIGS. 24A-24C are partially schematic isometric views of carbon collection systems in accordance with various embodiments of the present technology.
Figure 24B:
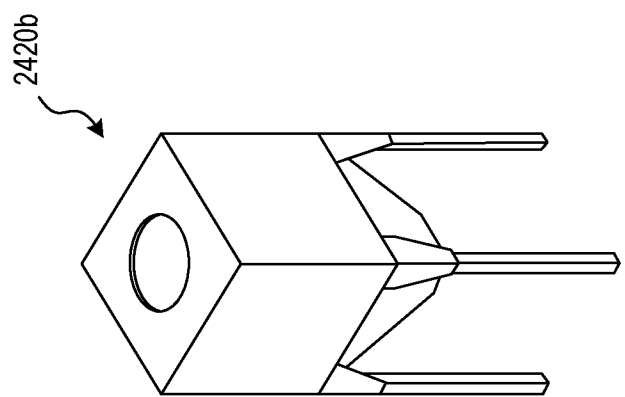
Figure 24A:
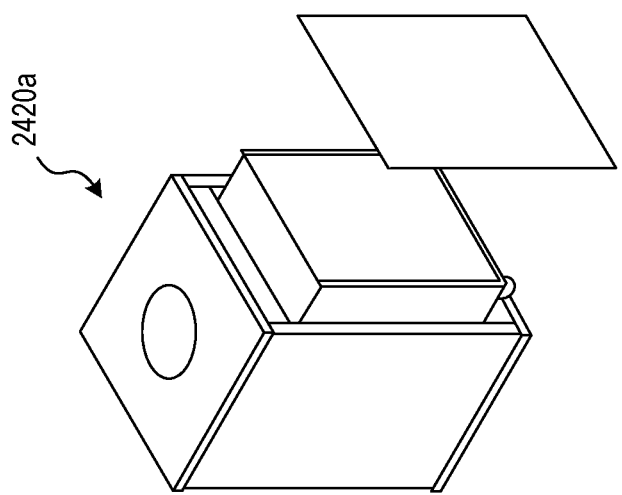

FIGS. 24A-C are partially schematic isometric views of carbon collection systems 2420a-2420c in accordance with various embodiments of the present technology. As illustrated, each of the carbon collection systems 2420a-2420c includes an inlet and a large storage area to collect carbon from the system 100 (FIG. 1). As illustrated in FIG. 24A, the carbon collection system 2420a can include a removable storage bin that can be periodically emptied and/or replaced. As illustrated in FIG. 24B, the carbon collection system 2420b can include a funnel leading to a lower opening that can allow carbon to be removed from the carbon collection system 2420b continuously and/or periodically. For example, a user can empty the carbon collection system 2420b through the opening once every week. As illustrated in FIG. 24C, the carbon collection system 2420c can include disposable storage tanks. For example, a user can periodically remove one (or both) of the storage tanks and replace them with empty storage tanks. The full storage tanks can then be taken elsewhere to be swapped for empty storage tanks and/or disposed.

Embodiments of the technology described herein can include several advantageous features. For example, the system can operate in a self-sustained manner, using hydrogen produced by the reactor to feed the pyrolysis reaction conducted in the reactor. This is unlike conventional reactors, which typically use (e.g., exclusively use) external energy sources, such as a hydrocarbon fuel or electricity. Another feature is that embodiments of the system can run continuously while carbon is being removed mechanically. This is in contrast to conventional techniques that require the reactor to be shut down before the carbon is collected and removed, Still another feature is that embodiments of the system use combustion heat that would otherwise be lost, to instead heat the pyrolysis reactor, thus improving overall thermal efficiency. In conventional, indirectly heated industrial systems, the radiation losses are significant, which reduces efficiency. Still further features include a "flow down" arrangement, which improves the flow of carbon particles by taking advantage of gravity in a system that is has flow channels with specially selected (e.g., optimized) surface/volume ratios to reduce (e.g., minimize) particle deposition inside the reactor.

As used herein, the term "and/or," as in "A and/or B" refers to A alone, B alone and both A and B.

As used herein, the terms "about" and "approximately" refer to values within 10% of the stated value.

To the extent any materials incorporated herein by reference conflict with the present disclosure, the present disclosure controls.

From the foregoing, it will be appreciated that specific embodiments of the disclosed technology have been described herein for purposes of illustration, but that various modifications may be made without deviating from the technology. For example, several features described above in the context of RTP reactors can be applied to CCP reactors, and vice versa. Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

The following examples provide additional representative features of the present technology.

EXAMPLES

1. A combined combustion and pyrolysis (CCP) system, the CCP system comprising:
a CCP reactor including:
a combustion chamber;
a combustion component positioned to combust a fuel within the combustion chamber and direct a resulting flue gas through the combustion chamber;
a reaction chamber having a (1) first region fluidly couplable to a reactant supply to receive a reactant, and (2) a second region downstream of the first region, wherein the reaction chamber is in thermal communication with the combustion chamber to heat the reactant and cause a pyrolysis reaction within the reaction chamber, wherein the pyrolysis reaction generates an output that includes hydrogen gas and carbon; and
insulating material positioned to reduce heat loss from at least one of the combustion chamber or the reaction chamber; and
a carbon separation component in fluid communication with the second region of the reaction chamber to remove at least a portion of the carbon from the output to form a separated output.

2. The CCP system of example 1, further comprising an output valve in fluid communication with the carbon separation component to receive the separated output, the output valve having at least a first position and a second position, wherein:
in the first position, the output valve directs at least a portion of the separated output into the combustion component; and
in the second position, the output valve directs at least a portion of the separated output out of the CCP system.

3. The CCP system of any of examples 1 and 2 wherein the combustion component includes:
an oxidant input valve fluidly coupled to an oxidant supply to control a ratio between the fuel and oxygen in the combustion component; and
a burner operatively coupled to the oxidant input valve to receive the oxygen and combust a mixture of the fuel and oxygen at the ratio.

4. The CCP system of any of examples 1-3 wherein the reaction chamber is concentric with and radially outward from the combustion chamber, and wherein the insulating material is concentric with and radially outward from the reaction chamber.

5. The CCP system of any of examples 1-4 wherein the combustion chamber is concentric with and radially outward from the reaction chamber, and wherein the insulating material is concentric with and radially outward from the combustion chamber.

6. The CCP system of any of examples 1-5, further comprising a recuperator in thermal communication with (1) the flue gas exiting the combustion chamber and (2) at least one of (a) a flow of the fuel entering the combustion component or (b) an oxidant entering the combustion chamber to transfer heat from the flue gas into at least one of (a) the fuel or (b) the oxidant entering the combustion chamber.

7. The CCP system of any of examples 1-6, further comprising a recuperator in thermal communication with both a flow of the reactant entering the reaction chamber and the flue gas exiting the combustion chamber to transfer heat from the flue gas into the reactant entering the reaction chamber.

8. The CCP system of any of examples 1-7, further comprising a carbon removal device positioned and at least partially within the reaction chamber to remove carbon deposits from at least one surface within the reaction chamber.

9. The CCP system of example 8 wherein the carbon removal device includes at least one of: a plunger movable along a longitudinal flow path of the reaction chamber to scrape the carbon deposits from the at least one surface, a screw-type extruder movable rotationally to scrape the carbon deposits from the at least one surface, or one or more gas jets positioned to direct a pressurized gas flow to remove the carbon deposits from the at least one surface.

10. The CCP system of example 8 wherein the carbon removal device includes a plunger movable along a longitudinal flow path of the reaction chamber to scrape the carbon deposits from the at least one surface.

11. The CCP system of any of examples 1-10 wherein the combustion chamber is a first combustion chamber, wherein the combustion component is a first combustion component, wherein the reaction chamber is a first reaction chamber, and wherein the CCP reactor further includes:
   at least one additional combustion chamber;
   at least one additional combustion component positioned to combust the fuel within the at least one additional combustion chamber and direct the resulting flue gas through the at least one additional combustion chamber; and
   at least one additional reaction chambers each having a first region fluidly couplable to the reactant supply to receive the reactant and a second region opposite the first region.

12. The CCP system of example 11 wherein the insulating material is positioned radially outward from each of the first combustion chamber, the first reaction chamber, the at least one additional combustion chamber, and the at least one additional reaction chamber.

13. The CCP system of any of examples 1-12 wherein the reaction chamber is in thermal communication with the combustion chamber via conduction and/or radiation through a shared wall.

14. The CCP system of any of examples 1-13 wherein the reactant includes natural gas.

15. The CCP system of any of examples 1-14, further comprising an input valve fluidly coupled between the reactant supply and the reaction chamber.

16. The CCP system of any of examples 1-14, further comprising an output junction, the output having a first exit positioned to direct at least a portion of the separated output into the combustion component and a second exit positioned to direct at least a portion of the separated output out of the CCP system.

17. A combined combustion and pyrolysis (CCP) system for converting a hydrocarbon reactant into an output that includes hydrogen gas and carbon, the CCP system comprising:
   a CCP reactor that includes a plurality of chambers and an insulating material positioned to reduce heat loss from the plurality of chambers, each of the plurality of chambers having a first portion and a second portion opposite the first portion, wherein:
      at least a first chamber includes a combustion component coupleable to a supply of a fuel and positioned to direct a combustion flue gas through the first chamber;
      at least a second chamber is fluidly couplable to an input valve to receive a hydrocarbon reactant and is in thermal communication with the first chamber to transfer combustion heat to the hydrocarbon reactant to cause a pyrolysis reaction generating the output; and
      a carbon separation component in fluid communication with the CCP reactor to remove at least a portion of the carbon from the output.

18. The CCP system of example 17, further comprising a heat recuperator in fluid communication with the combustion chamber to recover heat from the combustion flue gas exiting the first chamber to preheat the fuel entering the combustion component, the hydrocarbon reactant entering the second chamber, and/or the oxidant entering the combustion component.

19. The CCP system of any of examples 17 and 18 wherein the output further comprises unreacted hydrocarbon gas, and wherein the CCP system further comprises a gas separator in fluid communication with the CCP reactor to receive the output and remove at least a portion of the unreacted hydrocarbon gas from the output.

20. The CCP system of any of examples 17-19 wherein the plurality of chambers are concentric, wherein the first chamber is positioned radially inwardly from the second chamber, and wherein the insulating material is positioned radially outwardly from the second chamber.

21. The CCP system of example 20 wherein:
   the combustion component is a first combustion component and the combustion flue gas is a first combustion flue gas;
   the second chamber includes a second combustion component coupleable to the supply of the fuel and positioned to direct a second combustion flue through the second chamber; and
   the CCP reactor further includes:
      a third chamber concentric with and radially outward from the second chamber, wherein the third chamber is fluidly couplable to the input valve to receive the hydrocarbon reactant and is in thermal communication with the first chamber and the second chamber to transfer combustion heat from the first and/or second combustion components to the hydrocarbon reactant to cause the pyrolysis reaction; and
      a controller operably coupled to each of the first combustion component, the second combustion component, and the input valve to direct (1) combustion and no pyrolysis in at least one of the first and second chambers, and (2) pyrolysis and no combustion in at least one of the second and third chambers.

22. The CCP system of example 21 wherein:
   the third chamber includes a third combustion component coupleable to the supply of the fuel and positioned to direct a third combustion flue gas through the third chamber;
   the first chamber is fluidly couplable to the input valve to receive the hydrocarbon reactant and transfer combustion heat from second and/or third combustion components to the hydrocarbon reactant to cause the pyrolysis reaction; and the controller is further operably coupled to the third combustion component and the input valve to direct (3) combustion and no pyrolysis in the third chamber, and (4) pyrolysis and no combustion in the first chamber.

23. The CCP system of example 22, further comprising:
   a first plunger movable along a longitudinal flow path of the first chamber to scrape carbon deposits from at least one surface within the first chamber; and
   a second plunger movable along a longitudinal flow path of the second chamber to scrape carbon deposits from at least one surface within the second chamber.

24. The CCP system of any of examples 17-23 wherein the first chamber is thermally coupled to the second chamber by a conductive material forming a wall between the first chamber and the second chamber.

25. A method for operating a combined combustion and pyrolysis (CCP) system for generating hydrogen gas, the method comprising:

directing a reactant through a first chamber of a CCP reactor, wherein the first chamber is in thermal communication with a second chamber of the CCP reactor via a thermally conductive shared wall;

combusting, via a combustion component, a fuel within the second chamber to heat the reactant in the first chamber above a reaction temperature, wherein, at the reaction temperature, at least a portion of the reactant converts into an output that includes hydrogen gas and carbon particulates; and separating at least a portion of the carbon particulates out of the output.

26. The method of example 25, further comprising transferring heat from a flue gas exiting the second chamber into the fuel and/or an oxidant entering the combustion component and/or the reactant entering the first chamber.

27. The method of any of examples 25 and 26, further comprising directing at least a portion of the hydrogen gas in the output into the combustion component to supplement the fuel entering the combustion component.

28. The method of any of examples 25-27, further comprising detaching, with a carbon removal component, carbon deposits from at least one surface in the second chamber of the CCP reactor.

29. The method of example 28, wherein the abrading is performed while directing the reactant through the first chamber and combusting the fuel.

30. The method of any of examples 25-29, further comprising, before directing the reactant through the first chamber, preheating the CCP reactor.

31. The method of example 30 wherein preheating the CCP reactor includes combusting, via the combustion component, the fuel within the second chamber.

32. The method of example 30 wherein the combustion component is a first combustion component, and wherein preheating the CCP reactor includes combusting, via a second combustion component, the fuel within the first chamber of the CCP reactor.

33. The method of any of examples 25-32 further comprising:

moving an input valve from a first position to a second position, wherein:
in the first position, the input valve directs the reactant through the first chamber; and
in the second position, the input valve directs the reactant through a third chamber in thermal communication with the second chamber; and
combusting, via the combustion component, the fuel within the second chamber to heat the reactant in the third chamber above the reaction temperature.

34. The method of example 33, further comprising detaching, with a carbon removal component, carbon deposits from at least one surface in the first chamber of the CCP reactor while the input valve is in the second position.

35. A pyrolysis system, comprising:
a combustion chamber having a combustion chamber inlet positioned to receive a fuel, and a combustion chamber outlet positioned to expel exhaust products;
a reaction chamber positioned concentrically relative to the combustion chamber and having a thermally transmissive wall in common with the combustion chamber, the reaction chamber having a reaction chamber inlet positioned to receive a hydrocarbon, and a reaction chamber outlet positioned to expel pyrolysis products; and a carbon removal device positioned within the reaction chamber, and movable within the reaction chamber to remove carbon deposits from at least one surface within the reaction chamber.

36. The system of example 1 wherein the combustion chamber is positioned radially inwardly from the reaction chamber.

37. The system of example 1 wherein the combustion chamber is positioned radially outwardly from the reaction chamber.

38. The system of example 1 wherein the at least one surface includes the common wall.

39. The system of example 1, further comprising a separator coupled to the reaction chamber exit and configured to separate carbon particulates from hydrogen in a flow of pyrolysis products exiting the reaction chamber.

40. The system of example 1, further comprising a heat exchanger in thermal communication with both a flow of the fuel entering the combustion chamber, and a flow of exhaust products exiting the combustion chamber, to heat the flow of the fuel entering the combustion chamber.

41. The system of example 1, further comprising a heat exchanger in thermal communication with both a flow of the hydrocarbon entering the reaction chamber, and a flow of exhaust products exiting the combustion chamber, to heat the flow of the hydrocarbon entering the reaction chamber.

42. The system of example 1, further comprising a flow path coupled between the reaction chamber outlet and the combustion chamber inlet to direct a portion of hydrogen from the pyrolysis products into the combustion chamber.

43. The system of example 1 wherein the carbon removal device includes a plunger positioned to scrape the carbon deposits from at least one surface.

We claim:

1. A combined combustion and pyrolysis (CCP) system, the CCP system comprising:
a CCP reactor including:
a combustion chamber;
a combustion component positioned to combust a fuel within the combustion chamber and direct a resulting flue gas through the combustion chamber;
a reaction chamber having a (1) first region fluidly couplable to a reactant supply to receive a reactant, and (2) a second region downstream of the first region, wherein the reaction chamber is in thermal communication with the combustion chamber to heat the reactant and cause a pyrolysis reaction within the reaction chamber, wherein the pyrolysis reaction generates an output that includes hydrogen gas and carbon; and
insulating material positioned to reduce heat loss from at least one of the combustion chamber or the reaction chamber; and
a carbon separation component in fluid communication with the second region of the reaction chamber to remove at least a portion of the carbon from the output to form a separated output and to remove the at least the portion of the carbon from the reaction chamber.

2. The CCP system of claim 1, further comprising an output valve in fluid communication with the carbon separation component to receive the separated output, the output valve having at least a first position and a second position, wherein:
in the first position, the output valve directs at least a portion of the separated output into the combustion component; and in the second position, the output valve directs at least a portion of the separated output out of the CCP system.

3. The CCP system of claim 1 wherein the combustion component includes:
an oxidant input valve fluidly coupled to an oxidant supply to control a ratio between the fuel and oxygen in the combustion component; and
a burner operatively coupled to the oxidant input valve to receive the oxygen and combust a mixture of the fuel and oxygen at the ratio.

4. The CCP system of claim 1 wherein the reaction chamber is concentric with and radially outward from the combustion chamber, and wherein the insulating material is concentric with and radially outward from the reaction chamber.

5. The CCP system of claim 1 wherein the combustion chamber is concentric with and radially outward from the reaction chamber, and wherein the insulating material is concentric with and radially outward from the combustion chamber.

6. The CCP system of claim 1, further comprising a recuperator in thermal communication with (1) the flue gas exiting the combustion chamber and (2) at least one of (a) a flow of the fuel entering the combustion component or (b) an oxidant entering the combustion chamber to transfer heat from the flue gas into at least one of (a) the fuel or (b) the oxidant entering the combustion chamber.

7. The CCP system of claim 1, further comprising a recuperator in thermal communication with both a flow of the reactant entering the reaction chamber and the flue gas exiting the combustion chamber to transfer heat from the flue gas into the reactant entering the reaction chamber.

8. The CCP system of claim 1, further comprising a carbon removal device positioned and at least partially within the reaction chamber to remove carbon deposits from at least one surface within the reaction chamber.

9. The CCP system of claim 8 wherein the carbon removal device includes at least one of: a plunger movable along a longitudinal flow path of the reaction chamber to scrape the carbon deposits from the at least one surface, a screw-type extruder movable rotationally to scrape the carbon deposits from the at least one surface, or one or more gas jets positioned to direct a pressurized gas flow to remove the carbon deposits from the at least one surface.

10. The CCP system of claim 8 wherein the carbon removal device includes a plunger movable along a longitudinal flow path of the reaction chamber to scrape the carbon deposits from the at least one surface.

11. The CCP system of claim 1 wherein the combustion chamber is a first combustion chamber, wherein the combustion component is a first combustion component, wherein the reaction chamber is a first reaction chamber, and wherein the CCP reactor further includes:
at least one additional combustion chamber;
at least one additional combustion component positioned to combust the fuel within the at least one additional combustion chamber and direct the resulting flue gas through the at least one additional combustion chamber; and
at least one additional reaction chambers each having a first region fluidly couplable to the reactant supply to receive the reactant and a second region opposite the first region.

12. The CCP system of claim 11 wherein the insulating material is positioned radially outward from each of the first combustion chamber, the first reaction chamber, the at least one additional combustion chamber, and the at least one additional reaction chamber.

13. The CCP system of claim 1 wherein the reaction chamber is in thermal communication with the combustion chamber via conduction and/or radiation through a shared wall.

14. The CCP system of claim 1 wherein the reactant includes natural gas.

15. The CCP system of claim 1, further comprising an input valve fluidly coupled between the reactant supply and the reaction chamber.

16. The CCP system of claim 1, further comprising an output junction, the output having a first exit positioned to direct at least a portion of the separated output into the combustion component and a second exit positioned to direct at least a portion of the separated output out of the CCP system.

17. A combined combustion and pyrolysis (CCP) system for converting a hydrocarbon reactant into an output that includes hydrogen gas and carbon, the CCP system comprising:
a CCP reactor that includes a plurality of chambers and an insulating material positioned to reduce heat loss from the plurality of chambers, each of the plurality of chambers having a first portion and a second portion opposite the first portion, wherein:
at least a first chamber includes a combustion component coupleable to a supply of a fuel and positioned to direct a combustion flue gas through the first chamber;
at least a second chamber is fluidly couplable to an input valve to receive a hydrocarbon reactant and is in thermal communication with the first chamber to transfer combustion heat to the hydrocarbon reactant to cause a pyrolysis reaction generating the output; and
a carbon separation component in fluid communication with the CCP reactor to remove at least a portion of the carbon from the output.

18. The CCP system of claim 17, further comprising a heat recuperator in fluid communication with the combustion chamber to recover heat from the combustion flue gas exiting the first chamber to preheat the fuel entering the combustion component, the hydrocarbon reactant entering the second chamber, and/or the oxidant entering the combustion component.

19. The CCP system of claim 17 wherein the output further comprises unreacted hydrocarbon gas, and wherein the CCP system further comprises a gas separator in fluid communication with the CCP reactor to receive the output and remove at least a portion of the unreacted hydrocarbon gas from the output.

20. The CCP system of claim 17 wherein the plurality of chambers are concentric, wherein the first chamber is positioned radially inwardly from the second chamber, and wherein the insulating material is positioned radially outwardly from the second chamber.

21. The CCP system of claim 20 wherein:
the combustion component is a first combustion component and the combustion flue gas is a first combustion flue gas;
the second chamber includes a second combustion component coupleable to the supply of the fuel and positioned to direct a second combustion flue through the second chamber; and the CCP reactor further includes:
- a third chamber concentric with and radially outward from the second chamber, wherein the third chamber is fluidly couplable to the input valve to receive the hydrocarbon reactant and is in thermal communication with the first chamber and the second chamber to transfer combustion heat from the first and/or second combustion components to the hydrocarbon reactant to cause the pyrolysis reaction; and
- a controller operably coupled to each of the first combustion component, the second combustion component, and the input valve to direct (1) combustion and no pyrolysis in at least one of the first and second chambers, and (2) pyrolysis and no combustion in at least one of the second and third chambers.

22. The CCP system of claim 21 wherein:
the third chamber includes a third combustion component coupleable to the supply of the fuel and positioned to direct a third combustion flue gas through the third chamber;
the first chamber is fluidly couplable to the input valve to receive the hydrocarbon reactant and transfer combustion heat from second and/or third combustion components to the hydrocarbon reactant to cause the pyrolysis reaction; and
the controller is further operably coupled to the third combustion component and the input valve to direct (3) combustion and no pyrolysis in the third chamber, and (4) pyrolysis and no combustion in the first chamber.

23. The CCP system of claim 22, further comprising:
a first plunger movable along a longitudinal flow path of the first chamber to scrape carbon deposits from at least one surface within the first chamber; and
a second plunger movable along a longitudinal flow path of the second chamber to scrape carbon deposits from at least one surface within the second chamber.

24. The CCP system of claim 17 wherein the first chamber is thermally coupled to the second chamber by a conductive material forming a wall between the first chamber and the second chamber.

25. A method for operating a combined combustion and pyrolysis (CCP) system for generating hydrogen gas, the method comprising:
directing a reactant through a first chamber of a CCP reactor, wherein the first chamber is in thermal communication with a second chamber of the CCP reactor via a thermally conductive shared wall;
combusting, via a combustion component, a fuel within the second chamber to heat the reactant in the first chamber above a reaction temperature, wherein, at the reaction temperature, at least a portion of the reactant converts into an output that includes hydrogen gas and carbon particulates; and
separating at least a portion of the carbon particulates out of the output.

26. The method of claim 25, further comprising transferring heat from a flue gas exiting the second chamber into the fuel and/or an oxidant entering the combustion component and/or the reactant entering the first chamber.

27. The method of claim 25, further comprising directing at least a portion of the hydrogen gas in the output into the combustion component to supplement the fuel entering the combustion component.

28. The method of claim 25, further comprising detaching, with a carbon removal component, carbon deposits from at least one surface in the second chamber of the CCP reactor.

29. The method of claim 28, wherein the abrading is performed while directing the reactant through the first chamber and combusting the fuel.

30. The method of claim 25, further comprising, before directing the reactant through the first chamber, preheating the CCP reactor.

31. The method of claim 30 wherein preheating the CCP reactor includes combusting, via the combustion component, the fuel within the second chamber.

32. The method of claim 30 wherein the combustion component is a first combustion component, and wherein preheating the CCP reactor includes combusting, via a second combustion component, the fuel within the first chamber of the CCP reactor.

33. The method of claim 25 further comprising:
moving an input valve from a first position to a second position, wherein:
in the first position, the input valve directs the reactant through the first chamber; and
in the second position, the input valve directs the reactant through a third chamber in thermal communication with the second chamber; and
combusting, via the combustion component, the fuel within the second chamber to heat the reactant in the third chamber above the reaction temperature.

34. The method of claim 33, further comprising detaching, with a carbon removal component, carbon deposits from at least one surface in the first chamber of the CCP reactor while the input valve is in the second position.

35. The CCP system of claim 1, wherein the separated output comprising at least the portion of the carbon is recycled to the reaction chamber to act as a catalyst or nucleation site to aid the pyrolysis reaction of the reactant.

36. The CCP system of claim 1, wherein the fuel entering the combustion component and/or the reactant entering the reaction chamber are preheated to a target temperature using plasma.

37. The CCP system of claim 1, further comprising:
a feed path into the reaction chamber, wherein the feed path is configured to periodically and/or occasionally feed air or another oxidizer into the reaction chamber to burn residual carbon.

38. The CCP system of claim 1, wherein the combustion chamber inner wall and/or outer wall comprises heat transfer features, the heat transfer features comprising at least one of fins, channels, and other surface area enhancement features.

39. The CCP system of claim 1, wherein the fuel and/or the hydrocarbon reactant are directed to swirl to enhance heat transfer.

40. The CCP system of claim 1, wherein the hydrogen gas from the output is used as a feed for a burner for a second reactor during startup of the second reactor.

41. The CCP system of claim 1, wherein the hydrogen gas is used as feed to be burned to heat up a second reactor during startup of the second reactor.

42. The CCP system of claim 1, wherein the hydrogen gas is burned to heat up a second reactor during startup of the second reactor.

43. The CCP system of claim 17, wherein the at least the portion of carbon is recycled to the second chamber to act as a catalyst or nucleation site to aid the pyrolysis reaction of the hydrocarbon reactant.

44. The CCP system of claim 17, wherein the fuel entering the combustion component and/or the hydrocarbon reactant entering the second chamber are preheated to a target temperature using plasma.

45. The CCP system of claim 17, further comprising:
a feed path into the second chamber, wherein the feed path is configured to periodically and/or occasionally feed air or another oxidizer into the reaction chamber to burn residual carbon.

46. The CCP system of claim 17, wherein the first chamber inner wall and/or outer wall comprises heat transfer features, the heat transfer features comprising at least one of fins, channels, and other surface area enhancement features.

47. The CCP system of claim 17, wherein the fuel and/or the hydrocarbon reactant are directed to swirl to enhance heat transfer.

48. The CCP system of claim 17, wherein the output comprises hydrogen gas, and wherein the hydrogen gas is used as feed for a burner for a second reactor during startup of the second reactor.

49. The CCP system of claim 17, wherein the output comprises hydrogen gas, and wherein the hydrogen gas is used as feed to be burned to heat up a second reactor during startup of the second reactor.

50. The CCP system of claim 17, wherein the output comprises hydrogen gas, and wherein the hydrogen gas is burned to heat up a second reactor during startup of the second reactor.

* * * * *